DATA STORAGE SYSTEM

Original Filed March 4, 1955 52 Sheets-Sheet 1

INVENTORS
GEORGE G HOBERG
LUCILLE E. MOTT
JOHN R. VAN ANDEL
EDWARD W. VEITCH
RICHARD C. WEISE
BY Raymond B. Parker
ATTORNEY Aug. 11, 1964 G. G. HOBERG ETAL 3,144,549

DATA STORAGE SYSTEM

Original Filed March 4, 1955 52 Sheets-Sheet 2

INVENTORS
GEORGE G. HOBERG
LUCILLE E. MOTT
JOHN R. VAN ANDEL
EDWARD W. VEITCH
RICHARD C. WEISE

BY Raymond B. Parker

ATTORNEY

INVENTORS
GEORGE G. HOBERG
LUCILLE E. MOTT
JOHN R. VAN ANDEL
EDWARD W. VEITCH
RICHARD C. WEISE
BY Ralymond B. Parker
ATTORNEY INVENTORS
GEORGE G. HOBERG
LUCILLE E. MOTT
JOHN R. VAN ANDEL
EDWARD W. VEITCH
RICHARD C. WEISE
BY Raymond B. Carle
ATTORNEY INVENTORS
GEORGE G. HOBERG
LUCILLE E. MOTT
JOHN R. VAN ANDEL
EDWARD W. VEITCH
RICHARD C. WEISE
BY [signature]
ATTORNEY INVENTOR
GEORGE G. HOBERG
LUCILLE E. MOTT
JOHN R. VAN ANDEL
EDWARD W. VEITCH
RICHARD C. WEISE
BY Raymond B. Parks
ATTORNEY INVENTORS
GEORGE G. HOBERG
LUCILLE E. MOTT
JOHN R. VAN ANDEL
EDWARD W. VEITCH
RICHARD C. WEISE
BY Raymond B. Parke
ATTORNEY INVENTORS
GEORGE G. HOBERG
LUCILLE E. MOTT
JOHN R. VANANDEL
EDWARD W. VEITCH
RICHARD C. WEISE
BY Raymond B. Carle
ATTORNEY INVENTORS
GEORGE G. HOBERG
LUCILLE E. MOTT
JOHN R. VAN ANDEL
EDWARD W. VEITCH
RICHARD C. WEISE
BY Raymond B. Parke
ATTORNEY

*INVENTORS*
GEORGE G. HOBERG
LUCILLE E. MOTT
JOHN R. VAN ANDEL
EDWARD W. VEITCH
RICHARD C. WEISE
BY Raymond B. Carter
ATTORNEY INVENTORS
GEORGE G. HOBERG
LUCILLE E. MOTT
JOHN R. VANANDEL
EDWARD W. VEITCH
RICHARD C. WEISE
BY [signature]
ATTORNEY INVENTORS
GEORGE G. HOBERG
LUCILLE E. MOTT
JOHN R. VAN ANDEL
EDWARD W. VEITCH
RICHARD C. WEISE.
BY Raymond B. Carle
ATTORNEY INVENTORS
GEORGE G. HOBERG
LUCILLE E. MOTT
JOHN R. VAN ANDEL
EDWARD W. VEITCH
RICHARD C. WEISE
BY Raymond B. Cawke
ATTORNEY INVENTORS
GEORGE G. HOBERG
LUCILLE E. MOTT
JOHN R. VAN ANDEL
EDWARD W. VEITCH
RICHARD C. WEISE
BY Raymond B. Carle
ATTORNEY

STATE SELECTOR

*INVENTORS*
GEORGE G. HOBERG
LUCILLE E. MOTT
JOHN R. VAN ANDEL
EDWARD W. VEITCH
RICHARD C. WEISE
BY Raymond B. Carr
ATTORNEY INVENTORS
GEORGE G. HOBERG
LUCILLE E. MOTT
JOHN R. VAN ANDEL
EDWARD W. VEITCH
RICHARD C. WEISE
BY [signature]
ATTORNEY Aug. 11, 1964 G. G. HOBERG ETAL 3,144,549

DATA STORAGE SYSTEM

Original Filed March 4, 1955 52 Sheets-Sheet 17

INVENTORS
GEORGE G. HOBERG
LUCILLE E. MOTT
JOHN R. VAN ANDEL
EDWARD W. VEITCH
RICHARD C. WEISE

BY Raymond B. Parker
ATTORNEY

INVENTORS
GEORGE G. HOBERG
LUCILLE E. MOTT
JOHN R. VAN ANDEL
EDWARD W. VEITCH
RICHARD C. WEISE
BY Raymond B. Parker
ATTORNEY INVENTORS
GEORGE G HOBERG
LUCILLE E. MOTT
JOHN R. VAN ANDEL
EDWARD W. VEITCH
RICHARD C. WEISE
BY Raymond B. Parke
ATTORNEY INVENTORS
GEORGE G. HOBERG
LUCILLE E. MOTT
JOHN R. VAN ANDEL
EDWARD W. VEITCH
RICHARD C. WEISE
BY Raymond B. Parker
ATTORNEY INVENTORS
GEORGE G. HOBERG
LUCILLE E. MOTT
JOHN R. VAN ANDEL
EDWARD W. VEITCH
RICHARD C. WEISE
BY Raymond B. Parker
ATTORNEY INVENTORS
GEORGE G. HOBERG
LUCILLE E. MOTT
JOHN R. VAN ANDEL
EDWARD W. VEITCH
RICHARD C. WEISE
BY Raymond B. Parker
ATTORNEY INVENTORS
GEORGE G. HOBERG
LUCILLE E. MOTT
JOHN R. VAN ANDEL
EDWARD W. VEITCH
RICHARD C. WEISE
BY Raymond B. Parker
ATTORNEY INVENTORS
GEORGE G. HOBERG
LUCILLE E. MOTT
JOHN R. VAN ANDEL
EDWARD W. VEITCH
RICHARD C. WEISE
BY Raymond P. Kurlee
ATTORNEY INVENTORS
GEORGE G. HOBERG
LUCILLE E. MOTT
JOHN R. VAN ANDEL
EDWARD W. VEITCH
RICHARD C. WEISE
BY Raymond B. Parker
ATTORNEY INVENTORS
GEORGE G. HOBERG
LUCILLE E. MOTT
JOHN R. VAN ANDEL
EDWARD W. VEITCH
RICHARD C. WEISE
BY Raymond B. Parker
ATTORNEY

| | |
|---|---|
| FIG. 30a | FIG. 30b |
| FIG. 30c | FIG. 30d |

*INVENTORS*
GEORGE G. HOBERG
LUCILLE E. MOTT
JOHN R. VAN ANDEL
EDWARD W. VEITCH
RICHARD C. WEISE
BY Raymond B. Parker
ATTORNEY

*INVENTORS.*
GEORGE G. HOBERG
LUCILLE E. MOTT
JOHN R. VAN ANDEL
EDWARD W. VEITCH
RICHARD C. WEISE

INVENTORS
GEORGE G. HOBERG
LUCILLE E. MOTT
JOHN R. VAN ANDEL
EDWARD W. VEITCH
RICHARD C. WEISE
BY Raymond B. Parker
ATTORNEY INVENTORS
GEORGE G. HOBERG
LUCILLE E. MOTT
JOHN R. VANANDEL
EDWARD W. VEITCH
RICHARD C. WEISE
BY Raymond B. Parker
ATTORNEY INVENTORS.
GEORGE G. HOBERG
LUCILLE E. MOTT
JOHN R. VAN ANDEL
EDWARD W. VEITCH
RICHARD C. WEISE Aug. 11, 1964 G. G. HOBERG ETAL 3,144,549

DATA STORAGE SYSTEM

Original Filed March 4, 1955 52 Sheets-Sheet 32

INVENTORS
GEORGE G. HOBERG
LUCILLE E. MOTT
JOHN R. VAN ANDEL
EDWARD W. VEITCH
RICHARD C. WEISE

BY Raymond B. Parker
ATTORNEY

INVENTORS
GEORGE G. HOBERG
LUCILLE E. MOTT
JOHN F. VAN ANDEL
EDWARD W. VEITCH
RICHARD C. WEISE
BY Raymond B. Parker
ATTORNEY

SIGN CONTROL

INVENTORS
GEORGE G. HOBERG
LUCILLE E. MOTT
JOHN R. VAN ANDEL
EDWARD W. VEITCH
RICHARD C. WEISE
BY Raymond B. Parker
ATTORNEY INVENTORS
GEORGE G. HOBERG
LUCILLE E. MOTT
JOHN R. VAN ANDEL
EDWARD W. VEITCH
RICHARD C. WEISE
BY Raymond B. Parker
ATTORNEY

DATA STORAGE SYSTEM

Original Filed March 4, 1955 52 Sheets-Sheet 36

COUNTER V & VI INPUTS

*INVENTORS*
GEORGE G. HOBERG
LUCILLE E. MOTT
JOHN R. VAN ANDEL
EDWARD W. VEITCH
RICHARD C. WEISE
BY [signature]
ATTORNEY

*INVENTORS*
GEORGE G. HOBERG
LUCILLE E. MOTT
JOHN R. VAN ANDEL
EDWARD W. VEITCH
RICHARD C. WEISE
BY Raymond B. Parker
ATTORNEY

DIGIT DISTRIBUTOR AND
SCANNER CONDITIONS

INVENTORS
GEORGE G. HOBERG
LUCILLE E. MOTT
JOHN R. VAN ANDEL
EDWARD W. VEITCH
RICHARD C. WEISE
BY Raymond B. Poole
ATTORNEY INVENTORS
GEORGE G. HOBERG
LUCILLE E. MOTT
JOHN R. VAN ANDEL
EDWARD W. VEITCH
RICHARD C. WEISE
BY Raymond B. Parks
ATTORNEY Aug. 11, 1964 G. G. HOBERG ETAL 3,144,549

DATA STORAGE SYSTEM

Original Filed March 4, 1955 52 Sheets-Sheet 40

INVENTORS
GEORGE G. HOBERG
LUCILLE E. MOTT
JOHN R. VAN ANDEL
EDWARD W. VEITCH
RICHARD C. WEISE

BY Raymond B. Parker
ATTORNEY

TRANSFER THYRATRONS

*INVENTORS*
GEORGE G. HOBERG
LUCILLE E. MOTT
JOHN R. VAN ANDEL
EDWARD W. VEITCH
RICHARD C. WEISE
BY Raymond B. Parker
ATTORNEY

ACCUMULATOR INPUT FIG. 48

INVENTORS
GEORGE G. HOBERG
LUCILLE E. MOTT
JOHN R. VAN ANDEL
EDWARD W. VEITCH
RICHARD C. WEISE
BY Raymond B. Clarke
ATTORNEY

ACCUMULATOR COUNTER

INVENTORS
GEORGE G. HOBERG
LUCILLE E. MOTT
JOHN R. VAN ANDEL
EDWARD W. VEITCH
RICHARD C. WEISE
BY Raymond B. Parker
ATTORNEY

STATE COUNTER

INVENTORS
GEORGE G. HOBERG
LUCILLE E. MOTT
JOHN R. VAN ANDEL
EDWARD W. VEITCH
RICHARD C. WEISE
BY Raymond B. Parker
ATTORNEY

DATA STORAGE SYSTEM

Original Filed March 4, 1955 52 Sheets-Sheet 45

STATE COUNTER FIG. 51

*INVENTORS*
GEORGE G. HOBERG
LUCILLE E. MOTT
JOHN R. VAN ANDEL
EDWARD W. VEITCH
RICHARD C. WEISE

BY Raymond B. Parke
ATTORNEY

STATE COUNTER

INVENTORS
GEORGE G. HOBERG
LUCILLE E. MOTT
JOHN R. VAN ANDEL
EDWARD W. VEITCH
RICHARD C. WEISE
BY Raymond B. Parker
ATTORNEY

*INVENTORS*
GEORGE G. HOBERG
LUCILLE E. MOTT
JOHN R. VAN ANDEL
EDWARD W. VEITCH
RICHARD C. WEISE
BY Raymond B. Parke
ATTORNEY

MISC. CIRCUITS

INVENTORS.
GEORGE G. HOBERG
LUCILLE E. MOTT
JOHN R. VAN ANDEL
EDWARD W. VEITCH
RICHARD C. WEISE
BY Raymond B. Parke
ATTORNEY INVENTORS
GEORGE G. HOBERG
LUCILLE E. MOTT
JOHN R. VAN ANDEL
EDWARD W. VEITCH
RICHARD C. WEISE
BY Raymond B. Parker
ATTORNEY

*INVENTORS*
GEORGE G. HOBERG
LUCILLE E. MOTT
JOHN R. VAN ANDEL
EDWARD W. VEITCH
RICHARD C. WEISE
BY Raymond B. Parke
ATTORNEY Aug. 11, 1964 G. G. HOBERG ETAL 3,144,549

DATA STORAGE SYSTEM

Original Filed March 4, 1955 52 Sheets-Sheet 51

*INVENTORS*
GEORGE G. HOBERG
LUCILLE E. MOTT
JOHN R. VAN ANDEL
EDWARD W. VEITCH
RICHARD C. WEISE
BY Raymond B. Parke
ATTORNEY INVENTORS
GEORGE G. HOBERG
LUCILLE E. MOTT
JOHN R. VAN ANDEL
EDWARD W. VEITCH
RICHARD C. WEISE BY Raymond B. Parker
ATTORNEY United States Patent Office 3,144,549
Patented Aug. 11, 1964

3,144,549
DATA STORAGE SYSTEM

George G. Hoberg, Berwyn, Lucille E. Mott, Ardmore, John R. Van Andel, Bridgeport, Edward W. Veitch, Rosemont, and Richard C. Weise, Philadelphia, Pa., assignors to Burroughs Corporation, Detroit, Mich., a corporation of Michigan Original application Mar. 4, 1955, Ser. No. 492,062, now Patent No. 3,043,449, dated July 10, 1962. Divided and this application Aug. 15, 1956, Ser. No. 604,153
11 Claims. (Cl. 235—157)

This application is divided from the copending application, Serial No. 492,062, now Patent No. 3,043,449, filed March 4, 1955, by George G. Hoberg et al. for Electronic Computer System.

This invention relates to electronic digital computers and more particularly to data storage and information location devices operable in general-purpose computers having a plurality of automatically sequenced program steps adapted to enable the computer to perform many different types of programmed operations.

In general, electronic computers have been difficult to operate and highly skilled and specialized operators have been necessary for setting up programs to enable the computer to solve the desired problems. These computers have been highly proficient in solving the problems after being properly programmed. However, the programming technique required in prior art general-purpose computers has necessitated extensive training courses, and has resulted in establishment of a few key personnel upon which the operation of the machine depends. Not only has this caused personnel procurement problems, but it reduces the duties of persons charged with the solution of problems to the mechanical routine of gathering data. This results in losing the feel for the problem and its solution and in the ability to sense whether the solution is proper because all contact is broken by the problem originator with the procedures by which the problem is carried out. Even should these persons do the programming they may not understand the procedures followed in the problem solution because they have to think in terms of coded arithmetic notation rather than in terms of the decimal notation with which they are familiar. In the solution of scientific and business problems, therefore, the scientists and the business men have not favorably reacted toward a loss in feeling for finding solutions when using electronic computers, except in those cases where a time schedule bottleneck overrides the desirability for maintaining contact with the procedures by which the problem is solved.

It is, therefore, an object of this invention to produce an electronic computer which enables an operator to maintain touch with the manner of solving a problem and yet in which the mere routine of arithmetic or recording is done automatically at high speed by the electronic computer.

Another object of the invention is to produce a simply programmed electronic computer capable of operation by unskilled personnel and designed for operation directly in decimal notation although features of the invention are not limited to such notation.

Accordingly, the electronic computer afforded by the present invention provides simplicity of operation and flexibility of control with provisions for manual operator intervention at any stage of the programmed problem. Thus, the operator may view partial results and thereafter cause the computation to proceed in accordance with intelligible judgment which cannot be done readily in the machine itself. The computer is designed to aid the operator in understanding the nature and the status of the problem as it progresses through the various automatic or optional manual control steps. Visual aids are afforded showing the condition of the machine during the different operational steps. In addition, the machine is provided with visually pinned program instructions to enable the operator at all times to recognize the program in progress. The pin-board also permits flexibility in the choice of programs and rapid changing of the computer from one program to another without danger of improper connections because of wiring complexity.

Prior art general-purpose computers have been designed which are extremely high in cost and comprise excessive amounts of equipment which utilize large amounts of power in operation. Such machines have been available to only those relatively few users who have control of unlimited funds for acquiring and operating such machines.

Accordingly, another object of the present invention is to provide a flexible small size general-purpose digital computing machine.

A further object is to provide such an electronic digital computer which is both low in initial cost and in operating cost.

In a computer of the type described information must be stored for ready access to the computer when required. One form of suitable memory is cyclically movable magnetic storage means such as a magnetic drum. In providing such storage means, many problems are encountered in accurately reading and writing information in specified memory locations. It is usual to provide timing pulses directly recorded upon one drum channel or track for identifying cell locations. However, certain noise signals may be induced upon the timing track during use, and accordingly erroneous operation may be encountered.

Timing signals of several different types may be recorded in separate memory channels, to thereby provide the necessary operation of different computer control circuits. It becomes cumbersome and expensive, however, to have separate tracks for all the various timing signals, and the various timing signals must be recorded upon the movable memory medium to assume the exact timing necessary for locating stored information.

Different recorded information records must be located with computer instructions and control circuits by utilizing the recorded timing signals, and the address location circuits must be operated in proper sequence with other computer functions to properly time the presentation of information with the corresponding data processing operations. Control circuits for locating signals and the corresponding instructions heretofore have been more complex than feasible for use in low cost computers with limited program facilities. Thus, it becomes necessary to provide more efficient use of programming facilities in locating addresses of recorded information records.

Accordingly the present invention overcomes these difficulties and affords improved memory systems operable in low cost computers to accurately locate and process stored information.

An object of the invention therefore is to provide magnetic memory systems which are non-responsive to noise signals encountered in timing signal channels.

Another object of the invention is to provide a plurality of separable recorded timing signals upon the same track of a cyclically movable memory medium together with simplified control circuits for distinguishing the separate signals.

A further object of the invention is to provide simplified and flexible memory address locating circuits operable in computers having a limited number of program facilities.

In accordance with this invention therefore there is provided a cyclic magnetic memory device having recorded thereupon timing control signals and selectively alterable data. Processing circuits are provided for reproducing the recorded timing signals in accurate timing relationship without interference by interspersed noise signals which might otherwise interfere with computer operation. This is accomplished by converting recorded timing signals to sine wave signals in a timed circuit amplifier to thereby exclude signal components non-periodic at the fundamental timing pulse presentation frequency. Furthermore efficient amplification is realized by employing the greater amplifier gain of a timed circuit. Fundamental circuit timing is thereby controlled only by the periodic presentation frequency of actually recorded timing signals. Several sets of auixiliary timing control signals are recorded in at least one separate timing track for use with the fundamental timing signals to reproduce several separable sets of further computer timing control signals.

Address locating circuits are provided operable from different ones of the computer timing control signals. These address locating circuits are responsive to computer programming signals in such a way that few program steps are required for locating several memory address locations. Thus, scanning switches are provided for optional control of memory location, and these scanning switches are connected for operation by certain special computer instructions. Thereby, a sequence of memory locations may be selected by a single memory address instruction coupled with a special scanning switch instruction to thereby reduce the number of programming steps required without processing address instructions through the computer arithmetic section for modification and thereby greatly increasing the required control and data processing circuits.

A more detailed description of the electronic computer, organization and mode of operation together with the accompanying electronic circuits and operational features of advantage of the data storage circuits are described hereinafter with reference to the accompanying drawings, wherein.

Figure 3A:
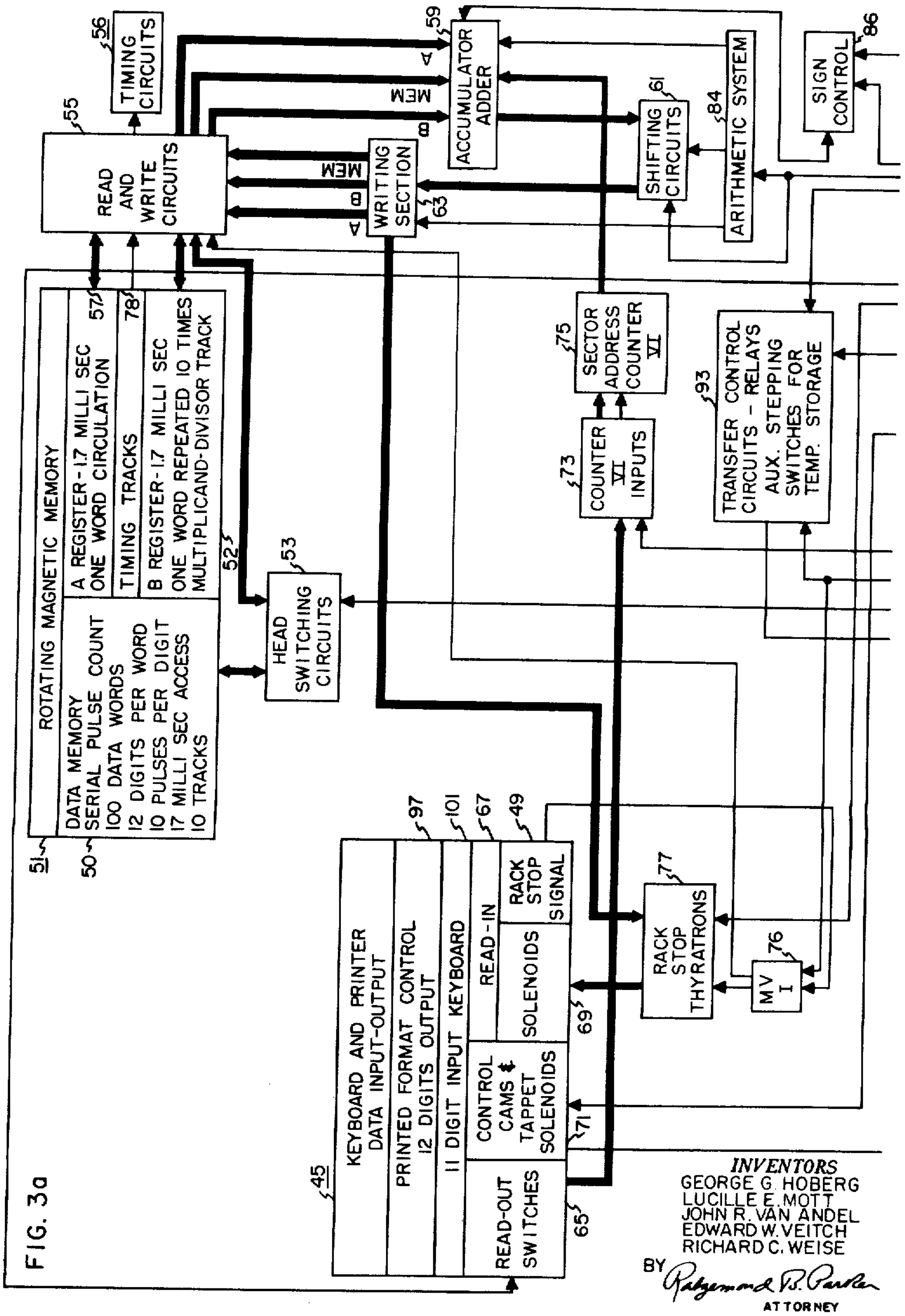
Figure 3B:
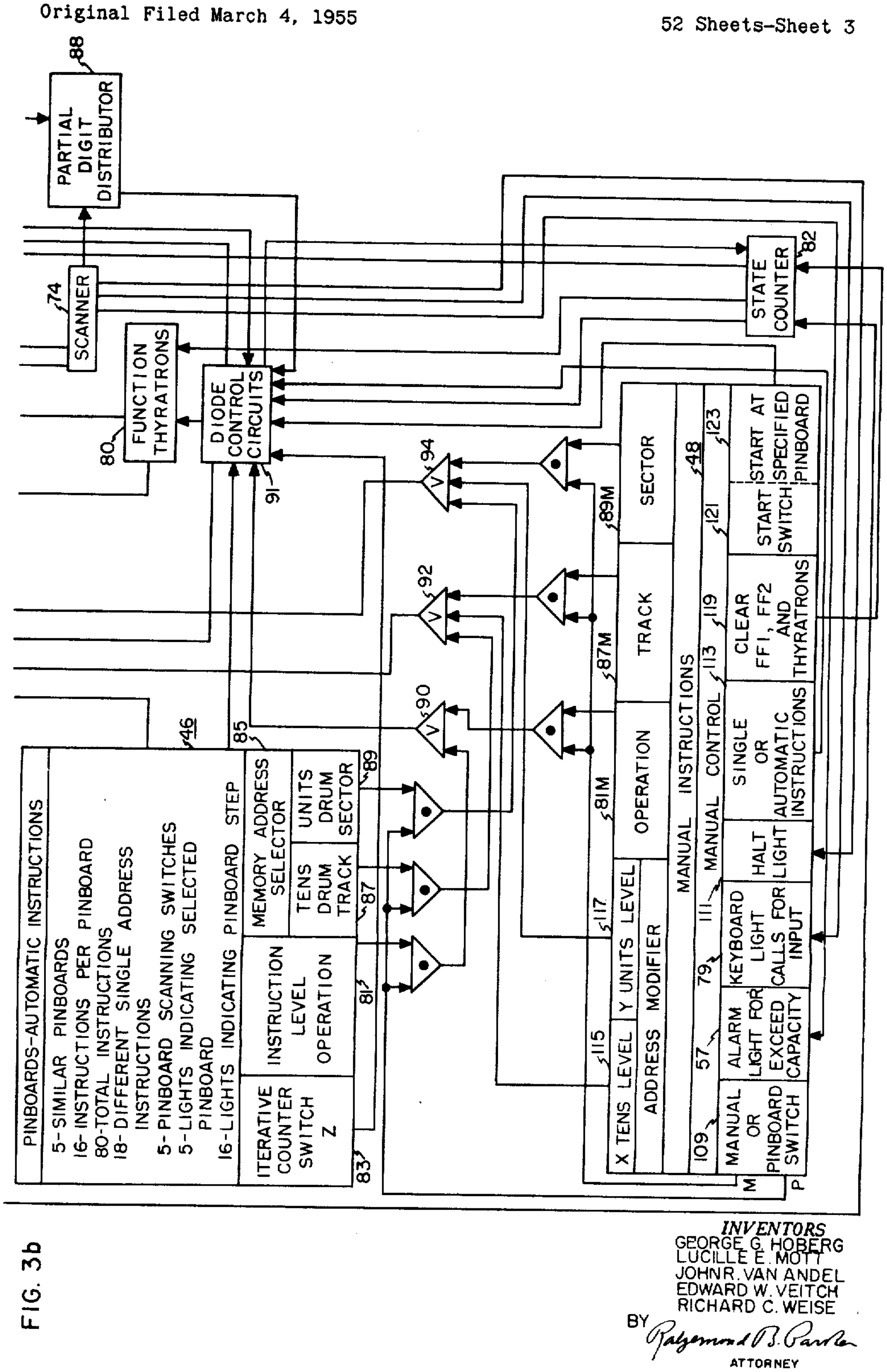
Figure 4:
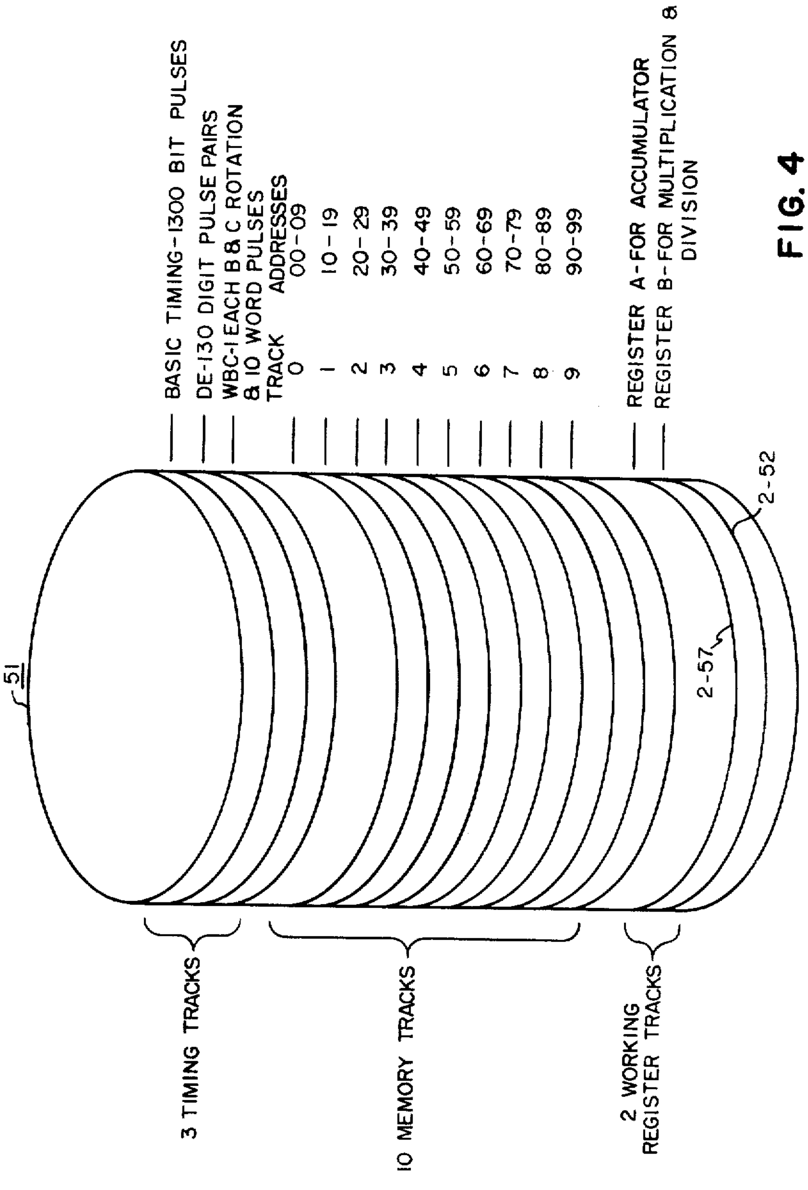
Figure 5:
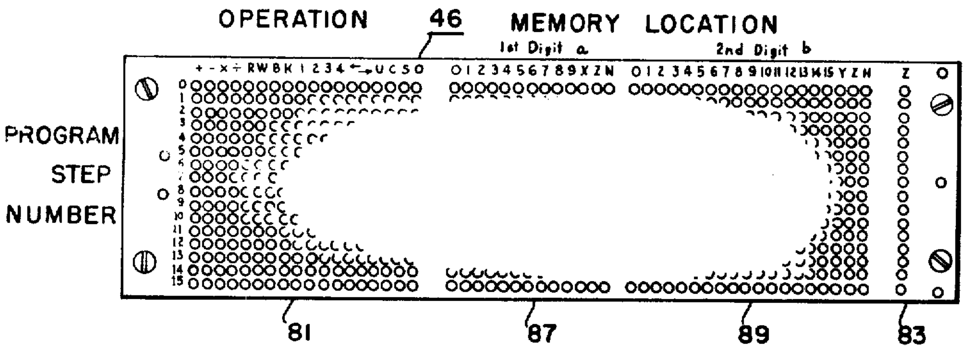
Figure 6:
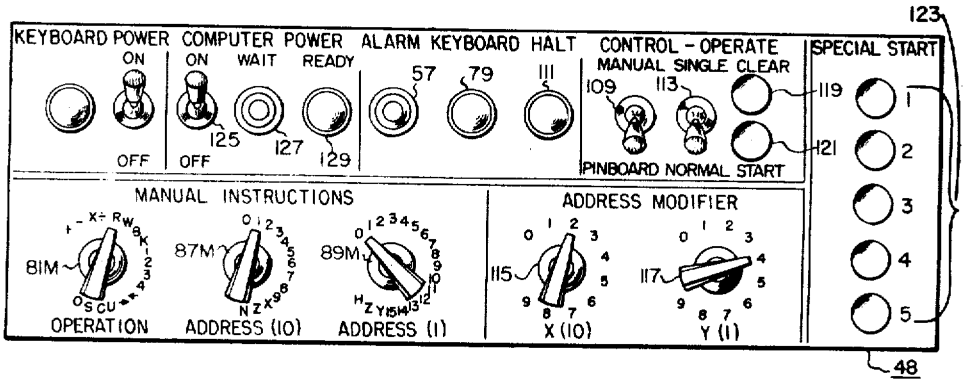
Figure 7:
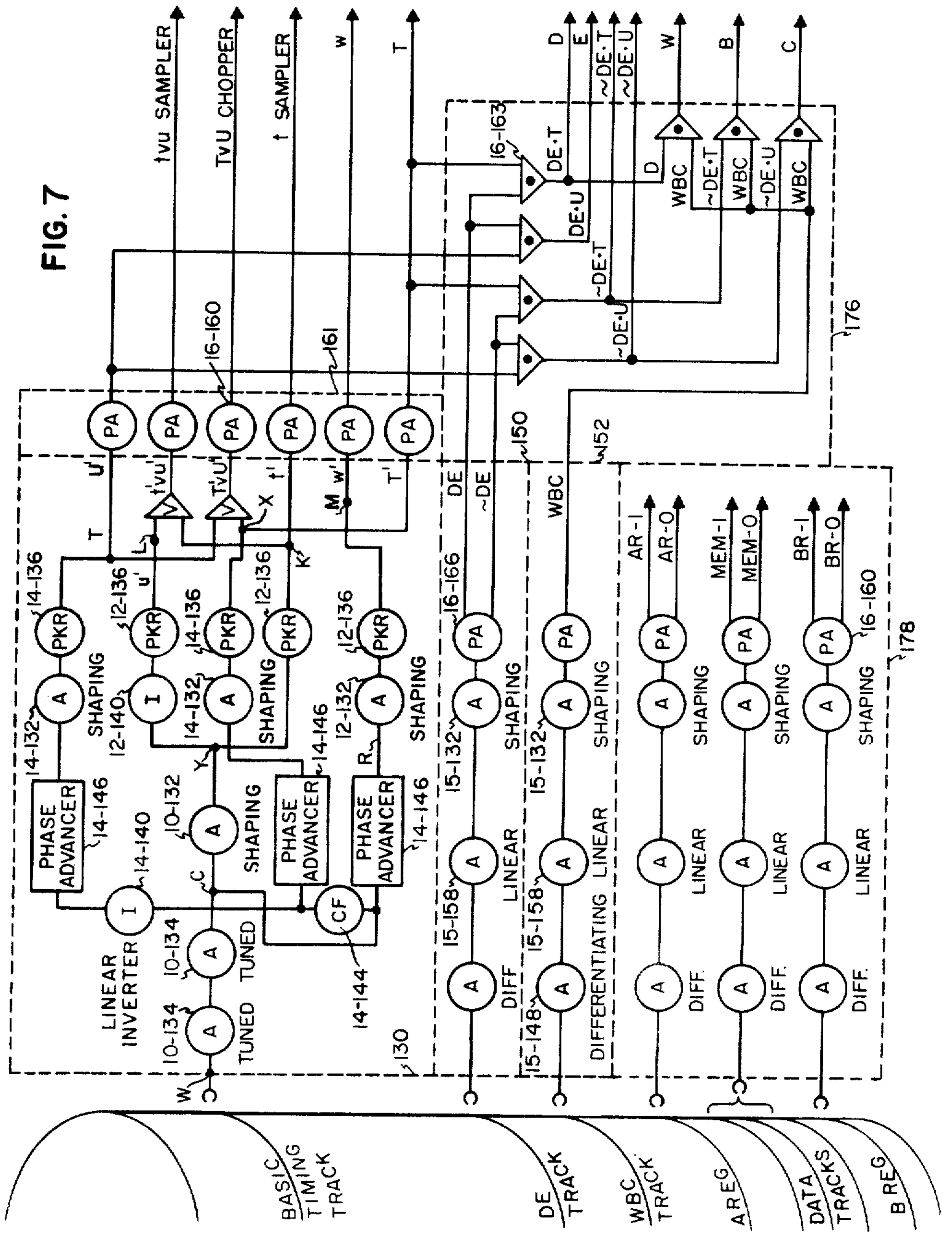
Figure 8:
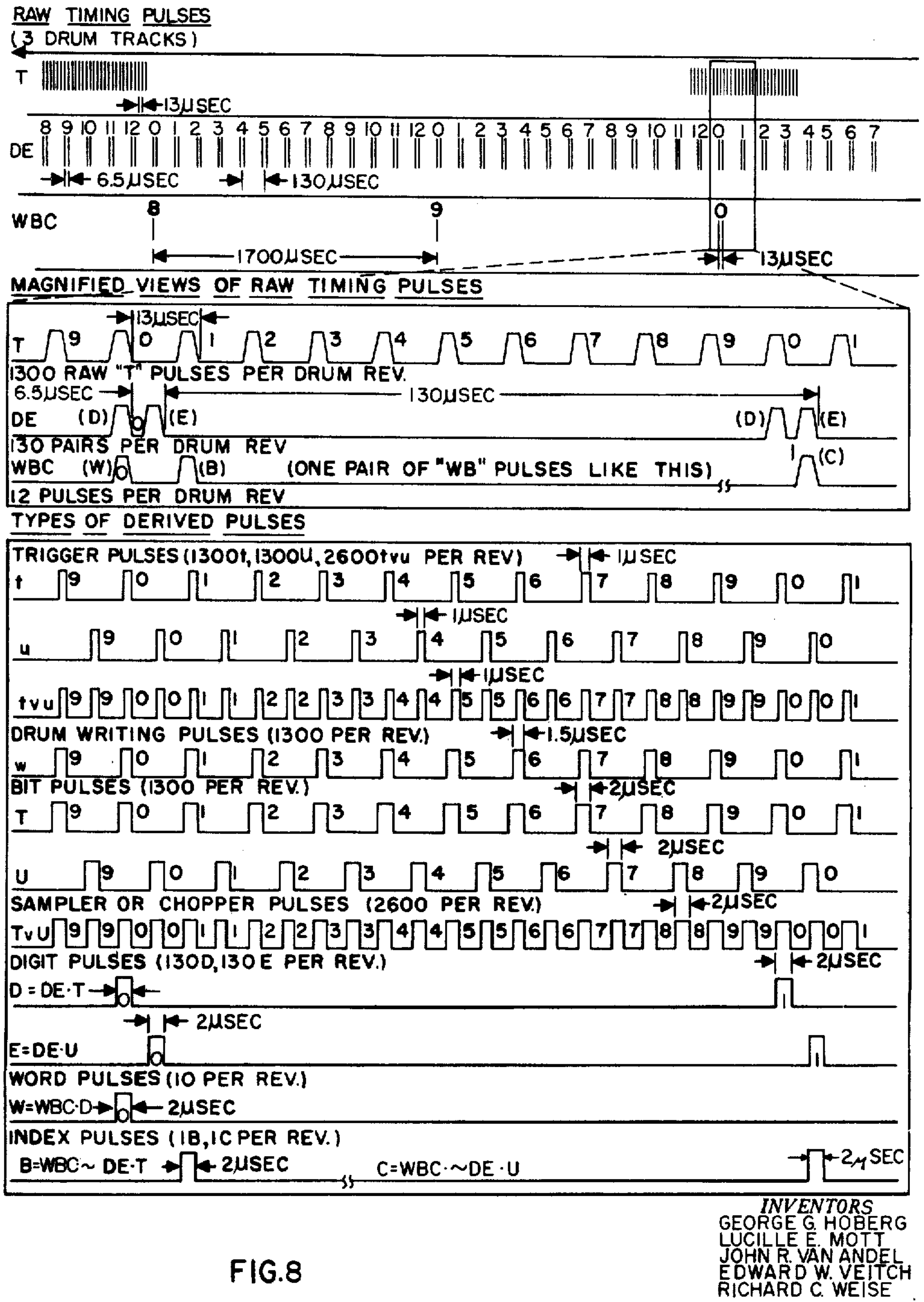
Figures 17A, 17B:
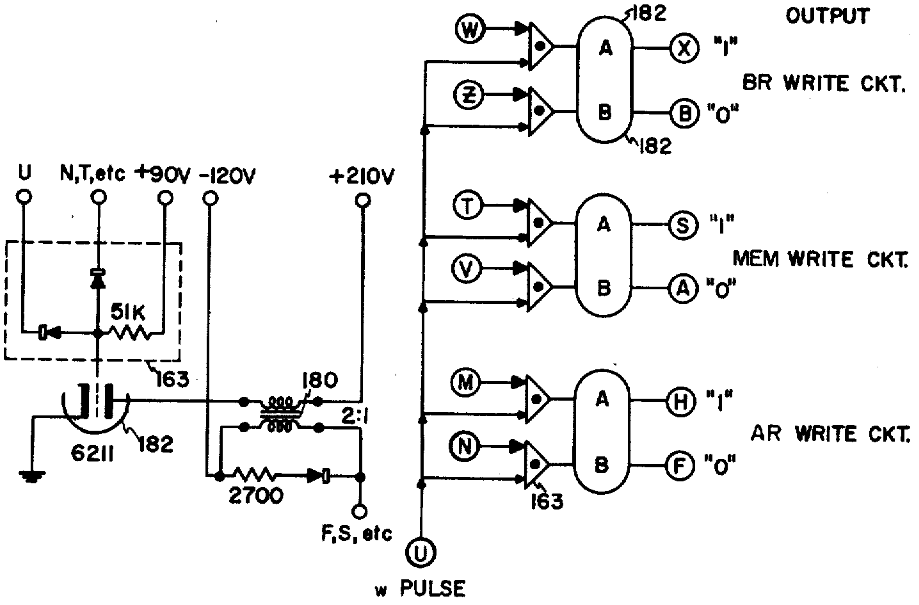
Figure 18:
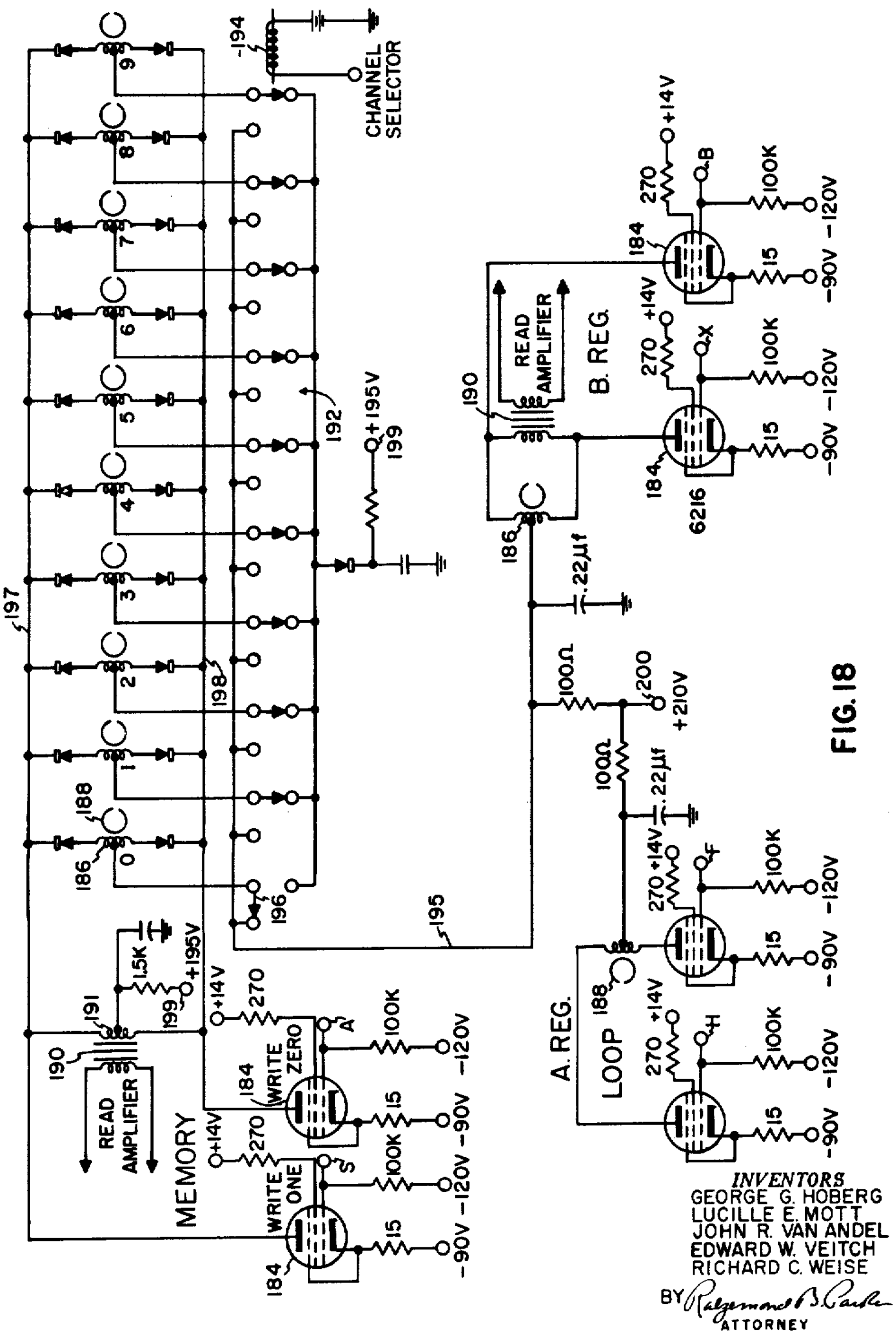
Figures 19, 19A:
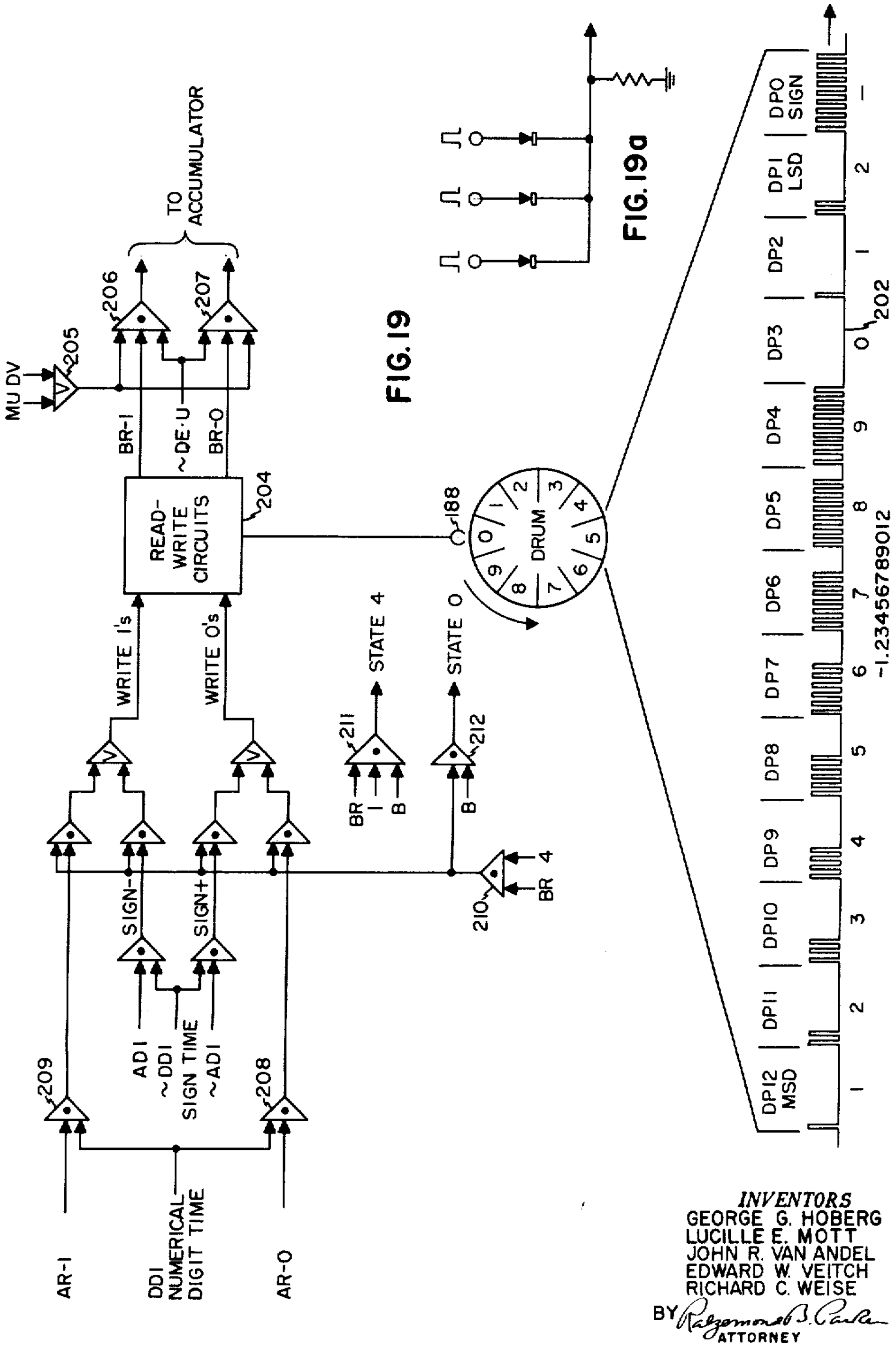
Figure 20:
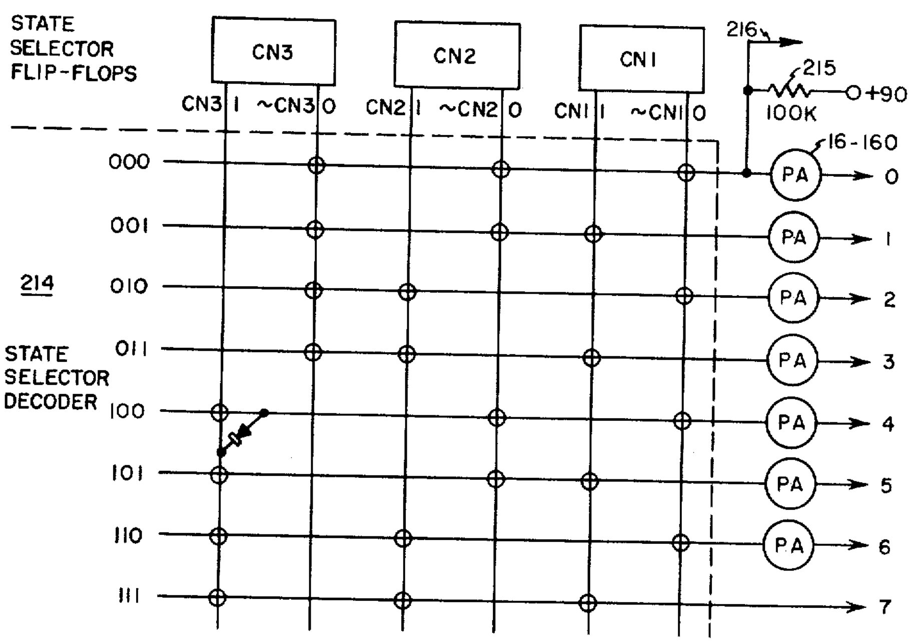
Figure 21:
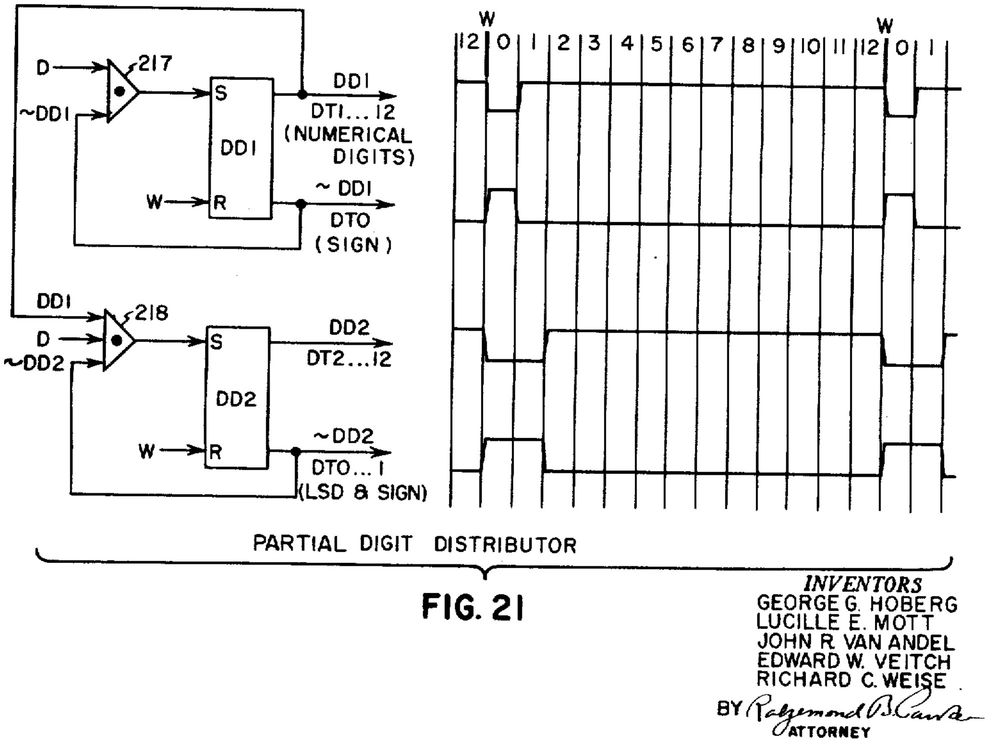
Figure 22:
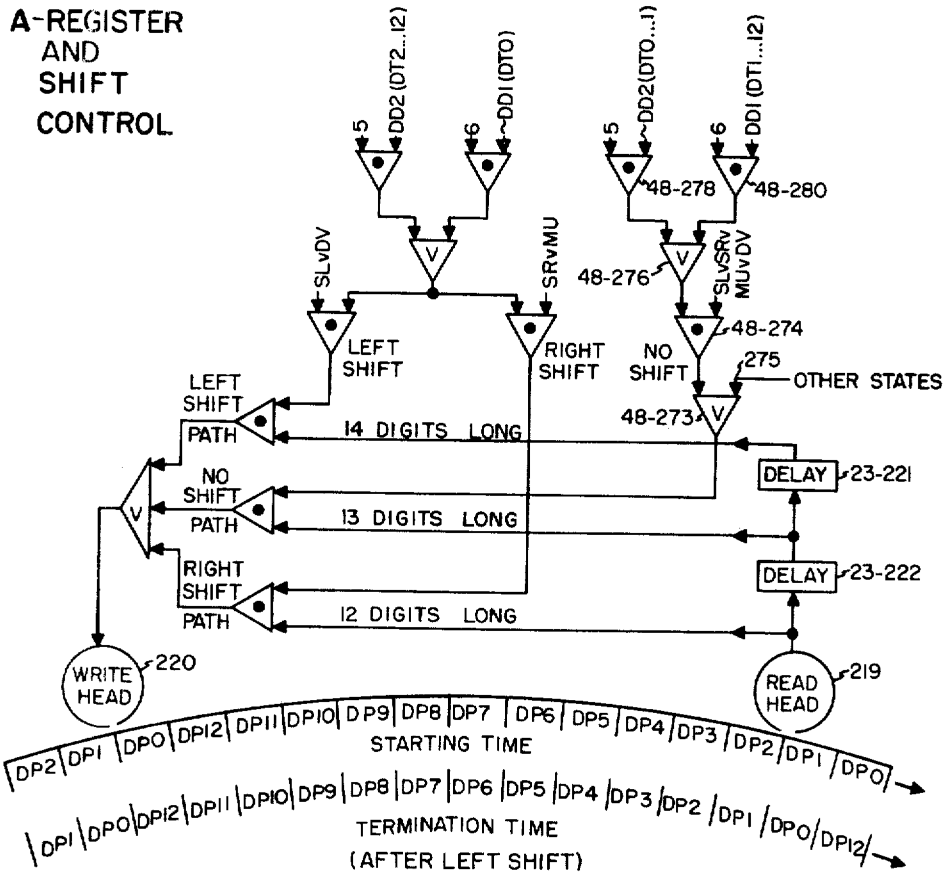
Figure 27:
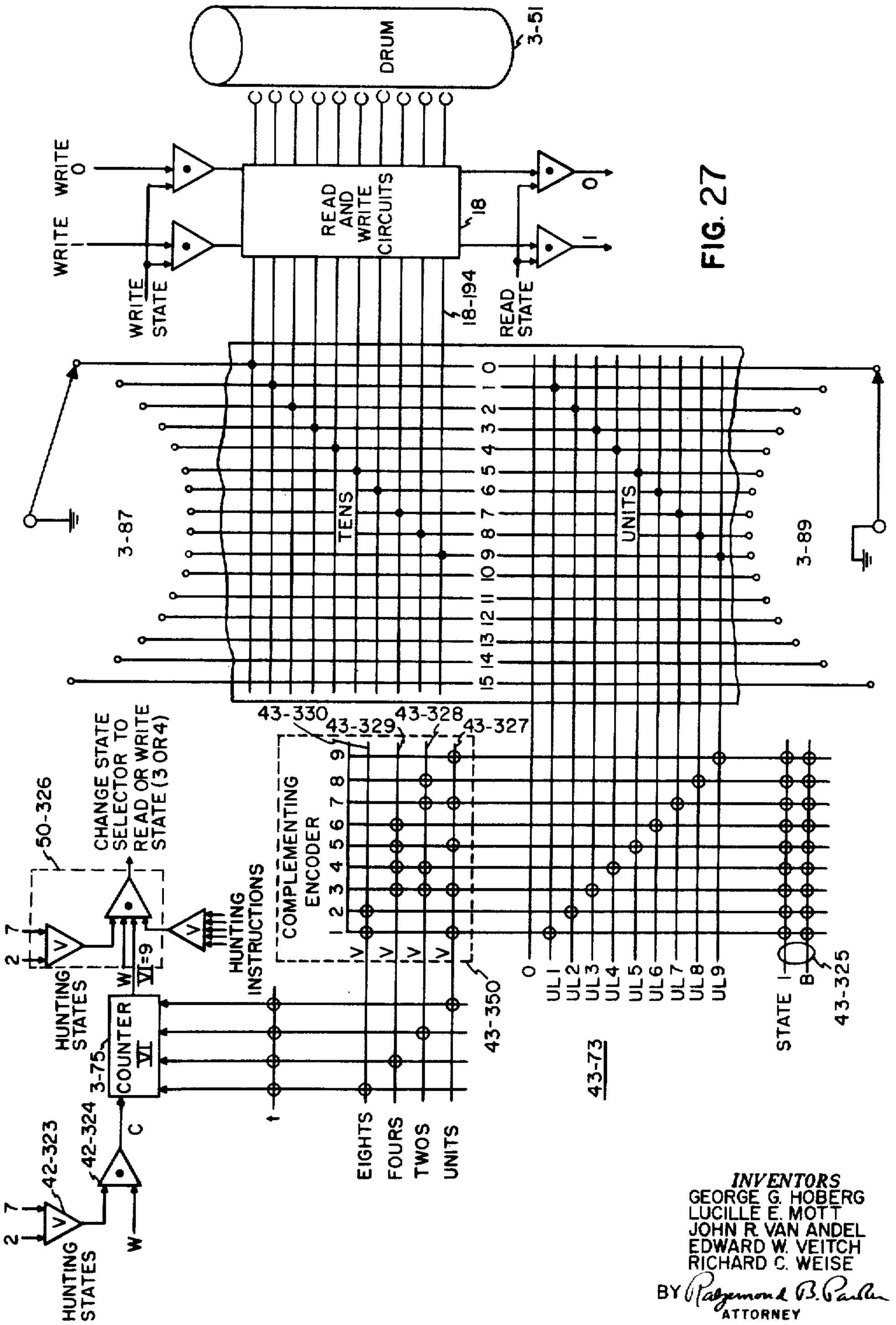
Figure 28:
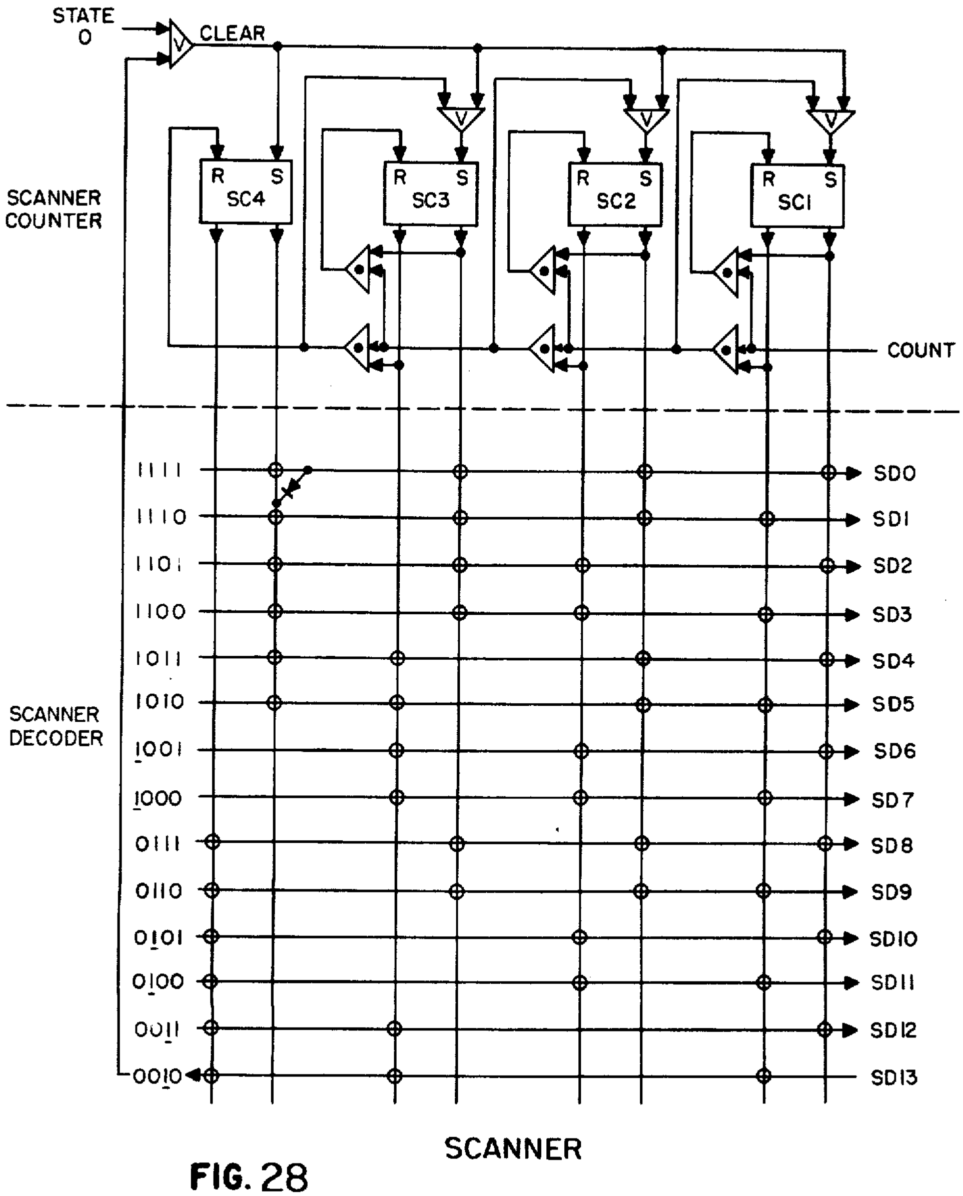
Figure 29:
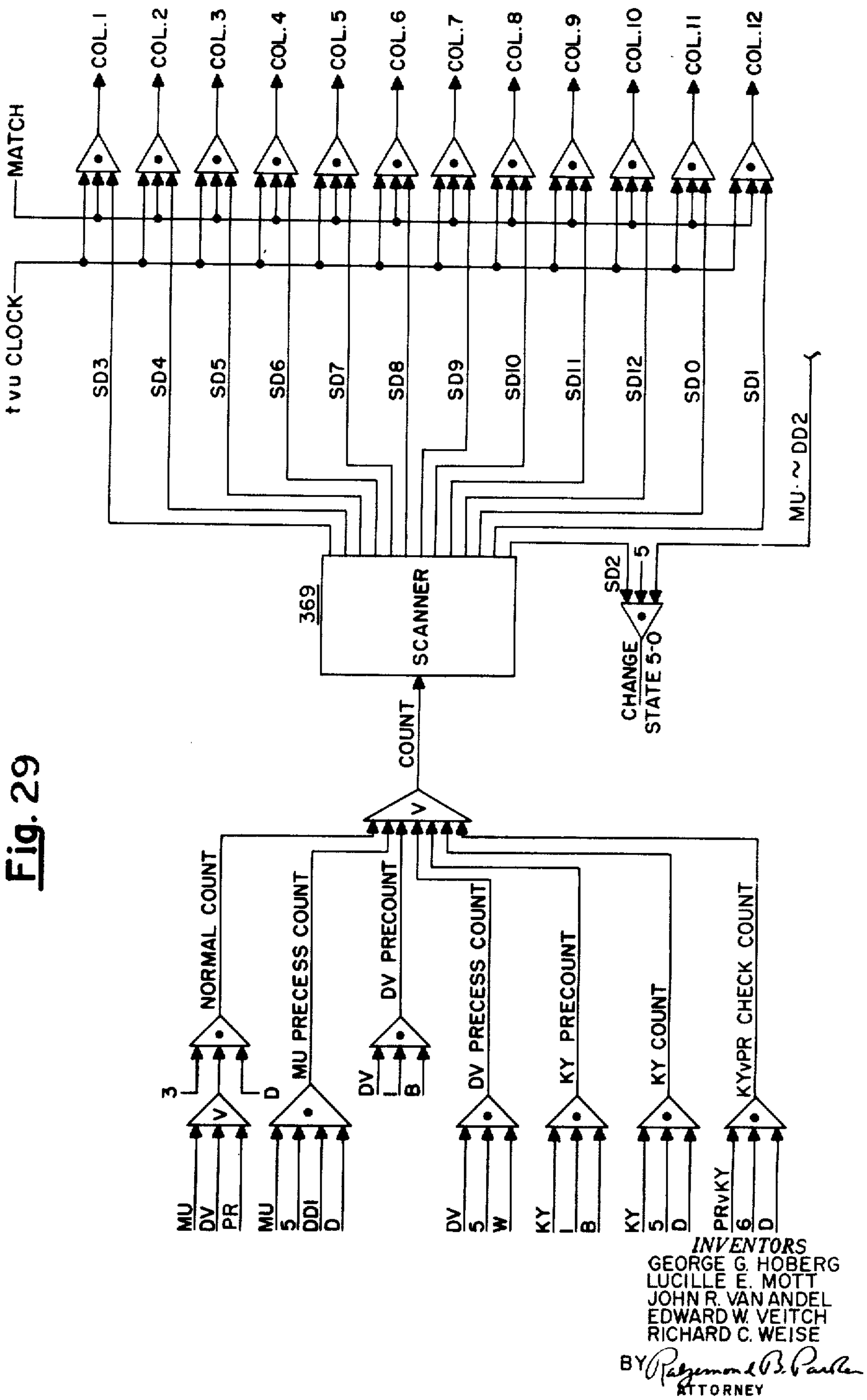
Figures 31, 33:
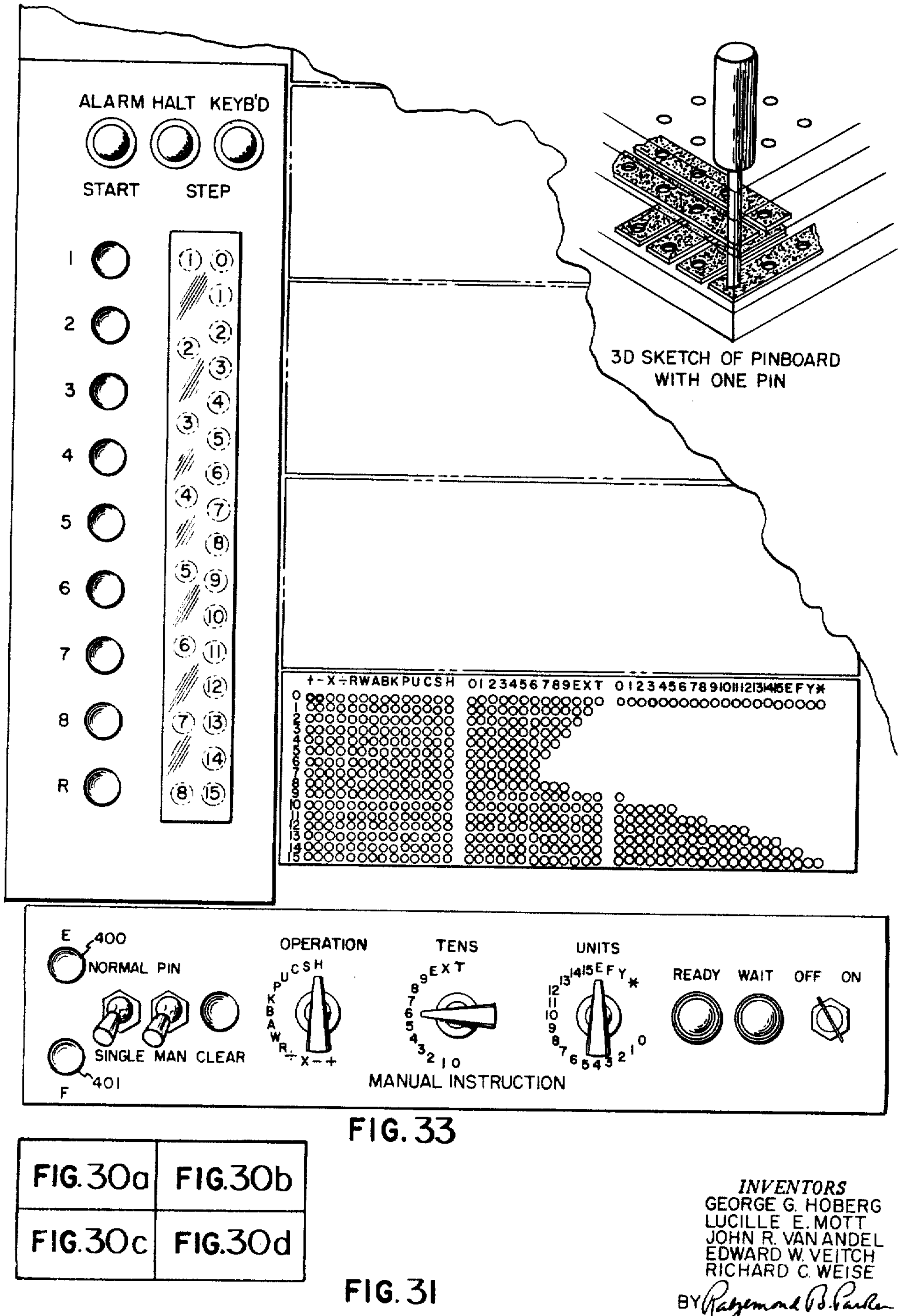
Figure 32:
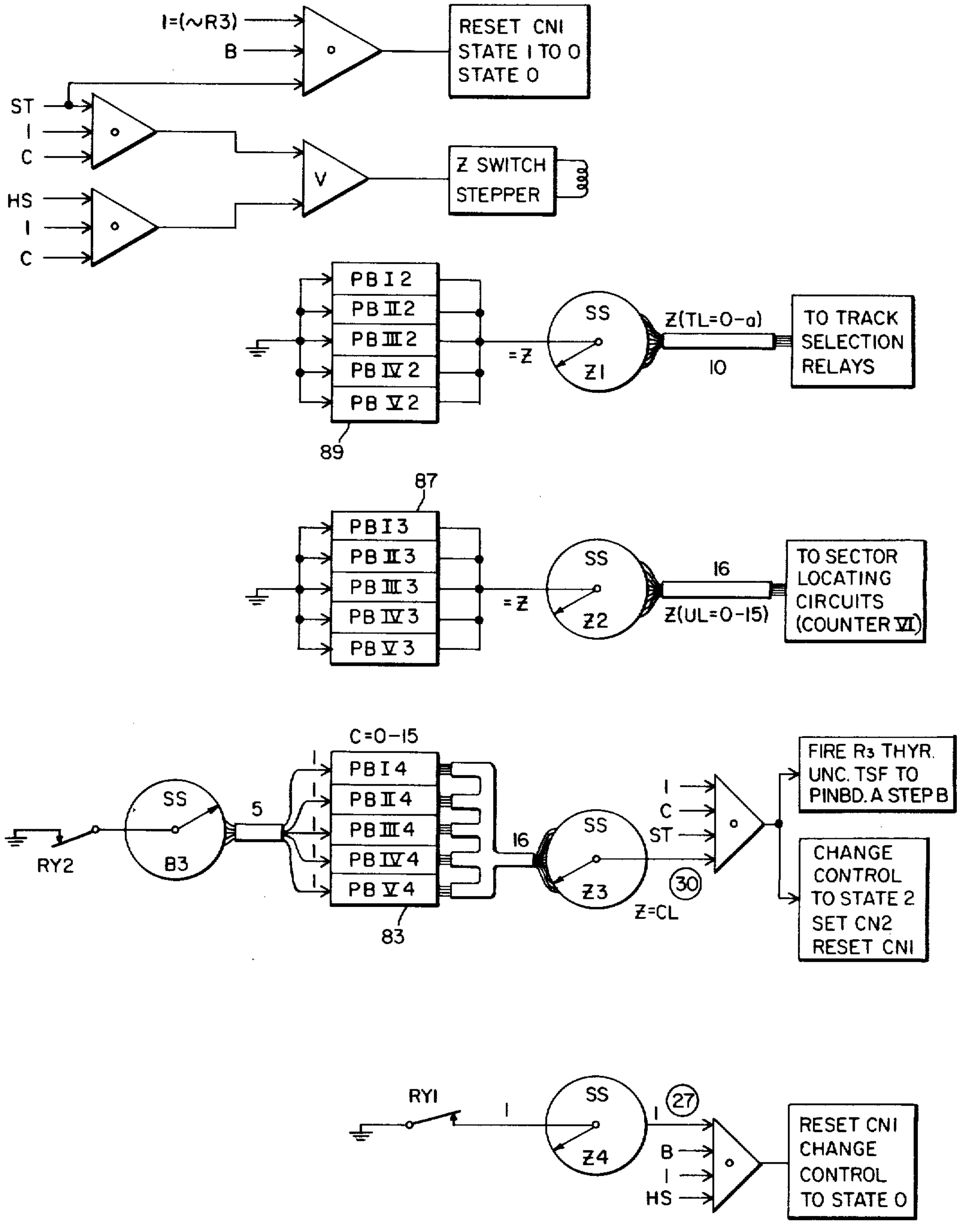
Figure 37:
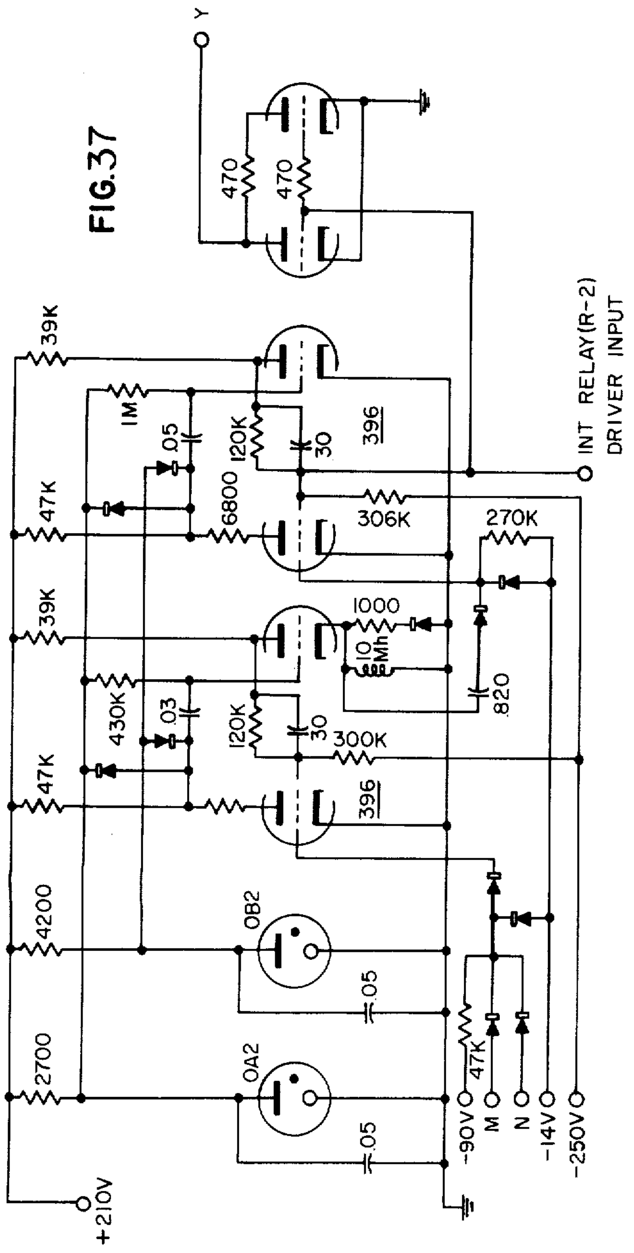
Figure 38:
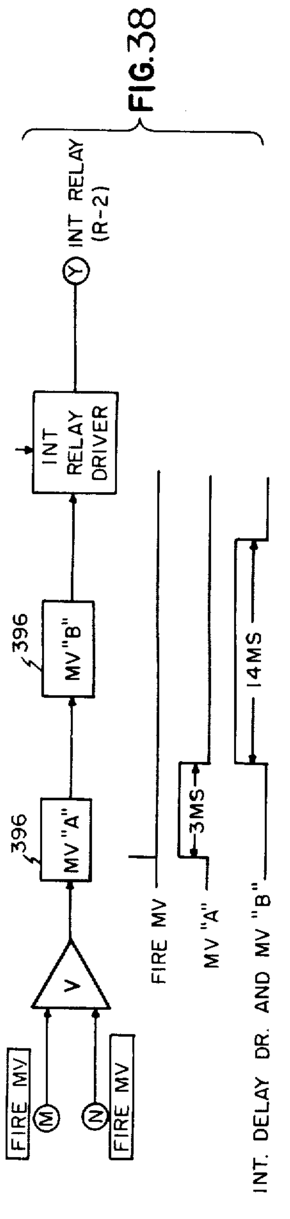
Figure 39:
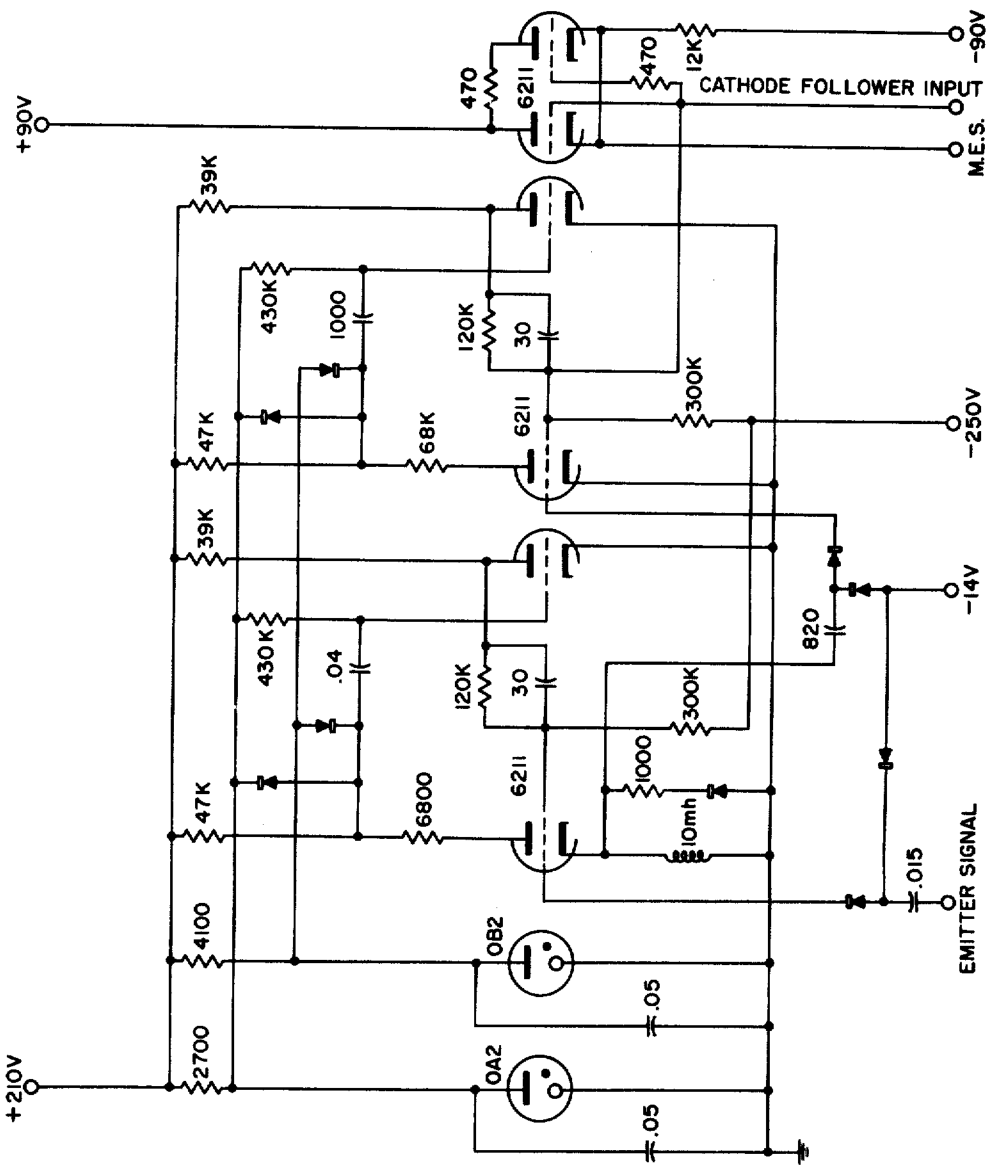
Figure 40:
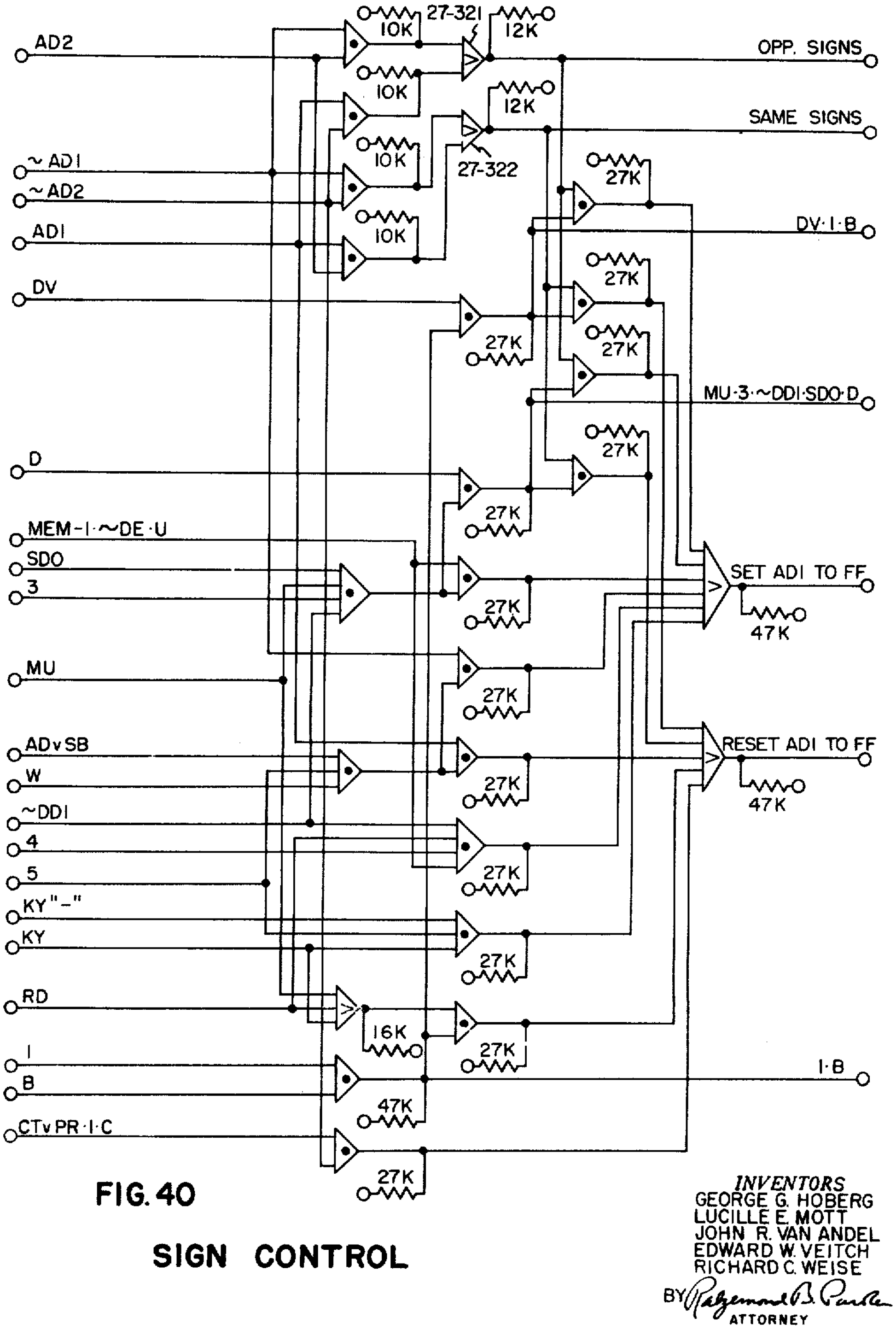
Figure 56:
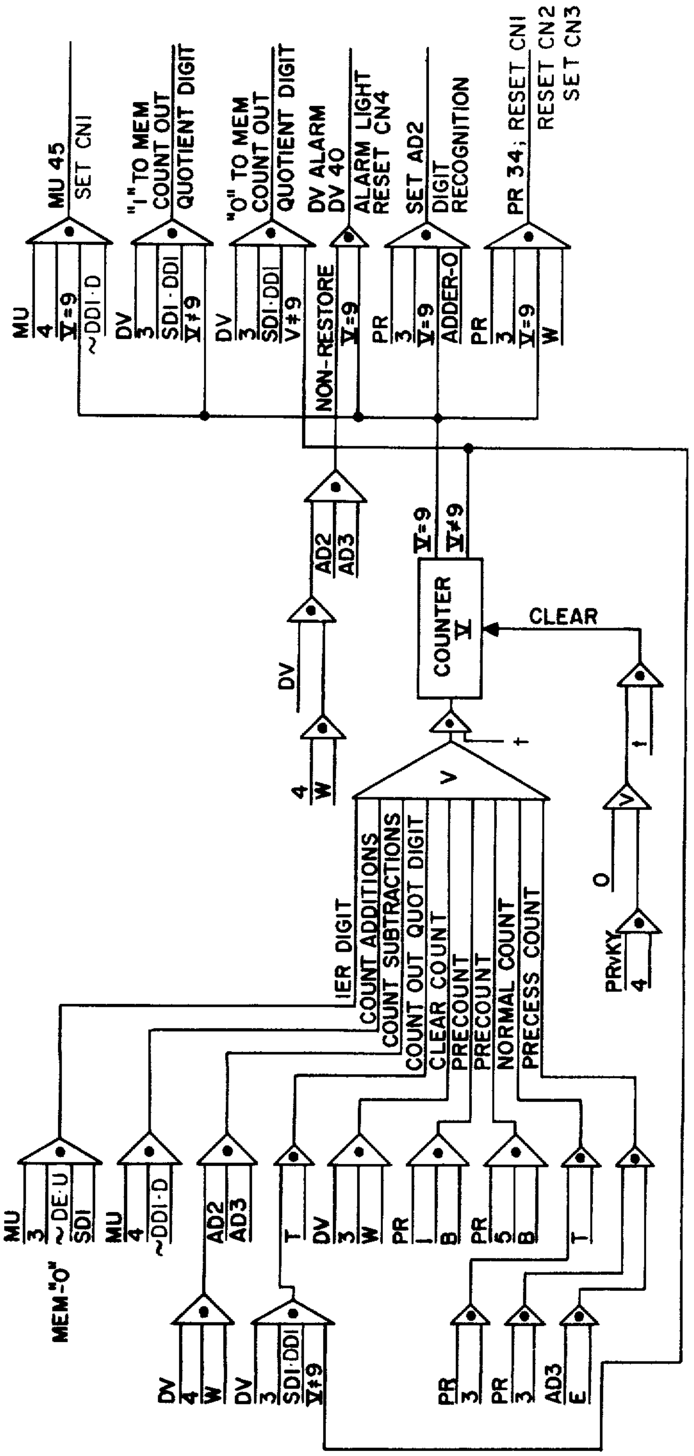
Figure 57:
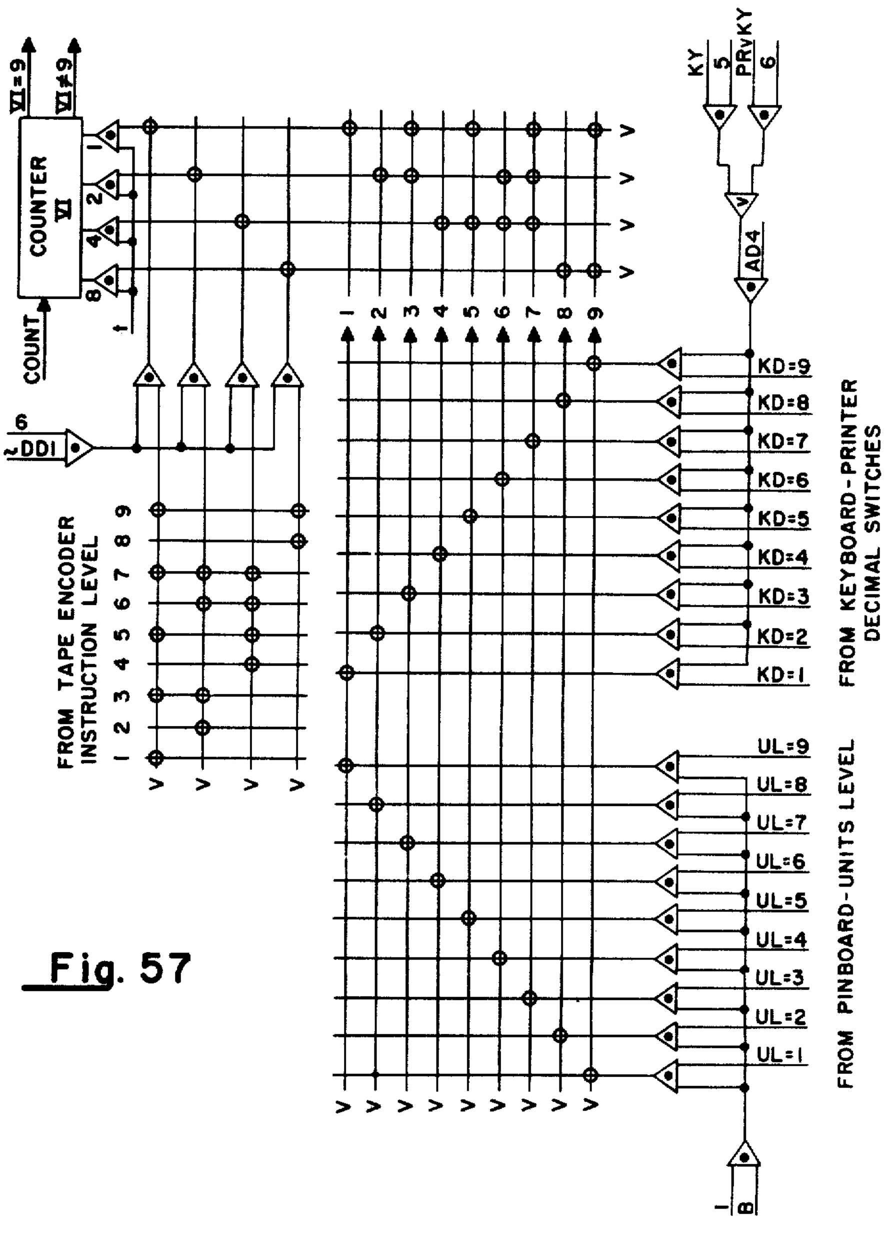
Figure 58:
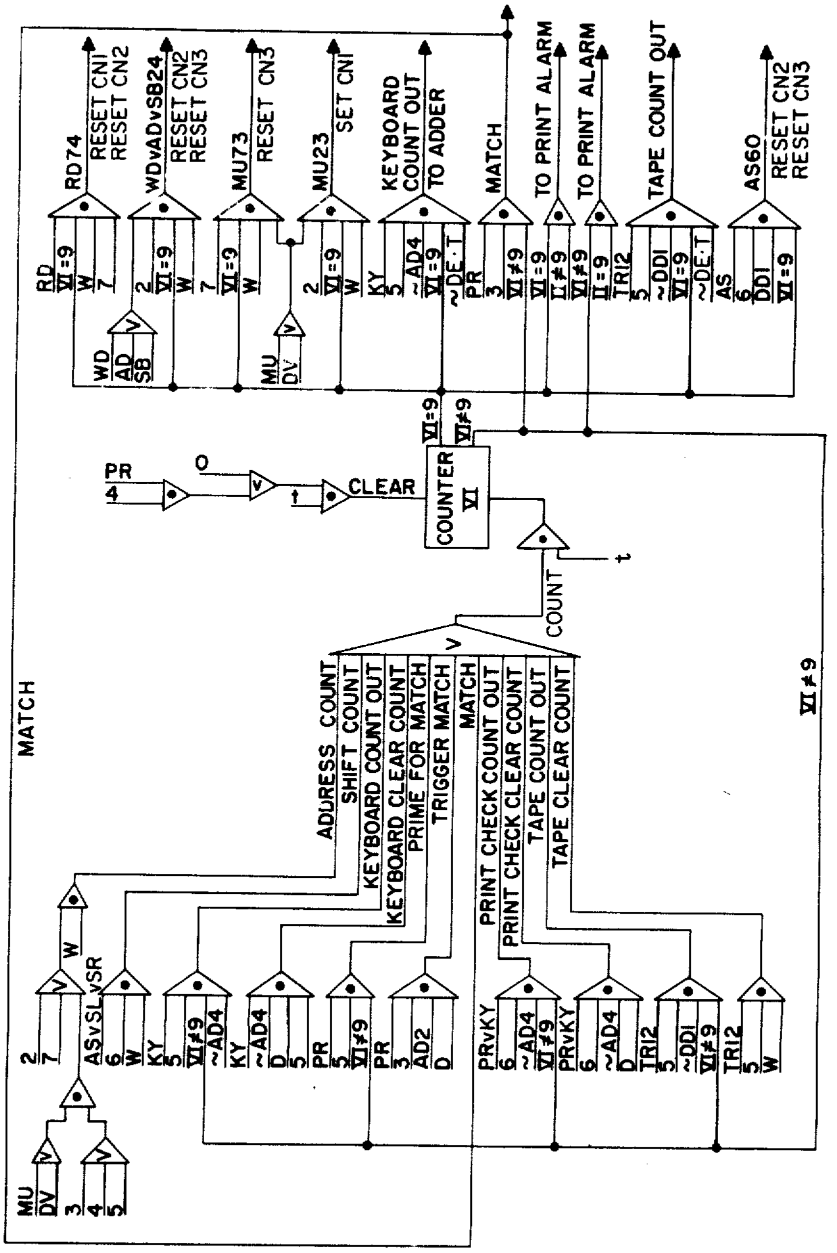

FIGS. 3*a* and 3*b* show in more detailed block diagram form the relationship of different functional units of the computer;

FIG. 4 is a diagrammatic view of a magnetic drum memory device of the computer;

FIG. 5 is a plan view of a pinboard used for programming the computer;

FIG. 6 is a plan view of the computer manual control panel;

FIG. 7 is a logical block diagram of signal processing circuits for stored timing and data information;

FIG. 8 is a waveform diagram of timing pulses used in the computer for scheduling operation;

FIGS. 9 through 16 are detailed diagrams of data processing circuits shown in FIG. 7;

FIGS. 17 through 19 are schematic diagrams of memory reading and writing circuits;

FIG. 20 is a logical block diagram of the computer state selector circuit;

FIG. 21 is a combined block waveform diagram of a digit distributor circuit used in the computer;

FIG. 22 is a shift control circuit in block diagram form;

FIGS. 23 to 26 are circuit diagrams of different aspects of the accumulator system used in the computer;

FIG. 27 is a diagrammatic representation of address selection circuits;

FIGS. 28 and 29 are circuit diagrams of digit presentation means for identifying different digits of a computer word;

FIGS. 30 and 31 are control circuit diagrams of the control and instruction scanning portions of the computer;

FIG. 32 is a simplified control diagram of special address selection circuits operable in the instruction scanning process;

FIGS. 33 to 36 illustrate alternative address selection means which may be used with the computer;

FIGS. 37 to 39 are circuit diagrams of computer control circuits operable with the instruction scanning circuits;

FIGS. 40 through 55 are detailed logical diode networks used in processing control and data signals within the computer; and FIGS. 56 through 58 are logical circuit diagram embodiments of counter input and output conditions.

In order to facilitate comparison of circuits throughout the computer, like elements are given similar reference characters. In the detailed description of the computer system the reference characters are referred to the figures in which they are shown by a prefix numeral, and likewise cross reference is made from reference characters of one figure to another, wherever convenient. Wherever possible, to simplify notation, alphabetical reference characters are used on terminals and localized elements. In view of the complexity of the system descriptive legends are used in connection with some of the figures to enable corresponding circuitry to be compared without detailed reference to the specification. Also sub-headings are used in the specification to more readily direct attention to different sections of the computer system.

Figure 1:
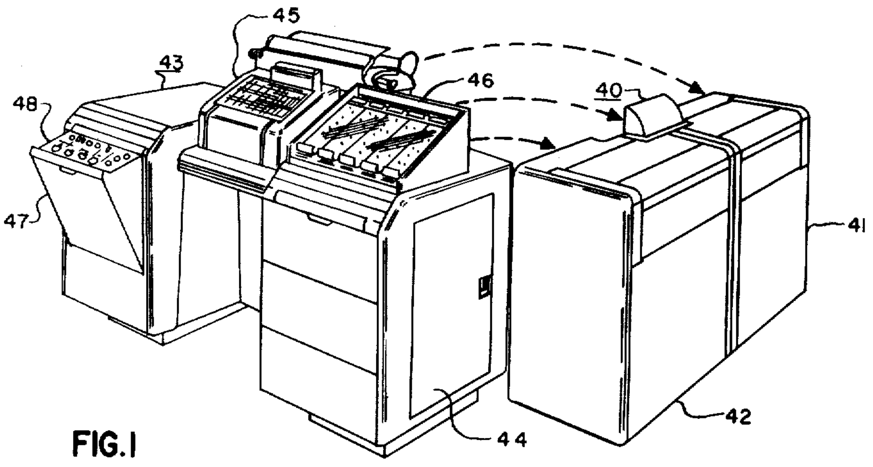
FIG. 1 is a perspective view of the electronic computer console.

In FIG. 1 is shown a perspective view of the desk-size computer console. A ventilated rear cabinet housing section 1–40 contains the electronic computer circuits which are generally mounted on standardized plug-in circuit units. The circuit housing section 1–40 pivots open for ready access in servicing the interior elements, and is further provided with removable cover sections 1–41 and 1–42 for access to circuits exposed at the rear of the cabinet.

The desk section 1–43, in general, houses the power supply and memory units, which are accessible through opposite end panels 1–44. On the desk top is affixed an input-output unit 1–45 herein identified as a keyboard-printer and a visible control panel 1–46 employing removable pins into which is programmed the automatic instruction sequence to be performed by the computer. A pivoted compartment drawer 1–47 houses a manual control panel 1–48, which may be used for setting up operation conditions in the computer and for modifying the automatic instruction sequence.

Figure 2:
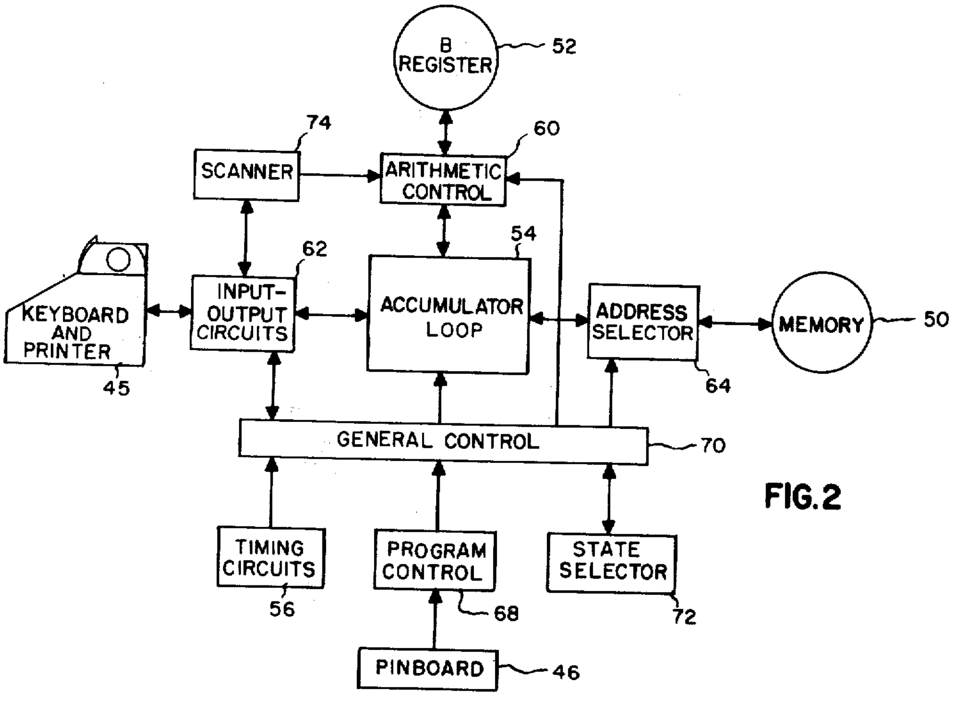
FIG. 2 is a generalized block diagram of the several functional computer sections.

The block diagram circuit of FIG. 2 illustrates the overall operational relationship of different computer units. The computer units are shown in functional rather than physical relationship. For example, the memory unit 2–50 comprises several tracks of a rotating magnetic disc or drum, while the B register 2–52, and accumulator loop 2–54 each comprise further single tracks on the same rotating storage device. The timing circuits 2–56 may be also actuated from timing signals synchronized with further tracks upon the rotating storage device. Input-output circuits 2–62 are provided to assure that the electronic computer timing circuits 2–56 and the keyboard and printer 45, which has an independent operating cycle, are synchronously sensed. In this way separate buffer memory devices are eliminated. The keyboard and printer 45 with its internal operation cycle includes further transistion timing cam means not associated with the block 2–56 for enabling the transfer of information between the keyboard and printer unit 45 and the synchronously operated computer circuits. In this respect the more detailed presentation of FIGURES 3*a* and 3*b* shows that the timing cam produces rack stop signals at section 3–49 which under control of the multivibrator 3–76 serves to time the firing of the rack stop thyratrons 3–77 in response to signals at the accumulator 3–59 or read-write circuits 3–55 when accompanied by the readout instruction.

All arithmetic operations are under control of circuits within the arithmetic control unit 2–60 or the general control unit 2–70, and all data transfers through the input-output circuits 2–62 and address selector unit 2–64 make use of the accumulator loop 2–54, which comprises a regeneratively controlled data track upon the rotating storage device. The arithmetic operations are scheduled by a program set up in the pinboard 46. Each program sequence may be automatically scanned step by step with the program control circuits 2–68. The arithmetic control unit 2–60 and B register 2–52 are used primarily for multiplication and division operations, and the general control circuits 2–70 are used to schedule each of the several operations for which the computer is designed. The general control circuits operate from a scheduled selection of eight different computer states set up by the state selector unit 2–72.

The scanner unit 2–74 counts the decimal digits of a numerical word. It is used to enable the keyboard digit to be read into the accumulator synchronously, and also is used in multiplication and division to choose the proper multiplier and quotient digits respectively. Thus, the input keyboard-set signal may be statically held until used and therefore internal storage registers are unnecessary for the input word.

A more detailed block diagram organization of the computer is shown in FIGS. 3*a* and 3*b*. The heavy lines of FIG. 3*a* indicate information processing paths, whereas the lighter lines indicate control signal paths. As with FIG. 2, each of the block units of FIG. 3 will hereinafter be described in detail and will be identified in different figures where feasible with similar reference characters. The computer described in FIGS. 3*a* and 3*b* has functional block units assembled in a computer circuit typifying the details of a typical model of a computer constructed in accordance with the invention. Thus, it is readily seen that the typical details described in connection with some of the units may readily be modified by those skilled in the art without departing from the spirit or scope of the present invention. Certain such specific departures such as the amount of storage and number of instructions available in different computer models will be later described. The block diagram is discussed hereinafter in two separate phases, e.g., Data Processing and Control Circuits to simplify the presentation.

*Data Processing*

In the rotating magnetic memory unit 3–51, each data word has twelve decimal digits plus sign and is stored in serial form so that the sign may be read first and then the least significant digit, etc., as shown in FIG. 19. Each digit is stored in pulse-count form with 10 memory bit cells allocated for each digit. The tenth spacer cell located between two successive digits is *not* used for bit storage since the digits from zero through nine need only nine of the ten available bits.

A typical rotating memory device is the magnetic drum 51, which is diagrammatically shown with associated memory tracks in FIG. 4. This magnetic drum when rotated at about 3600 r.p.m. provides scanning time for one track revolution of about seventeen milliseconds. Thus, the access time for one of the ten words stored in equidistant peripheral arcs or sectors around each track is about one and seven *tenths* millisecond.

The data memory comprises ten drum memory tracks each storing ten words for a total of one hundred word memory. Each track is given an address comprising a tens decimal digit (10′) and each word sector is given an address comprising a units decimal (10°) so that the entire one hundred word memory address may be signified by a decimal number from zero to ninety-nine. Each data track has a separate magnetic read-write head which is selected by the head switching circuits 3–53 under control of a programmed address track selector digit. The decorded drum information, which is read, is then passed on to the read and write circuits 3–55 for amplification and processing. Likewise, computer information to be written on the memory is passed through the read and write circuits 3–55.

The drum, in addition to the memory tracks, is provided with two working register tracks. The B register track 2–52 has one word repeated ten times for use as the multiplicand or divisor in the multiplication and division operations. Thus, each multiplier word has a read time of one and seven tenths milliseconds, and reading from the drum may start at the closest word position. The A register track 3–57 is a circulating one word track, which also provides a read time of one and seven tenths milliseconds from the start of the word. This track 3–57 is connected in the accumulator loop to serve as an accumulator register.

Three separate timing tracks are provided in the timing storage memory sections 3–78, for the bit, word, digit and rotation timing or flag pulses. There are 1300 bit timing pulses on the basic track thus serving to produce a 78 kilocycle basic computer operating frequency. This provides for ten words of twelve decimal digits plus sign in the pulse-count notation on each track. The WBC track produces ten word pulses and one each B and C rotation or flag pulses, which are distinguished in the manner shown in the timing chart explained hereinafter in connection with FIG. 8. The B pulse coincides in time with the T pulses on the basic timing track and the C pulse is spaced between two T pulses for presentation at U time one half drum revolution from the B pulse. It may be noted in FIG. 8 that the time axis for the pulses derived from the WBC track is broken to show the C pulse which occurs half a drum revolution, or 650 bit timing T pulses, later than the B pulse. It will appear from the above that the C pulse thus occurs five words later than the B pulse, each word having 13 decimal digits of ten bits each. The DE timing track provides 130 digit pulse pairs for each drum rotation. Thus another W pulse occurs simultaneously with a D pulse shortly before the C pulse occurs. To make the C pulse come at U time instead of T time, the C pulse of course has to occur slightly longer after its W pulse than did the B pulse after its W pulse. This additional delay of the C pulse also prevents coincidence of the C pulse with an E pulse, as is necessitated by the logical operation for isolating the C pulse, represented at the extreme lower right corner of FIG. 7. The same logical operation is summarized in the graph on the right side of the bottom line of FIG. 8, where the time axis also is broken and does not coincide with most of the other graphs on that figure but does coincide with the timing of the C pulse shown on the WBC track, mentioned above. The timing signals are passed from the timing track section 3–78 through the read and write circuits 3–55 to the timing circuits 3–56 which are used to synchronize operations by gating signals at local circuit positions throughout the computer.

For translation of data between the rotating memory 3–51 and other computer units all data is processed through the read and write circuits 3–55 and the accumulator 3–59. The accumulator principally comprises a serial pulse-count adder circuit, which is coupled in a loop circuit with the A register memory track 3–57 through the shifting circuits 3–61 and writing section 3–63. Data may also be transferred between the memory unit 3–51 and the keyboard and printer 45 by way of the accumulator 3–59 and writing section 3–63.

The keyboard and printer 45 may be incorporated in a standard business machine of the type described in the United States Patent No. 2,629,549, issued February 24, 1953, to T. M. Butler for "Automatic Function Control Mechanism for Accounting Machines." This machine provides a selectable printed format control from a semiganged high speed printer by means of a mechanically programmed control tray in the machine. Thus, a printed page may be produced directly from the electronic computer circuits in any desired type of format. Each printed output word will have twelve decimal digits plus sign and the keyboard has eleven input digits. The read-out conversion from the business machine keyboard to an electronic circuit is accomplished by read-out switches 3–65 as described and claimed in the copending application for United States patent for "Switch Mechanism" by William Ward Deighton filed January 6, 1955, Serial No. 480,266, and assigned to the same assignee as the present application. The read in section 3–67 transfers data from electronic computer circuits to the printer by means of solenoids 3–69 which serve to stop the business machine printing racks in a desired position in the manner described in U.S. Patent No. 2,822,752, issued February 11, 1958, to R.S. Bradshaw et al. for "Indicating Apparatus." Since the business machine operates on its own internal read-out and print cycle which is asynchronous with the operation of the rotating magnetic memory in the computer, the control cam and tappet solenoid section 3–71 is provided for transition timing of the keyboard and printer operations with the function thyratron circuits 3–80 and the state counter 3–82 shown in FIG. 3*b*. This control section 3–71 is described in the U.S. Patent No. 2,836,355, issued May 27, 1958 to O. W. Banik et al. for "Remote Function Control System."

Data is transferred from the keyboard through read-out switches 3–65 and by way of the counter VI input circuits 3–73 (also shown in FIGS. 57 and 58) and the sector address counter 3–75 to the accumulator 3–59. Conversely, data is transferred from the computer to the printer from the writing section 3–63 through the rack stop thyratron circuits 3–77 and the rack stop solenoids 3–69.

All of the data processing units and paths described may be placed under control of either automatic or manual computer sections 3–46 or 3–48 by instructions designated as follows:

+ *ab*—Add the contents of the memory location *ab* to the contents of the accumulator.
— *ab*—Subtract the contents of the memory location *ab* from the contents of the accumulator.
× *ab*—Multiply the contents of the B register by the contents of the memory location *ab* and place the answer in the accumulator.
÷ *ab*—Divide the contents of the accumulator by the contents of the B register, store the answer in the memory location *ab* and leave the remainder in the accumulator.
R *ab*—Read the contents of the memory location *ab* into the accumulator.
W *ab*—Write the contents of the accumulator into the memory location *ab*.
←*b*—Shift the contents of the accumulator left *b* places ($0 \leq b \leq 9$), with a shift of ten places if *b* is zero.
→*b*—Shift the contents of the accumulator right *b* places ($0 \leq b \leq 9$), with a shift of ten places if *b* is zero.
B—Transfer the contents of the accumulator into the B register.
K—Transfer the contents of the keyboard into the accumulator when the motor bar is depressed.
P 1, 2, 3, 4—Print the contents of the accumulator, using the designated motor bar.
P (1, 2, 3, 4) N—Read-out without printing.
P (1, 2, 3, 4) H—Halt the computer after read-out.

Other instructions exist which will be described hereinafter but all the above instructions involve processing data through the accumulator loop in the manner described by the block diagram of FIG. 3*a*. A detailed operation schedule of the computer in performing these instructions will be discussed hereinafter.

Each pinboard 3–46 is consrtucted to receive one to four pins in any one of 16 rows to indicate the program step. The pinboard details are described and claimed in U.S. Patent 2,922,135, issued January 19, 1960, of George G. Hoberg et al. for "Electrical Pinboard Cross Connection Device." The pinboard layout is shown in the plan view of FIG. 5. Three main groups or sections of columns 81, 87 and 89 are provided respectively for receiving in each of 16 rows a separate pin for designating respectively the computer instruction and the first and second memory address digits *ab*. The latter two sections 87 and 89 are used for further sub-instructions and for designating pinboard numbers and rows with some instructions. A fourth section of one column 83 is used for a special Z switch instruction, which is hereinafter described.

*Control Circuits*

The timing circuits 56 of FIG. 3*a* are used to reform and gate signals throughout the computer to ensure operation upon the proper data and to maintain synchronism in the computer. The instructions for directing control functions are alternatively selected by the pinboard section 46 or the manual program control section 48 of FIG. 3*b*. The pinboard sections 46 of different computer models may be constructed with different numbers of automatically scanned instructions. The typical pinboard section described in this embodiment has five similar removable pinboards each having sixteen possible instruction steps thereby providing a total of eighty automatically scanned instructions.

The number of different instructions provided in the computer may also vary, but the nineteen different single address instructions of this embodiment are typical in a general-purpose computer of this type. Thus, in addition to the fourteen hereinbefore described data processing instructions, the following five control instructions and halt sub-instructions are provided by the pinboard instruction level operation designated 3–81 in FIG. 3*b*.

U *ab*—Transfer control unconditionally to pinboard a step *b*.
C *ab*—If accumulator contents are negative transfer control to pinboard a step *b*; if not, go to the next program step.
S *abc*—Step the Z switch once; if Z steps past *c* ($0 \leq c \leq 15$), transfer control to pinboard a step *b*.
0—Home Z switch to zero.
→H, ←H—Halt the computer.

Additional sub-instructions X and Y are provided in the pinboard sections 3–87 and 3–89 respectively to permit manual choice of the designated memory location by setting of corresponding switches. Thus, when X is pinned rather than a decimal number for the tens memory digit the computer selects the memory location manually set by the operator in the X switch 6–115 to afford programming flexibility.

To enable the operator to follow the computer operation, a series of indicators is provided as indicated in block 3–46. Each pinboard and each pinboard step has a designated indicator light. The pinboards and lights are commonly scanned by means of stepping switches, and thus the instruction step in progress is shown on the indicator lamps at all times. A typical display of usch lights for one computer model is shown in FIG. 6.

The Z switch operates as an iterative routine counter and comprises a sixteen position stepping switch. By means of the Z switch pinboard section 3–83 the number of desired iterations may be selected. The 0 instruction homes the Z switch after use so that further iterative counts may be pinned. Since this computer does not permit the passing of instructions through the arithmetic unit for processing, the Z switch is also set up for modifying instructions so that the same pinboard step may be used on successive passes to identify different memory locations. In this manner the automatic program storage capacity is effectively increased beyond the normal pinboard capacity. The Z column in both the second and third pinboard sections 3–87 and 3–89 is provided for this operation. If Z is set at 3 the operation +Zb will be treated as +3b, and the operation +ZZ will be treated as +33. Thus, on successive passes through a pinboard step, the instruction +aZ will automatically call for the successive drum addresses a-one, a-two and a-three. The Z switch may be used in programming problems for both counting the number of iterations and modifying the address at the same time if desired.

In performing its routines, the Z switch is coupled through the diode control circuit section 3–91 and to the transfer control circuit section 3–93 of FIG. 3a as later discused with FIGS. 30 to 32. In general, the control is performed in logical diode circuits with which flip flop circuits and decade counters are associated. The instructions going into the diode system comprise in general ground connections made through the stepping switches of section 3–93 and the pinboards 3–46. The decade counter circuits are used to hold data being processed. In the diode circuit section 3–91, the control pulses are gated against timing pulses to thereby produce sampled output signals of exact timing.

In order to maintain complete operator control over the computations, every pinboard instruction is duplicated in the manual control panel 3–48. A plan view of a control panel with a display of manual instructions corresponding to those of the manual control panel 48 of FIG. 3b is shown in FIG. 6.

With the manual override switch 6–109, control may be transferred from automatic pinboard operation to manual control as desired. The manual control panel 6–48 therefore has alternative manual switches 6–81M, 6–87M and 6–89M for replacing corresponding pinboard sections to permit a choice of instructions and addresses. Thus, at the mixer circuits 3–90, 3–92 and 3–94, either manual or automatic control is made possible. At this point of the system other input means such as tape control units might be used for directing the machine operation, if desired.

The automatic instructions may be programmed for a halt resulting in an indication at the halt light 6–111 at any calculation step that operator judgment may be used to choose the next address or instruction. The instruction procedure at any time may be accomplished on either a single step by step basis or fully automatic sequenced control by means of the instruction control switch 6–113 which operates through diode control circuits 3–91 to actuate the transfer control circuits 3–93. This feature is desirable for servicing or for computations where operator judgment is required for several successive instructions.

Further manual control over selection of the address is possible with the address modifier X switch 6–115 and Y switch 6–117. When called for by properly pinning the automatic instructions or setting manual switches 87M and 89M, the address location is selected from the X and Y switch settings. The clear switch 6–119 is used to convert the computer operation to its "0" state in which the machine normally idles to await the next instruction. The computations may be initiated by a start switch 6–121 at the beginning of the computer instruction sequence or alternatively at the beginning of any specified pinboard by means of one of the special start switches 6–123.

When the keyboard instruction K is used, the computer halts and lights in addition to the halt light 6–111, the keyboard light 6–79. In addition to excitation of the keyboard light 6–79 a chime may be sounded for aural indication. The operator then may enter a number in the keyboard after which the computer is started by actuation of a motor bar by the operator. Whenever the capacity of the computer is exceeded the alarm light 6–57 is excited.

The computer power switch 6–125 shown on the panel of FIG. 6 starts a power control operating cycle. Before the computer power is applied by the control circuit the wait indicator 6–127 is energized, and conversely the ready light 6–129 shows completion of the power control cycle.

In performing arithmetic operations, as shown in FIG. 3, the state counter 3–82 (FIG. 20) is caused to attain different counts to place the computer into special operating states which are described in detail hereinafter. The instructions dictate a controlled sequence of the operating states by medium of the diode control circuits 3–91. When the input-output unit 45 is in use, the control cams section 3–71 is also used to gate presetting of the state counter 3–82 to the desired operating level.

Under control of the state counter the input-output unit tappet solenoid section 3–71 is actuated for read-out from the computer function thyratron circuits 3–80, which in addition, operate the transfer control circuits 3–93. In performing addition with the computer, general control is effected through diode control circuits in unit 3–91 to operate the arithmetic system 3–84, shifting circuits 3–61 and sign control circuit 3–86.

During certain of the arithmetic operation, the scanner 3–74 (FIG. 28) and partial digit distributor 3–88 (FIG. 21) are utilized respectively to count the digits of a word and to distinguish the sign digit from the rest of the word. The scanner 74 may be preset to the starting position, and is used in the keyboard instruction to scan the decimal switch as 3–65 in the input-output unit 45 to read the keyboard digits, least significant first, into the accumulator 3–59. Also it serves to scan the word set up in accumulator 3–59 by operation of the rack stop thyratron circuit 77 in order to set up a word one digit at a time in the thyratrons causing the output printer solenoids 3–69 to become actuated.

*Timing Circuits*

All of the arithmetic operations are timed by means of signals derived from stored timing signals in the memory section 3–78 with circuits located in the read section 3–55 and processed in the timing circuit section 56 of FIG. 3. These timing circuits are shown in more detailed block diagram form in FIG. 7. The corresponding waveforms are illustrated in FIG. 8, and detailed schematic circuits are found in FIGS. 9 through 16. The block diagram circuits of FIG. 7 are discussed together with timing pulse characteristics of both the raw recorded pulses and those timing pulses derived therefrom as indicated by the waveforms of FIG. 8.

The basic timing track has 1300 raw timing pulses T spaced at thirteen microsecond intervals which are used to derive pulses for synchronous operation of the computer at bit frequencies of either 78,000 or 156,000 cycles per second. The raw timing pulses T are used in the basic timing section 7–130 for deriving a series of shaped pulses *t*, *u*, *twu*, T, U, TwU, and *w*. The timing and widths of these pulses, together with an indication of the timing of the decimal pulse count notation in the computer system are seen in the waveforms of FIG. 8. From the corresponding letter notation at the output leads of the basic timing section 7–130 each timing signal may be traced back to the basic timing track through the processing circuits, which may be constructed as shown schematically in detail in FIGS. 9 through 16.

Figure 9:
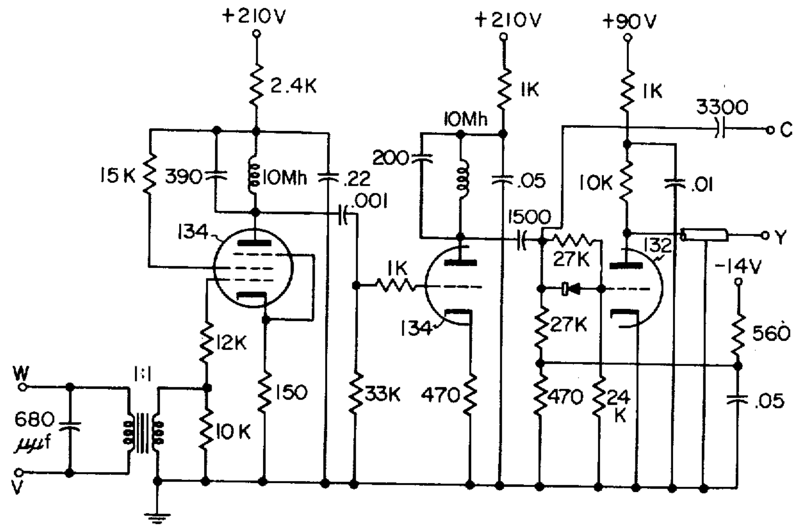
Figure 10:
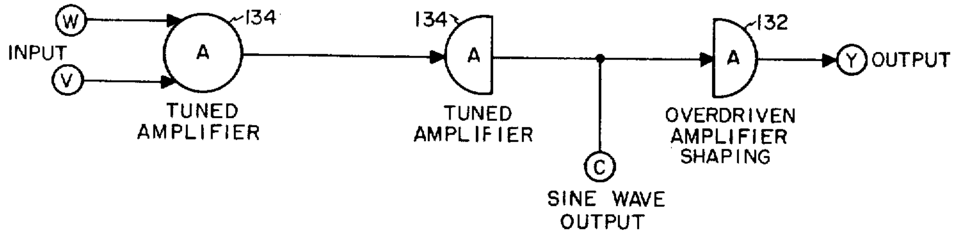
Figure 11:
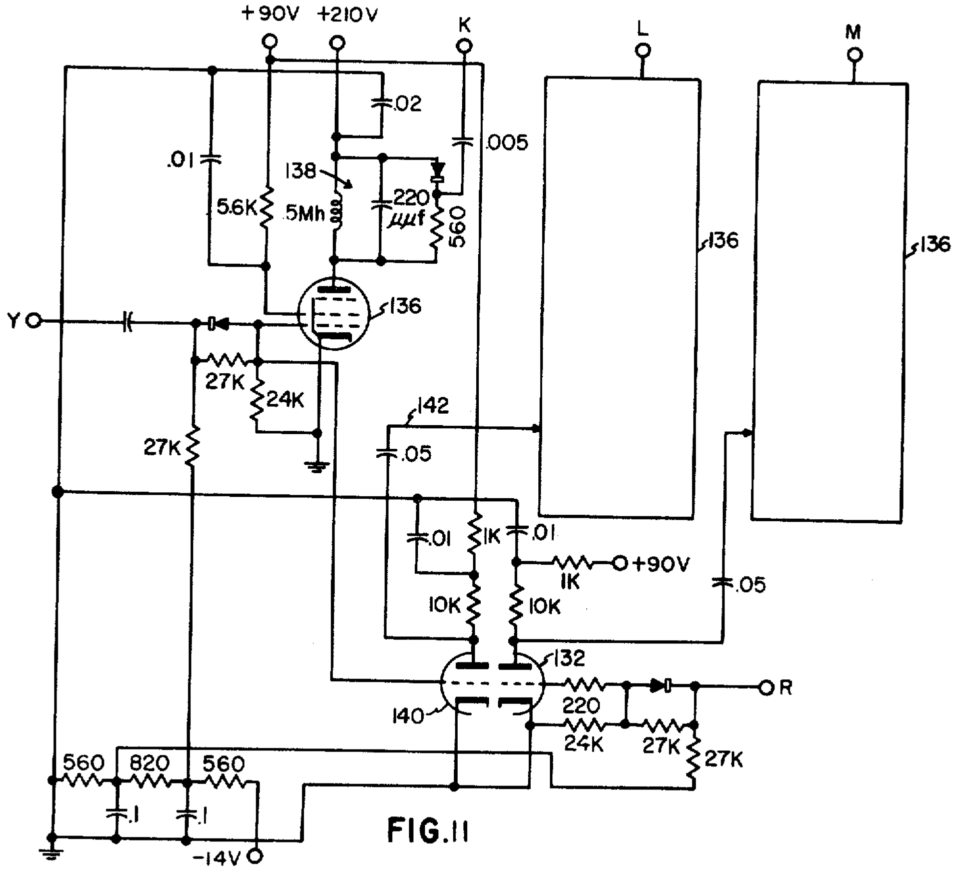

Thus, in FIG. 7 the raw basic timing pulses T are fed through the two stage tuned amplifier circuit 10–134 of FIG. 10 to produce a sine wave output signal at terminal C. The block notation of FIGS. 10, 12 and 14 may be compared with that of the basic timing processing circuits 130 of FIG. 7 to indicate the manner in which the circuits of FIGS. 9, 11 and 13 are emloyed. Shaping of the sine wave signal at terminal C is performed by overdriving a biased triode amplifier 9–132 in a circuit providing lowered plate potential from the +90 volt supply. This effectively converts the sine wave output signal of the intermediate tuned amplifier 9–134 to a shaped wave at the output terminal Y of the overdriven shaping amplifier 9–132, from which is derived in further circuits the one microsecond wide *t* and *u* pulses of FIG. 8.

Figure 12:
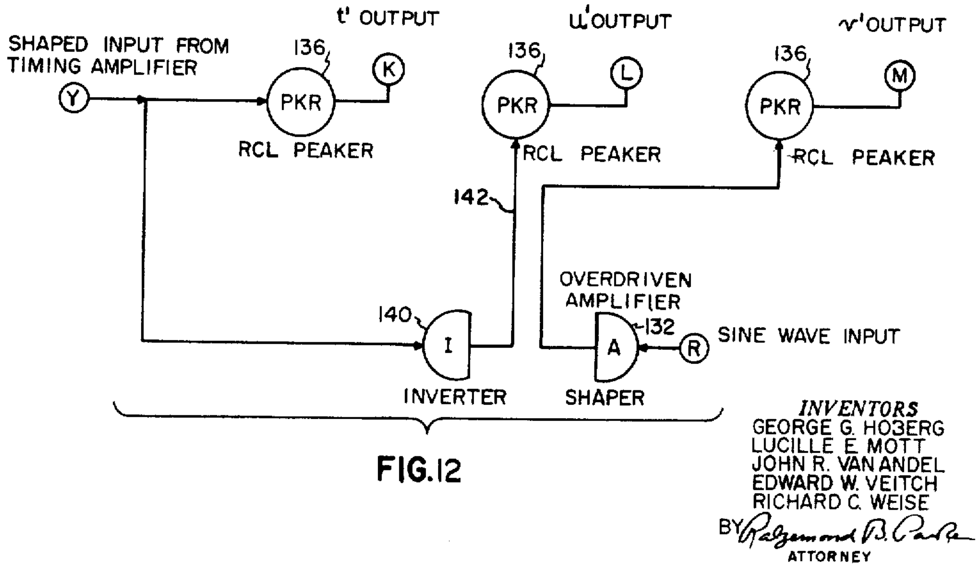
Figure 13:
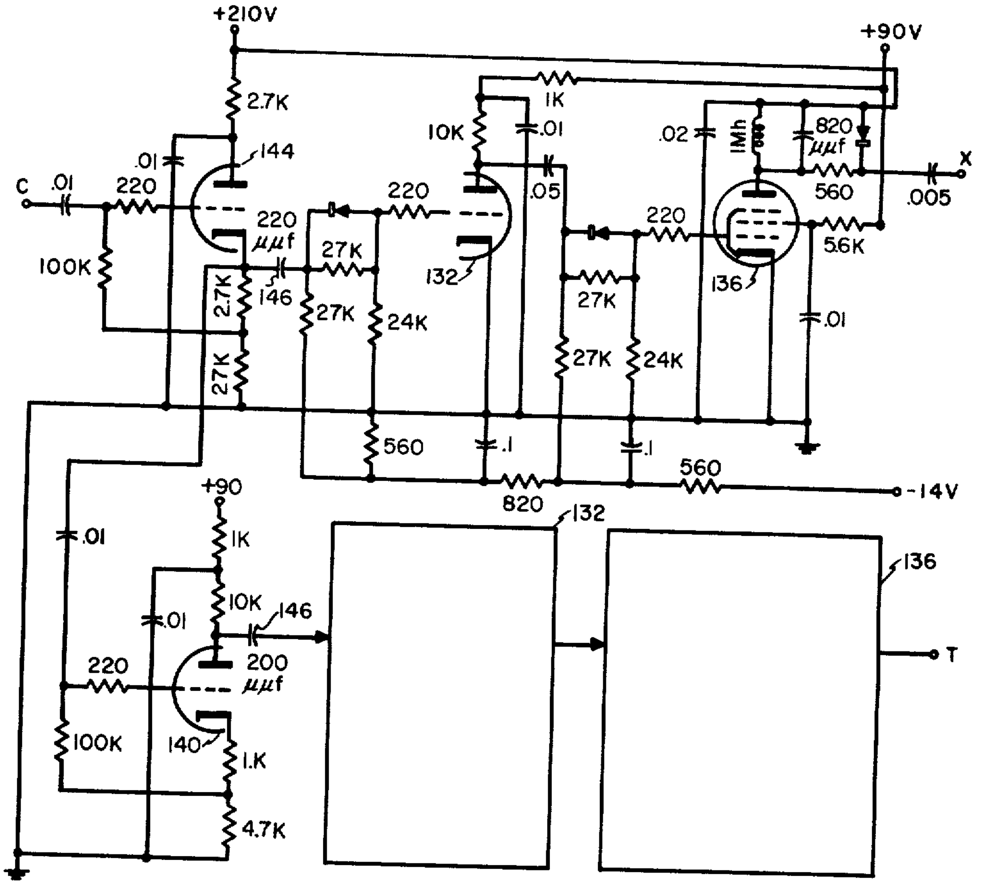

The shaped wave at terminal Y is further processed in the circuits of FIG. 11, as shown diagrammatically in FIG. 7 and FIG. 12. Thus, the pentode amplifier tube 12–136 serves as a further peaking circuit to produce at the output terminal K the *t'* timing pulse. The peaking is done in a damped resonant pulse forming circuit 11–138.

To form the *u'* timing pulse, an inverter circuit comprising the triode amplifier 11–140 is used to produce an input signal at lead 11–142 to a further pentode peaking circuit 11–136 to produce at the output terminal L the shaped *u'* timing waveform. Thus, by utilizing the reverse half cycle of the available shaped sine wave, the *t* and *u* clock pulses are caused to be interspersed with each other, as shown in FIG. 8.

The *w'* drum writing signal is derived also from the sine wave signal at terminal C. The signal at the input circuit terminal R of the overdriven amplifier 12–132 in the *w'* signal processing circuit is advanced by means of a suitable phase advancing circuit which causes the *w'* timing pulse to have a leading edge starting one-half of a microsecond before the corresponding *t'* pulses. The damped resonant pulse forming circuit is tuned to produce a one and a half microsecond pulse. Thus, the *x''* pulses last for a duration of one and a half microseconds, and are therefore suitable for actuating circuits for writing upon the magnetic drum. In the computer system these wider pulses permit the storage of more energy. The peaker stage 12–136 further shapes the *w'* waveform to produce output pulses at terminal M.

Figure 14:
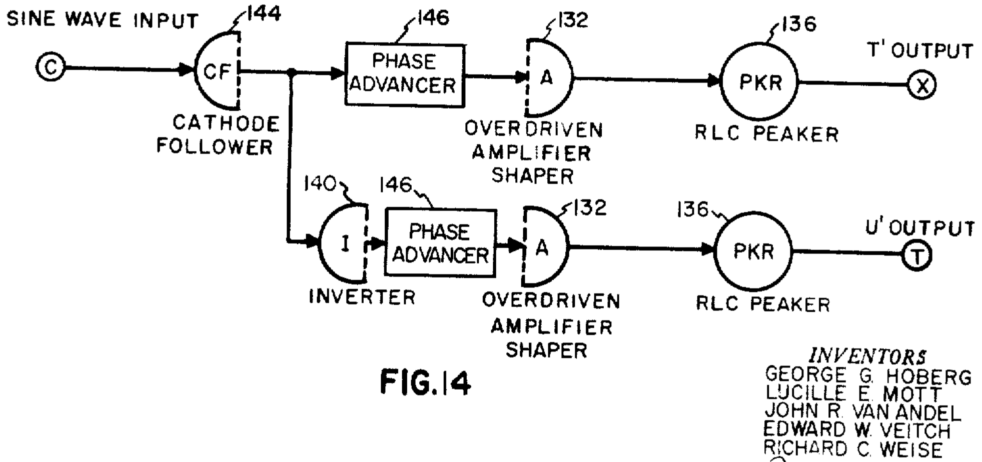
Figure 15A:
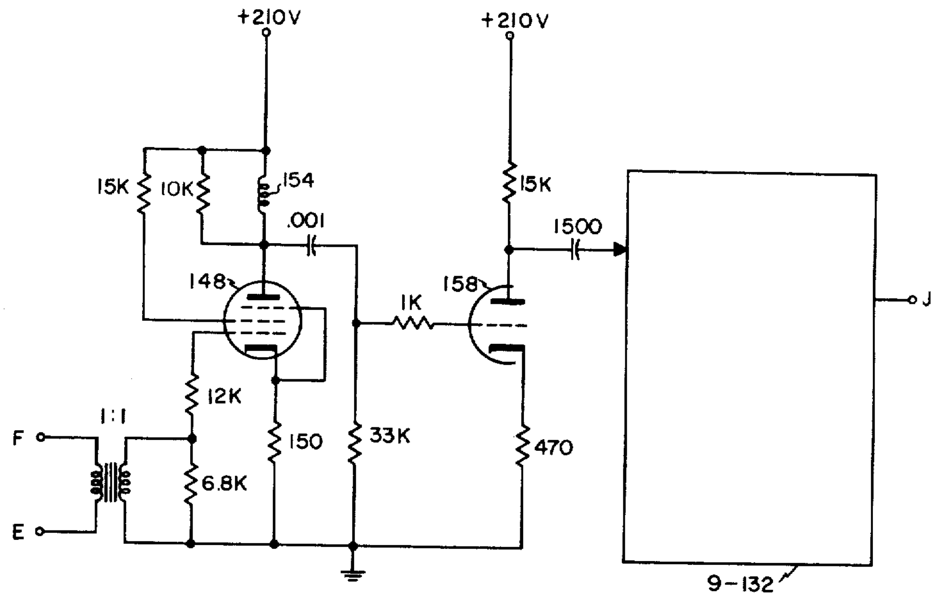
Figure 15B:
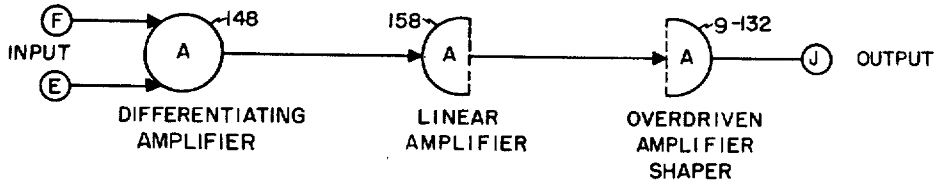

The further two microsecond wide clock pulses T' and U' are derived in circuits of the type shown in FIGS. 13 and 14 from the sine wave produced at the input terminal C. A cathode follower circuit 13–144 couples the sine wave signal to two separate processing channels for the respective clock pulses T' and U'. An inverter circuit 13–140 serves to intersperse the U' pulses with the T' pulses by utilizing a different half cycle of the sine wave input signal. By means of the interspersed phase advancing circuits 13–146, the sine wave signal is caused to trigger off the overdriven amplifiers 13–132 soon enough to cause the T' and U' pulses to be derived for two microseconds of which the latter microsecond corresponds with the *t'* and *u'* trigger pulses. The phase advancing circuits comprise simply the input R-C coupling circuit to the overdriven amplifiers 13–132 comprising the 220 micro-microfarad capacitor 13–146. The pulses are finally shaped in the peaker circuits 13–136 to produce at the respective output terminals X and T the shaped T' and U' pulses.

*Signal Processing Circuits*

Some of those circuits described in connection with the basic timing processing circuits 7–130 are likewise used for processing the other timing track and data track signals in sections 7–150, 7–152 and 7–178 of FIG. 7. A differentiating amplifier 15–148 is used in the memory reading stage of the amplifier circuits in reading sections 7–152 and 7–178 of the type shown in detail in FIG. 15. Thus, the pentode tube presents a high resistance and the choke 154 has a low inductance so that the output pulses are differentiated as applied to the cascade coupled linear amplifier circuit 15–158. The pulses are then shaped in the overdriven amplifier 132 to produce output signals at the terminal J.

Figure 16:
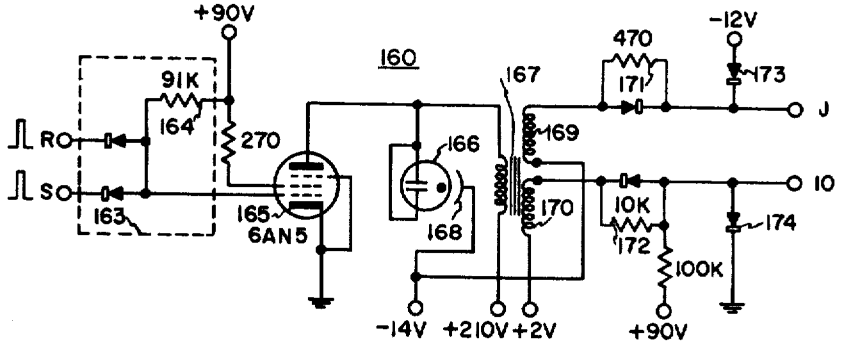
Figure 16A:
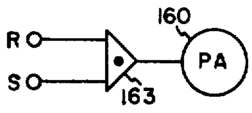

These shaped signals are further processed through the pulse amplifier circuit 16–160 (FIG. 16*a*) as are the signals derived from the basic timing track as indicated in the pulse amplifier circuit portion 7–161. The amplifier circuit of FIG. 16 is shown in universal form so that it may be utilized throughout the computer wherever pulse amplification is necessary. This is particularly true in some of the diode logic circuits. As is well known, after a pulse has passed through several diode logic stages, inherent circuit delays cause the pulse to be spread out and mis-shaped. Thus, fresh timing of the input signals with an appropriate clock pulse is accomplished by means of the diode "and" circuit 16–163. This "and" circuit is a conventional circuit comprising two diodes which serves as the input circuit for the 6AN5 pulse amplifier tube 16–165 coupled by resistor 164 to a source of positive potential (+90 v.) and is supplied with a source of positive input pulses at either one of the two diode cathode input terminals R and S. Thus, both diodes have to be cut off in order to produce a positive output pulse at the control grid of the pulse amplifier tube 16–165. Throughout the following specification and circuit embodiments, gates constructed schematically as those gates 16–163 are shown in the logical form of FIG. 16*a*. Thus, the "and" circuits 163 of FIG. 7 may be of this type. It is to be recognized, of course, that more than two input signals can be afforded by likewise connecting more diodes and input terminals to the resistor 16–164 in the same sense. Thus, the coincidence of all input signal pulses will produce a single output signal pulse.

The coincident pulses are amplified by the tube 16–165 and are coupled to the pulse transformer 16–167. In order to provide standard pulses for use in inhibiting as well other logic functions throughout the computer, two secondary windings 16–169 and 16–170 are used respectively for producing positive and negative output pulses. All the pulses produced are of an amplitude of about twelve to fourteen volts, since this potential produces the highest back resistance in the crystal diodes used for logic and clamping purposes.

In each of the secondary windings 16–169 and 16–170, a 2 volt differential is provided across the diode circuits in order to produce a threshold for eliminating small transient noise signals. The output signals are respectively clamped at −12 volts and ground potential. Also in order to produce high quality pulses without transient ringing, the resistors 16–171 and 16–172 serve together with the clamping diodes 16–173 and 16–174 connected in series therewith to critically damp the secondary windings for a single half cycle of oscillation. Thus, with the described circuit the input waveforms are accurately retimed by the input "and" circuit 16–163 and are produced in amplified form by the pulse amplifier circuit 16–160 to produce shaped output pulses at the pulse transformer 16–167.

The various combinations of timing pulses which are necessary at different stages of the computer for proper operation are derived in the "and" circuits of the processing section 7–176 of FIG. 7. Since digital information is handled throughout the computer system, the data tracks derive similar shaped pulses in the power amplifier circuits 16–160 of the data section 7–178.

Neon tube indicator devices 16–166 are used to indicate the presence of pulses at transformer 16–167. A capacitive coupling member 16–168 outside the tube envelope permits pulsating energy to discharge the tube and provide a visual indication useful in servicing throughout the computer system. This device is described and claimed in the copending application for United States patent for "Neon Lamp Indicator Device," by Robert J. William, filed March 4, 1955, Serial No. 492,248, and assigned to the same assignee as the present application.

The recording of information upon the magnetic drum is in general accomplished with the same magnetic transducer heads as used for writing by means of circuits described in FIGS. 17 through 19. The basic information to be written upon the drum is derived at input logical "and" circuits 17–163 at terminals M, N, T, etc., of FIG. 17 and are timed by means of the *w* drum writting pulses at the input terminal U of the diode "and" circuits 17–163. Thus, a pulse is derived at the output transformer 17–180 of the amplifier tube 17–182 which has a duration of one and a half microseconds, and which is used in the output data writing circuits at terminals F, H, S, etc., for the respective three drum channels which comprises the B register or multiplication-division write circuit, the data write circuit, and the accumulator or loop write circuit. Throughout the writing channels, return to negative magnetic recording techniques are utilized. Thus, the circuits are designed to separately write digital information in the form of both 1 and 0 digits. Each writing pre-amplifier 17–181 comprises a half of a 6211 type duo-triode. By means of selected input signals, each duo-triode tube is designated to write only one of the signals 0 or 1 necessaryfor writing a bit of information on the drum. In this manner, when writing one half of each triode is conducting each time one of the drum writing pulses *w* occurs. The circuits are designed to operate at a continuous drum writing frequency of 1300 pulses per drum revolution so that a series of either 0 or 1 data signals may be recorded.

The actual drum writing circuits by which the output signals of pre-amplifiers 17–182 are coupled to the magnetic writing heads are shown in FIG. 18. The drum read-write circuits are shown for the three separate data sections of the magnetic drum. These sections, namely, the memory or data tracks, the A register loop and the B register track each have provisions for reading and writing magnetic infomation upon the drum. In each of the three data sections similar read and write amplifiers are utilized for writing alternatively 1's and 0's as specified by output signals from the circuits shown in FIG. 17*b*. Each of the writing amplifiers 18–184 comprises a 6216 type pentode tube, which is coupled to one half of a magnetic transducer head winding 18–186. By center tapping the winding 186 of the magnetic head and driving it at opposite ends with separate amplifier tubes, 1 and 0 signals may be written upon the drum alternatively.

Since the A register circuit comprises a circulating loop for re-entry of information upon the same memory track after suitable modification, a separate reading head is spaced a fixed distance of about one computer word from the loop writing head 188. However, in the B register and memory sections the same magnetic head winding is used both as a reading and writing head. In order to couple the signal to succeeding amplifier circuits from the single magnetic head, a read amplifier transformer 18–190 is coupled with its primary winding in shunt with the magnetic head windings 18–186.

A single head is coupled with each magnetic drum track, with the exception of the A register track which is coupled for re-entry of information. Thus, the separated reading and writing heads are provided for the A register loop. In the memory section there are ten data tracks 0 through 9, each of which may be individually selected so that reading and writing may be accomplished upon only one track at a time. Thus, a single read and write circuit is provided for the entire memory section. The particular memory track is therefore selected by setting up the switch section 18–192 by means of address selection instructions from either the hereinbefore described pinboard 3–46 or the manual control panel 3–48. The tens level digit 0–9 of the selected instructions, for example, may operate a channel selector relay 18–194 individual to the magnetic head of each track in order to operate the associated single pole-double throw switch contact. Only one switch contact, such as 18–196, is connected to the +210 v. terminal 200, at a time therefore permitting the selection of only one track such as the 0 track shown in the drawing.

In this selection scheme, each memory section reading head 18–188 has its associated winding 18–186 coupled to two opposite buses 18–197 and 18–198 by means of poled uni-directonal devices such as the illustrated diodes. A cutoff bias is supplied to these diodes by way of the unselected windings of tracks 1 through 9 which apply to the respective head winding center tap terminals the +195 volts available at the power supply terminal 18–199. This supplies to the unselected diode anodes a potential of about 15 volts negative with respect to the +210 volts available at power supply terminal 18–200 which is coupled to buses 197 and 198 through the winding of the 0 track head selected by switch contact 196. Thus, each of the diodes of the non-selected heads presents maximum reverse impedance so that little current flows therethrough. Accordingly, potentials which are generated in the non-selected windings with signals presented by rotation of the drum are not transferred to buses 197 and 198 where they may be seen by the reading amplifier transformer winding 191, nor will conduction of one of the memory write amplifiers 184 cause current to flow in any unselected winding to produce undesired writing upon the drum. However, when the input signals are applied to one of the write amplifiers 184, electron current is caused to flow from the −90 volt amplifier cathode potential through the respective amplifier tube 184 and the corresponding section of the selected reading winding 186 to the switch contact 196 and back through the +210 volt power supply terminal 200. In this manner, a single read-write amplifier circuit may serve for a plurality of memory data channels in the computer system. This circuit is described and claimed in U.S. Patent 2,932,008, issued April 5, 1960 to George G. Hoberg, for "Matrix System."

In order to read from the plurality of memory channels, the read amplifier primary winding 191 is coupled to a +195 volt power supply terminal 199. This assures a current flow from the +210 volts at the center tap of the selected 0 track head winding 186 through the respective diode circuits and back to the +195 volts at the center tap of the read amplifier transformer primary winding 191. Because of the continuous current flow through this circuit, relatively small signals of several millivolts caused by the motion of the recorded magnetic drum signals with respect to the magnetic heads 188, will produce in read transformer 190 a signal capable of operating the read amplifier circuits of FIG. 15, which are shown also in the logical reading circuits 178 of FIG. 7.

The organization of the B register circuits is shown in the logical diagram of FIG. 19. In general, the B register is used for speeding up operation during multiplication and division by recording the contents of the accumulator 10 times around the B register track so that the access of either the multiplicand or divisor words may be accomplished for each one-tenth of the drum rotation. A typical word as stored upon each drum sector is indicated by the waveform 19–202. This waveform typifies the words stored and used throughout the computer. As the drum rotates, the first decimal digit DP0, which represents the sign, is presented in each sector. The sign is represented by nine "1" pulses for negative sign and nine "0" pulses for a positive sign.

Between each decimal digit of nine recorded bits is a guard cell so that ten complete recording bit spaces are used for each decimal number. Next in succession after the sign digit DP0 is the last significant digit DP1 of the recorded word, which in this illustrative case is a two and is represented therefore by two pulses in the pulse count notation used throughout the system. Each decimal digit is then read in succession until the most significant digit DP12 is reached. For all computations the decimal point is fixed between the most significant digit DP12 and the next most significant digit DP11. Thus, in the B register track of the drum, the same word would be written in all ten sectors and therefore would be available at the reading head 19–188 with an read time of approximately 1.7 milliseconds for a drum revolution of 3600 r.p.m.

Signals to and from the transducing head 19–188 are processed in the read-write circuit section 19–204 in the manner hereinbefore described. Separate output signals go to the accumulator register from the B register for both 0 and 1 recorded information as indicated by the notation BR–0 and BR–1. Since the B register is read only during multiplication or division, the "or" circuit 19–205 produces signals derived from the computer instructions for actuating the output gating circuits 19–206 and 19–207. This "or" circuit is constructed as shown in FIG. 19*a*, as are similar "or" circuits throughout the computer. Thus, by means of a positive pulse at any one or more of the diode anodes, the potential at the output terminal is raised due to conduction through the load resistor from the ground terminal. Coincidence of the multiply or divide instruction with information BR–1 or BR–0 on the B register and clock pulses ~DE.U produce corresponding output signals which are sent to the accumulator. Therefore, during the receipt of clock pulses ~DE.U, shown in FIG. 8, which occur during presentation of each of the recorded sectors of the B register, any recorded B register information is read out into the accumulator in response to a multiply or divide signal received at the input "or" circuit 19–205.

In order to write upon the B register, separate circuits of the type hereinbefore described are supplied for writing both the "1" and the "0" bits. The input information is taken from the accumulator loop or A register as designated by the input notation AR–1 and AR–0. In the partial digit distributor 3–88, is a flip flop circuit DD–1, which is used for distinguishing between the sign digit DP–0 and numerical digits DP–1 through DP–12. Thus, the DD–1 input signal is used to gate the loop input digits from the A register at the input write gating circuits 208 and 209. The sign is separately processed and stored in a sign control flip flop 3–86 which is designated AD–1. Therefore, the ~DD–1 signal is used to gate the DP–0 digit containing the respective minus or plus signs of the words to be written at the proper digit time DP–0 at the respective write "1" and write "0" input leads to the read-write circuits 19–204.

An instruction signal BR designating the B register write operation is necessary at the control gate 19–210 in order to permit writing upon the B register drum track. In coincidence with the B register control instruction BR, the computer must be in operating state 4 in order to permit writing upon drum. State 4 starts with the B timing or flag pulse, shown in FIG. 8. Thus, in order to arrive at state 4 the B timing pulse is used to change the control to state 4 in coincidence with a state 1 condition and a write B register instruction BR at the state control gate 19–211. The next B pulse after the end of the full revolution which permits the entire word in the accumulator to be written upon the B drum, utilizes a further state control gate 212 to change the computer state to the 0 idling state. Accordingly, state 4 both starts and ends with successive B pulses. The word is written entirely around the B register, and is retained in the accumulator for further use. In this manner information processed in the accumulator loop may be entered upon the B register for use in connection with the multiplication and division computations.

In general, the control of the different computer states is selected by means of three flip flop circuits as shown by the block diagram of FIG. 20. The flip flop circuits are designated respectively CN–1, CN–2 and CN–3 and may be constructed in the general manner shown schematically in the hereinafter described circuits of FIG. 25. By presetting the three flip flops, any one of eight computer operating states may be selected. The conventional diode matrix decoder circuit 20–214 is used to separate the eight output signals which are coupled to the respective pulse amplifiers 160.

The matrix circuit 20–214 has a plurality of output rows, each coupled to a suitable power terminal by a resistor 20–215 as shown typically for the row 000. Thus, output signals are produced at each row only upon the coincidence of signals at all of the diode connections to the columns as schematically shown in the matrix by means of circles. Output signals from each output lead may be taken directly for use without pulse amplification by means of a lead 20–216 where desired. Thus, the hereinbefore described state control gate 19–211 will serve to establish state 4 by presetting the respective state selector flip flops CN–1, CN–2 and CN–3 into their respective 001 conditions. In operation of the state selector, as will be shown later in more detailed diode control circuits, only the necessary changes in the flip flop conditions will be made to change from one state to another. Thus, if the computer was changed from state 1 to state 4 the only changes in the state selector flip flops would be the presetting of flip flop CN–3 to its "1" condition, and the flip flop CN–1 to its "0" condition. Likewise, the state control gate 19–212 in returning the computer from state 4 to state 0 would serve only to preset flip flop CN–3 to is "0" state.

Construction of the partial digital distributor 3–88, which generates pulse DD–1 as described in connection with FIG. 19, is indicated in FIG. 21. The first of the two flip flop circuits DD–1 and DD–2 is utilized in order to distinguish between the sign digit DT–0 of each decimal word and the remaining numerical digit times DT–1 through DT–12. The output signal of flip flop DD–1 is used to provide this information both in the positive sense DD–1 and negative sense ~DD–1. This flip flop circuit DD–1 is reset for each word pulse W and is set by the first digit pulse D in combination with a signal showing that the flip flop circuit is in its reset condition, as controlled by gate 21–217.

For further machine processing which will be described hereinafter, the partial digit distributor also produces an output signal which incorporates the least significant digit with the sign digit as accomplished by the flip flop circuit DD–2. Similarly, this flip flop circuit is reset with the word clock pulse W. A control gate 21–218 is used for setting the flip flop when it is in its reset condition ~DD–2. Thus, in response to a digit timing pulse D arriving when both the DD–1 and ~DD–2 signals are available, the flip flop circuit DD–2 is set for digit times DT–2 to DT–12. The W pulse causes the reset condition for the periods DT–0 and DT–1 of two digit times arriving immediately after the word pulse W.

The accumulator 3–59 together with the shifting circuit 3–61 are shown in logical form in FIG. 22 to indicate the manner of circulation and modification of information picked up at the reading head 22–219 and rewritten by the writing head 22–220. Each word as stored in the entire accumulator loop has 12 decimal digits plus sign. The sign is not written on the drum but is held in the sign flip flop and a blank or zero digit is recorded in the sign position to assure automatic entry of zeros during shifting. One digit is stored in the control circuitry for normal no-shift operation, and twelve are found recorded on the drum surface located between the read and write heads 219 and 220. The storage of one digit in the control circuits enables precession of information about the accumulator loop in order to provide the shift right operation with direct coupling, thereby bypassing the one digit delay. For left shift, in the control circuitry an additional delay of one digit is incorporated in an alternate circuit path for obtaining shift left sequencing. The result of this latter operation is indicated by the comparison of the two words located between the read heads at the starting and termination of one shift period in FIG. 22.

The normal accumulator circulation path is from the read head 22–219 through the normal one digit delay circuit 22–222 through the no-shift path and back to the write head 22–220 as controlled by a no-shift input instruction through the "or" circuit 22–273.

The no-shift signal is derived from computer circuit logic in response to various input conditions at the "or" circuit 22–273. For example, shifting during multiplication is partially done in state 5 with the ~DD–2 signal identifying digit times DT–0 and DT–1 causing the no shift signal to be excited at the gate 22–274 by way of the mixer circuit 276. Thus, coincidence with the further control signal SL*v*SR*v*MU*v*DV at gate 274 is required.

Likewise, in multiplication, state 6 causes similar action to take place at gate 22–280 in combination with the DD–1 signal, which identifies digit times DT–1 through DT–12. The control signal at gate 22–274 is derived from multiply (MU), divide (DV), shift left (SL) or shift right (SR) instructions. More detailed disclosure of this circuitry together with the other states which will cause no-shift operation as designated by lead 22–275 is found hereinafter in the detailed logic circuits in FIG. 48 of the diode control circuit section 3–91.

Figure 48:
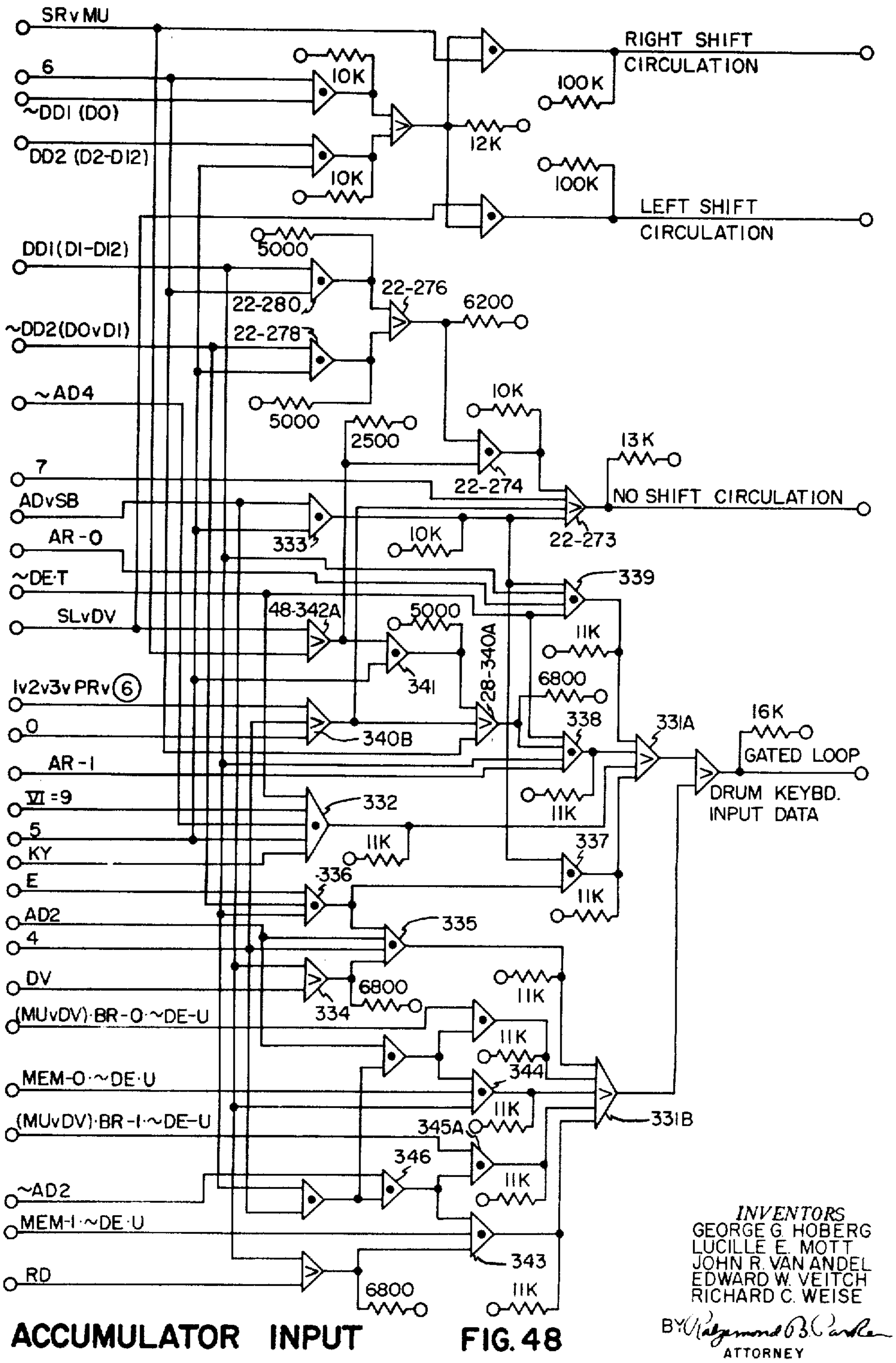
Figure 49:
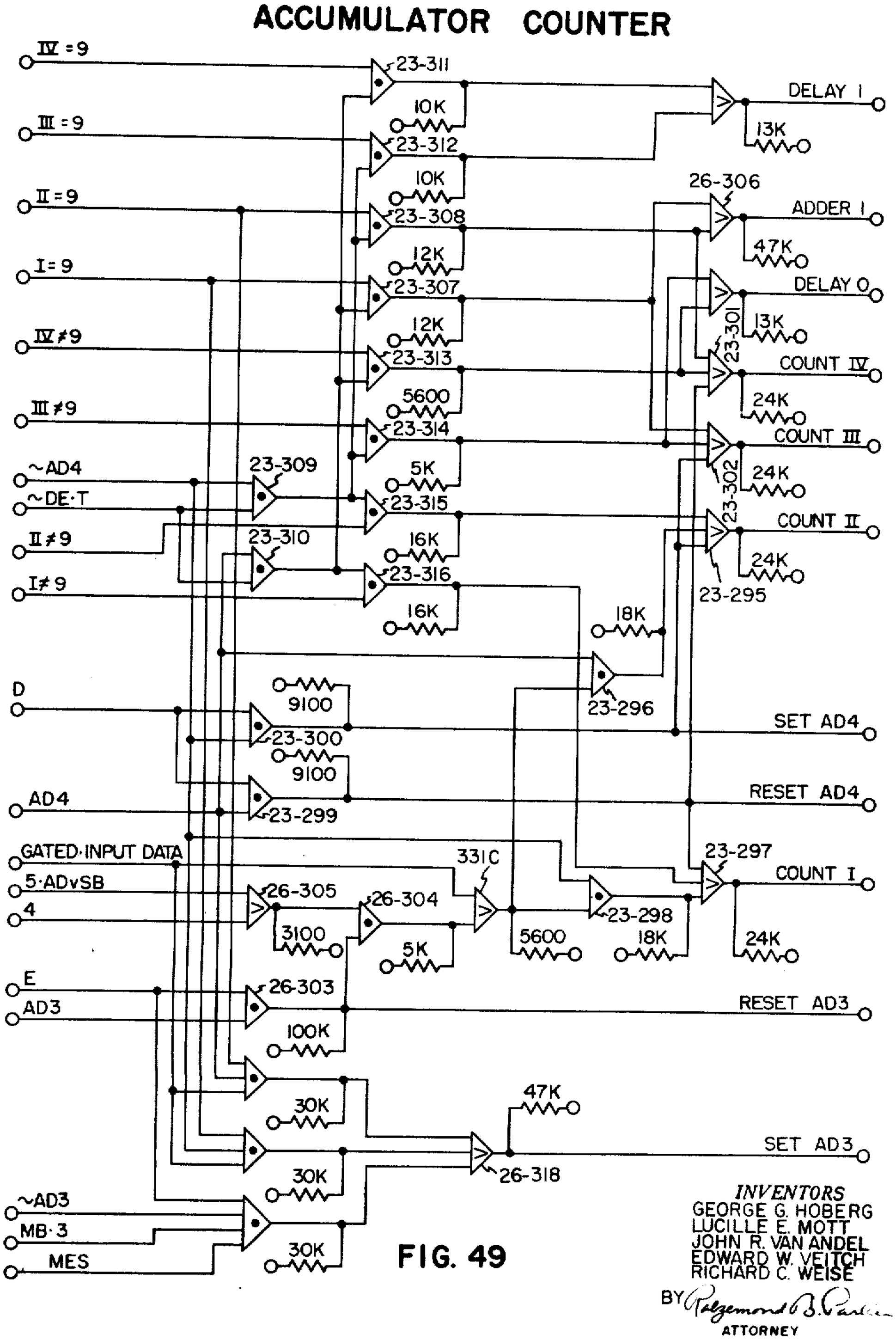

Similar operation in response to the shift left and shift right instructions is shown in FIG. 22 and FIG. 48. The mode of circuit operation may be readily deduced from the signal notation and diode switching circuits shown in FIG. 22 and FIG. 48. In general, throughout the specification in order to simplify the presentation, where the notation and diode logic circuits are clearly disclosed in the drawing, a detailed description of every element is not presented. Typical circuits are described whereever necessary to understand the circuit operation or to enable a similar analysis of other related circuits. It is clear, however, that in the present state of the art, from the logical diagrams presented herewith those skilled in the art may readily construct computer circuits which operate in accordance with the teachings of the invention.

As seen from the waveforms of FIG. 8, the drum writing pulses *w* are formed with a leading edge occurring before that of the corresponding clock pulses *t*. This serves the purpose in the shift control circuits of FIG. 22 of making the regenerative drum loop head spacing and circuit delay configuration less critical. Because the data recirculates, even a very small change in delay between the three optional circuit loops will cause enough precession to be built up to cause erroneous circuit operation unless the signals are accurately retimed. Thus, the longer drum writing pulses cause the reading head 219 to produce a wide enough signal to be gated precisely at the desired time so that if the heads are accurately spaced, small variations of delay in the three circuits in either direction will be corrected by the retiming action. By causing the leading edge of the *w* pulses to occur prior to the timing pulses *t*, the delay variation tolerance in the shift paths may occur in either direction so that the operation of the regenerative shift control circuits is made reliable without the necessity for strict custom adjustments of delay lines in the respective circuit paths.

Figure 23:
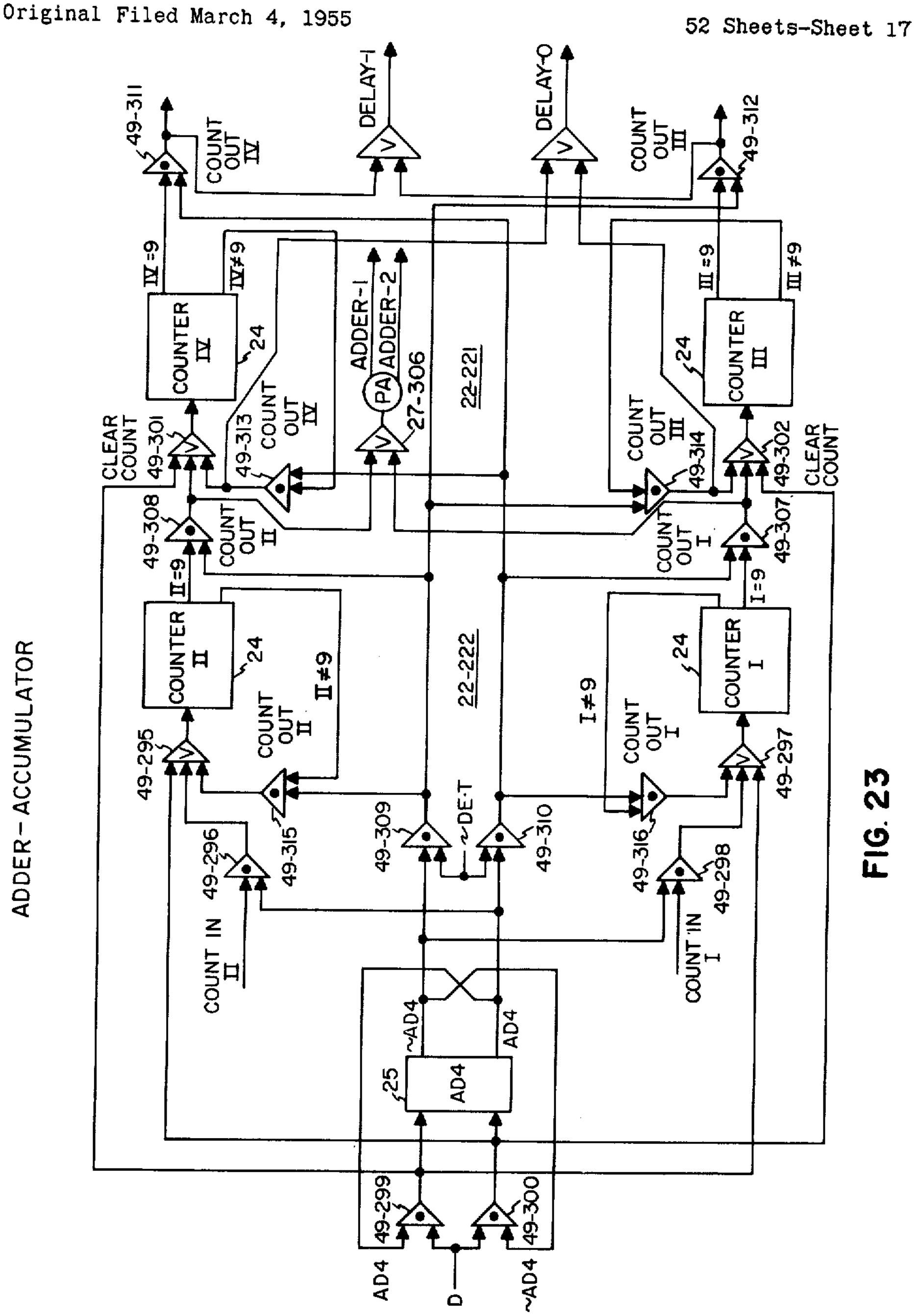

The delay circuits of FIG. 22 are shown in more detailed block diagram form in the embodiment of FIG. 23. The delay is obtained in binary counters of the type illustrated in block diagram form in FIG. 24. This counter provides a decimal count, with output signals output terminal L indicated for each count of nine input pulses at terminal T. The count is made by means of interconnecting the four flip flop circuits as shown diagrammatically in FIG. 24. This circuit is generally described and claimed in U.S. Patent 2,824,961, issued February 25, 1958, to J. O. Paivinen for "Decade Counter For Producing an Output at the Count of Nine." In this circuit a complete decimal digit of any magnitude may be stored by presetting the counter to the complement of the digit to be stored so that an output signal at the terminal L will be produced at the proper digit count to identify the stored digit. Since this same basic counter is used in the several different counting circuits of the computer, it is shown in its most general form and therefore is provided with four preset terminals N, F, D and B, as well as with the accompanying 9's input terminal L and clear terminal H. The normal cleared or "0" state caused either by a signal at terminal H or by a count signal of ten. The tenth pulse presented at lead 287 is identified by a previous nine signal produced at terminal L, which is reinserted at input terminal L. The clear signals are both presented at the "or" circuit 24–282 to thereby place each of the four flip flops in the reset condition. In order to preset the cleared counter at any desired count, the respective flip flop circuits may be set by signals at the appropriate preset terminals N, F, D, and B in any one of its possible counts.

In performing the counting operation, input signals are applied at the complement terminals C of the respective flip flop circuits. Thus, the state of the flip flop is changed by a signal at the complement terminal C regardless of the previous storage condition. Input count signals at terminal T are gated by means of the clock pulses at terminal S in the gate circuit 24–283. Thus, the first count signal arriving after the counter is cleared produces at the first counter state a signal which will transfer that stage from reset to set condition. Since the other three stages are in the reset condition at the arrival of the first count pulse, the signal at the output gate 24–289 as seen at the lead 277 is not passed to the output terminal L. The output terminal L is coupled with a pulse amplifier circuit (FIG. 16) so that the negated output signals are produced at the terminal Z as well as the normal output signals at terminal L. The negated signals are used to inhibit the gate 24–279.

Figure 24:
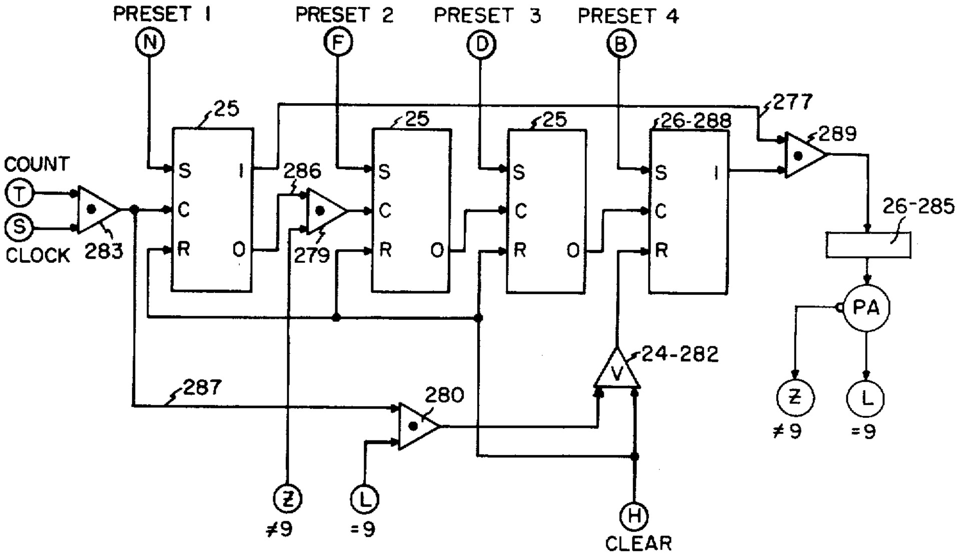

In FIG. 24 the flip flop output signal therefore at the output lead 24–286 of the first stage will cause switching of the second flip flop stage unless the ≠9 inhibit signal at terminal Z is present. Thus, the transfer path of a switching signal to the second flip flop circuit includes the inhibit gate 279. The second flip flop circuit will cause a binary count with its reset output signal complementing the third flip flop circuit which is likewise connected in cascade circuit with the fourth flip flop circuit. Thus, a normal binary count is effected in the four stages in the absence of inhibit pulses ≠9 so that the fourth flip flop circuit is set with the receipt of the eighth input pulse. This, because of gate 24–289, will not provide an output signal at terminal L since, under this condition, the first flip flop circuit will be reset. As the ninth input counting pulse is received, however, the first flip flop circuit will be switched to its set condition to produce the required signal at lead 277 without upsetting the fourth flip flop state and thus provide the 9 output signal at terminal L. Because of the inhibit gate circuit 279, the binary count is interrupted for the next or tenth count when the first stage is reset. Since the second and third flip flop circuits are in the reset state at this time, the tenth pulse arriving at the input terminal of the fourth stage by way of reset lead 24–287 will serve to reset stage four as well as stage one thus returning the entire counter to its cleared condition, and enable it to perform a further decimal count. Thus, the counting action progresses as shown in the following chart:

| | | | | |
|---|---|---|---|---|
| Reset | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 0 | 0 | 0 |

Figure 25:
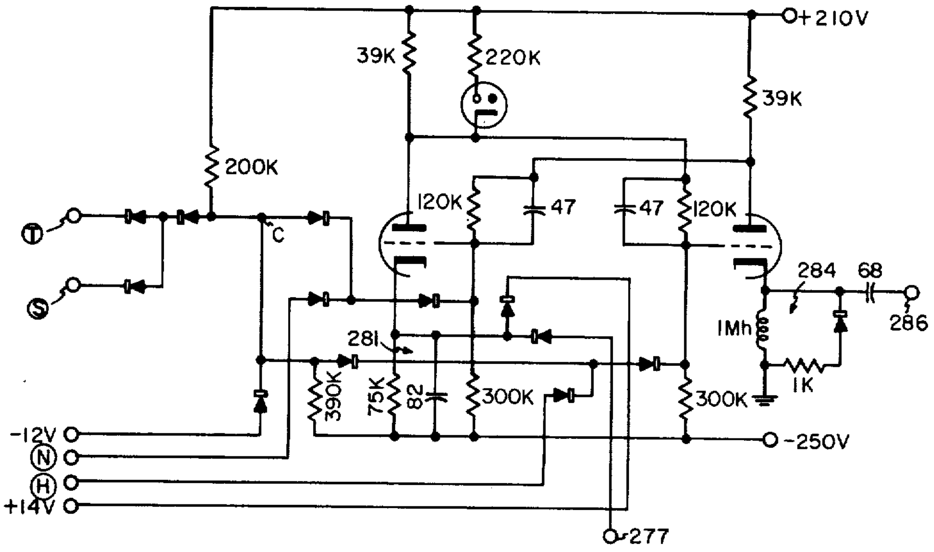

In general, each of the first three counter stages of the binary counter are constructed by circuits such as that shown in FIG. 25. Note that the output circuit of the flip flop at terminal 286 is coupled to a pulse forming damped inductive circuit 25–284. Thus, no output signal is obtained in either the static set or reset condition of the flip flop but is obtained only when the initial transition current occurs as the flip flop is reset. This permits the direct triggering of the counter circuits with pulse waveforms, and produces output pulses which may be used directly in other system circuits.

Thus, the counter circuits of FIG. 23 are caused to provide one digit delay by storing ten bit pulses or one decimal digit. Circuit construction is simplified by performing addition in the accumulator loop with the same basic counters in which the delay is provided for the shifting operation. The alternator flip flop circuit AD–4 is provided to cause one counter to be read-out as the alternate counter is read-in. In general, all of the flip flop circuits may be constructed as shown in the embodiment of FIG. 25 where direct current output signals may be taken from cathode circuits of both tubes at respective terminals such as 25–277. The resistive cathode circuit 25–281 produces a static indication of the tube condition rather than the pulsed output signal produced by the inductive cathode circuit 25–284.

From the alternator circuit AD–4, (FIG. 23) the output terminals are fed back by cross connections to input gating circuits 23–299 and 23–300 which are actuated by coincident digit clock pulses D to thus provide alternate output signals remaining for the duration between consecutive pulses, as designated at the two output leads AD–4 and ~AD–4. These signals are used to turn to count in alternate decimal digits at the respective counters I and II, and conversely to enable the counting out of one counter while counting in is taking place at the other counter. More detailed circuit conditions are shown in the diode control circuit section, as in FIG. 49, where similar reference characters 295 to 302 are shown to facilitate comparison. In like manner, other logic circuits may be traced through the diode control circuit sections.

The counter circuits, to afford the digit delay interval used in the accumulator loop, therefore are constructed for a count-in of the decimal digit during one digit time and a count-out at the succeeding digit time. Therefore, separate input gates 23–296 and 23–315 or 23–298 and 23–316 are respectively provided for count-in operation for the corresponding counters II or I. The input gates 23–296 and 23–298 of counters II and I are connected to the alternator terminals AD–4 and ~AD–4 respectively. Thus, every other digit of each input word which enters the accumulator must be processed through either the upper or lower counting chain, and the digits are thereafter recombined at the output circuits. The same alternation program is effected at the respective counters III and IV. As before shown in connection with FIG. 22, the cascade connection through two delay circuits is utilized only in order to produce left shift operation, whereas the presentation of output signals after a single decimal digit delay permits no-shift operation. It may be seen with the circuit of FIG. 23 that the shift delay is available in such form that it simplifies the addition process. In performing addition, provision is made for counting alternate digits into the separate counter circuits I and II in the manner described as also seen in connection with FIG. 26. The sign digit DP0 is stored in flip flop circuit AD–2 and is handled separately in the sign comparator circuit 86 during addition.

Figure 26:
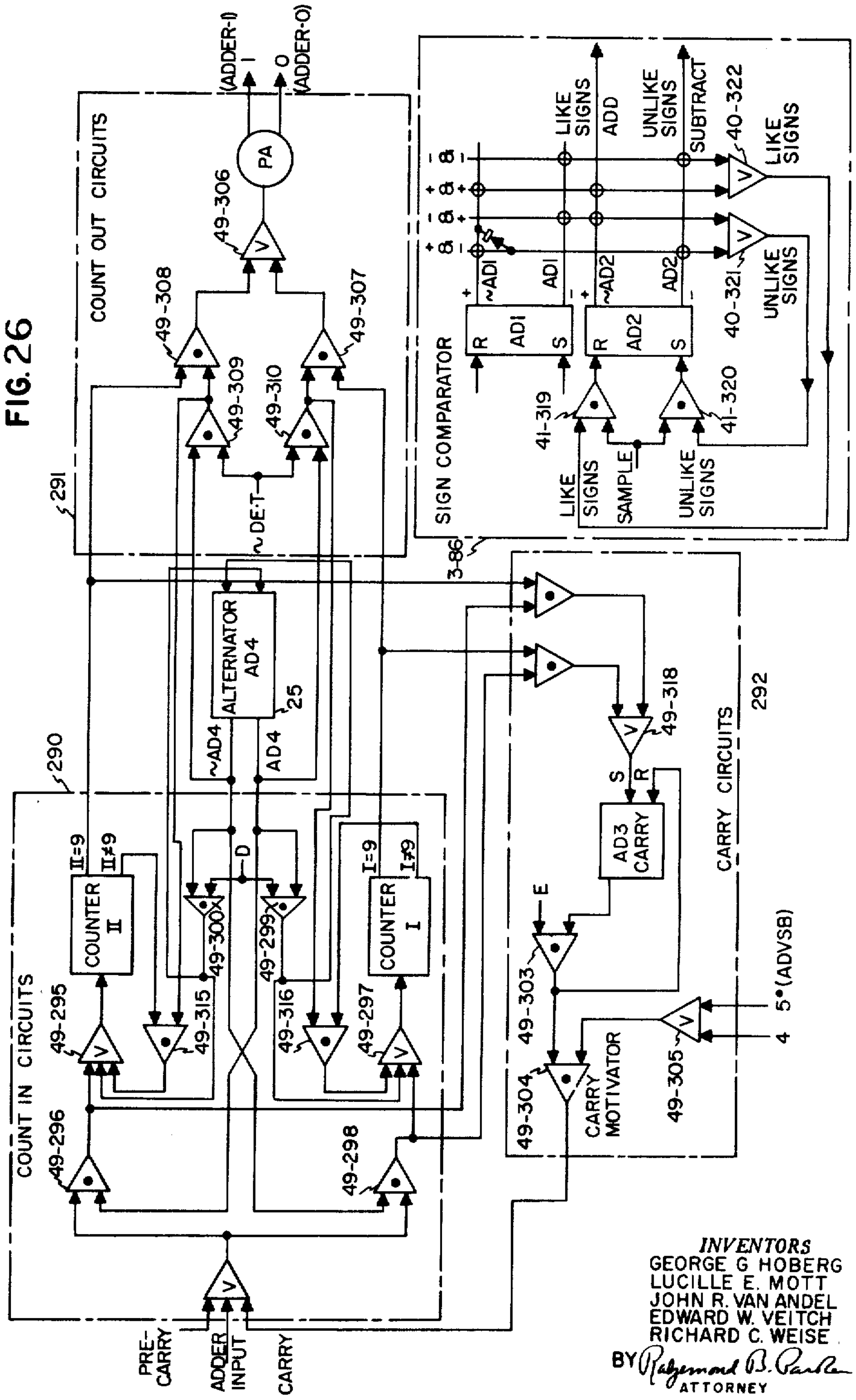

The adder circuit of FIG. 26 is broken up in four sections; 290, 291, 292 and 86 respectively denoting the count-in circuits, count-out circuits, carry and sign comparison circuits. The add instruction serves to algebraically add the contents of a specified memory location to the accumulator, by means of the adder input lead, and thereafter leaves the sum in hte accumulator. Addition is performed serially by counting bits from two digit sources into a single adder counter one digit at a time, and holding the carry signal for addition with the succeeding digit. Digits from the accumulator track are counted in at T time and those coming from the memory or B register are counted in at U time so that the digit bits may be interspersed or staggered in time relationship. Thus, the counting rate is 156,000 cycles per second or twice the normal bit presentation rate throughout other computer circuits. Digits are counted out of the adder-counter during the following digit time. To count out of the counter, nine T pulses (~DE.T) are applied to the count input terminal. These pulses continue to advance the counter until it reads 9. The rest of the nine T pulses are then gated to form the output digit. The carry signal is held in flip flop AD–3 for presentation with the succeeding decimal digit.

The add instruction AD or subtract instruction SB is necessary to cause the contents of a specified memory location to be added or subtracted to the contents of the accumulator loop. Various conditions for providing an adder input signal from the drum or keyboard are shown in the accumulator input circuits of FIG. 48. During the addition cycle, the track selection is made during state 1, and the sector address is found during state 2. The actual addition takes place during state 4. By means of the hereinbefore described partial digit distributor circuit 3–88, shown in FIG. 21, the sign of the memory word is read into the flip flop circuit AD–2 during digit time DT–0. The flip flop circuit AD–1 already has been conditioned with the sign of the accumulator contents. After the complete digit is read-in and at the tenth bit time of DT–0 complement control, flip flop circuit AD–2 is set if the signs are opposite and reset if the signs are the same. Whenever the signs are opposite, the numerical portion of the word from memory is complemented by sending memory 0's to the adder instead of memory 1's. This produces a 9's complement which is changed to the proper word by sending a pre-carry bit into the adder during the tenth bit time of DT-0, as schematically indicated at the input circuit of the adder 26–290.

Figure 41:
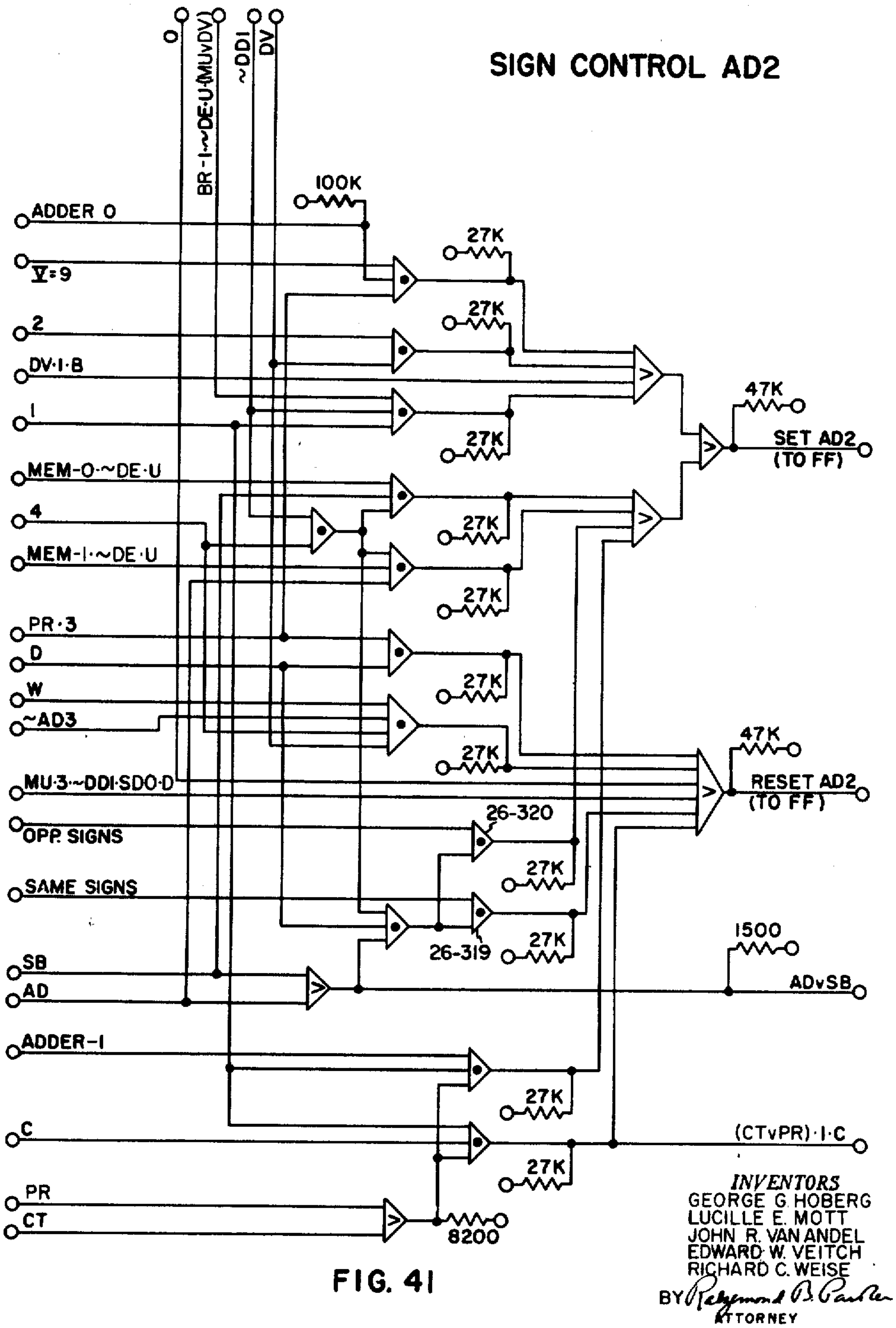
Figure 50:
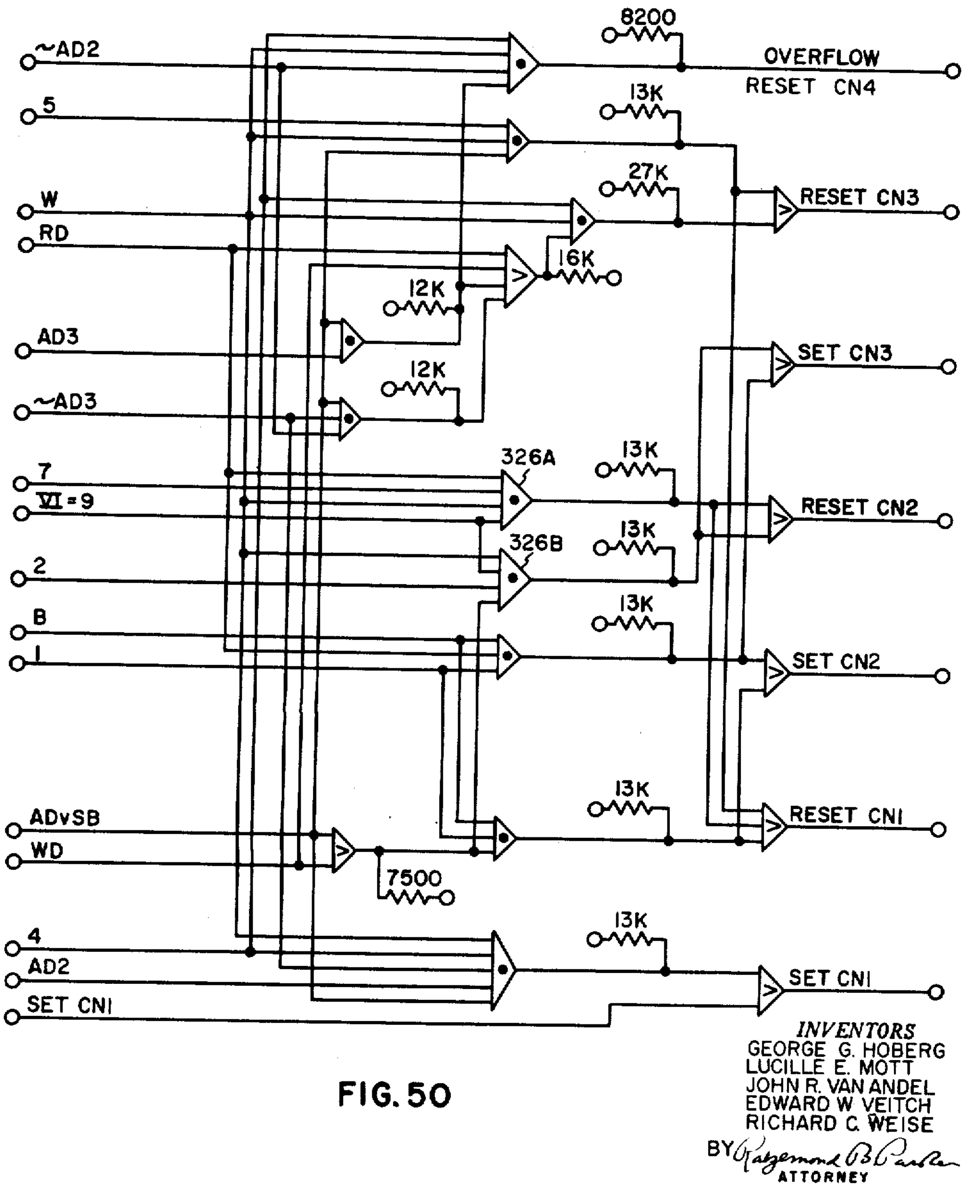

During digit times DT1 to DT12 the bits from the accumulator tracks enter the adder input circuit at T time and the bits from the memory enter at U time as indicated in FIG. 48 respectively by the gates 48–338 and 48–343. A carry is stored in the flip flop circuit AD–3 and is sent to the adder between digits at E time so that it will be added to the next digit. At W time flip flop circuits AD–2 and AD–3 are inspected by signals as shown in the circuits of FIGS. 41 and 50. If the signs are the same and there is no carry, which is the case with AD–2 reset and AD–3 reset, the sum is in absolute value form and the sign of the sum is correct in AD–1. In this case the state selector goes to state 0 to wait for the next instruction indicating that the addition is completed. If the signs are opposite and there is a carry, as occurs when AD–2 is set and AD–3 is set, the same situation holds. However, if the signs are opposite and there is no carry, AD–2 and AD–3 being in the set and reset condition, the sum is in complement form. In this case control changes to state 5 in which the accumulator is complemented and provided with a pre-carry signal. Also the storage state of AD–1 is changed to give the correct sign as well as the absolute value of the sum after which control goes back to state 0. When the signs are the same and there is a carry, with AD–2 reset and AD–3 set, the number in the accumulator exceeds the capacity of the register. In this case an alarm is fired. Also the flip flop circuit CN–4, which is hereinafter discussed, is reset to prevent the stepping switch from proceeding to the succeeding instruction and sending the control state to 0.

In order to perform the subtract instruction, the operation is entirely identical to the adding operation except that the sign of the word in the memory is complemented as it is sent to the complement control flip flop circuit AD–2. This operation is shown in detail in the diode logic circuits of FIG. 41.

The manner in which information is selected from or read into the rotating magnetic memory is illustrated in FIG. 27. By means of the pinboard or manual control panel the 10's digit is selected as diagrammatically shown by switch 3–87 in the manner shown in connection with the more detailed circuit embodiment of FIG. 18. Likewise, the units selector switch 3–89 indicates the pinboard conditions which are used to cause the computer to select a particular sector of the selected memory track. Some of the circuits of FIG. 27 are cross referenced to other figures embodying detailed diode control circuits, from which complete operating circuits may be traced.

Figure 43:
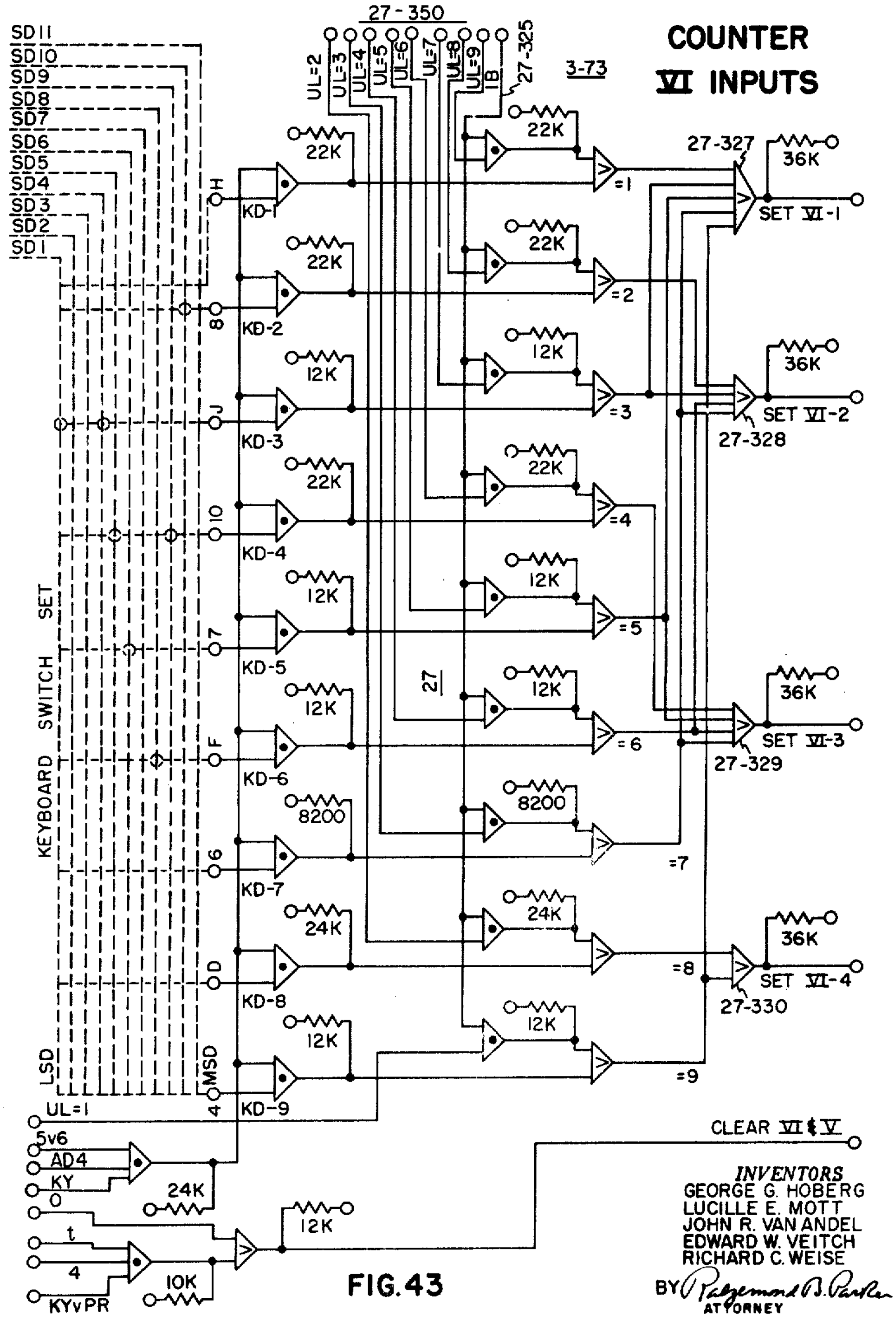

In order to produce the sector address, the address counter VI is utilized, and is provided with four preset input connections to the different counter stages in order to allow for storing the selected memory sector condition. The counter VI is cleared during state 0 for all instructions. At the end of state 1, as determined by the combined B timing pulse and state 1 signal at the corresponding "and" circuits 325, the unit selector 3–89 serves to set up the 10's complement of the units position into counter VI. Thus, each word pulse W at the input gate circuit 324 counts the counter VI, so that at the count of nine the output gating circuits 326 may cause the state selector circuits to go into the read or write states. As shown in FIG. 43, the keyboard digit may be alternatively set into counter VI during state 6. For this reason counter VI is cleared at the end of state 5. After the keyboard signal digit is set into counter VI, the digit is then counted out into the accumulator loop. Conversely, the address counter VI is used in the motor bar instruction for matching signals leaving the computer for the actuation of the printer, and is evident from FIG. 58.

In FIG. 43 the detailed logic of the counter VI input circuits 3–73 is shown as cross referenced in the diagrammatic representation of FIG. 27. Thus, for each of the unit levels UL–1 through UL–9, the complementing encoder matrix 27–350 converts the units level to the 10's complement for input at the respective counter stages. In the "or" circuits 43–327 through 43–330 the corresponding units level indication is converted to the binary preset signal for counter VI. Thus, the state selector will be controlled by address counter VI to effect reading or writing on the magnetic drum 3–51 only during the presence of the selected units sector as it occurs during the rotation cycle.

Simplified diagrams of one embodiment of the counter VI input and output circuits and operating conditions are shown in FIGS. 57 and 58. The circuits of FIG. 57 indicate the manner of presetting information into counter VI from either the pinboard, keyboard or an external tape unit. Thus, the address may be set up optionally from the different units in response to control signals in the computer either automatically derived during scanning of the pinboard or other input unit or manually selected by the manual control panel.

In FIG. 58, the connections of counter VI as used for other purposes than address selection are shown with provisions made for addition of information from a tape input unit and for producing an alarm for the print check operation. The connections are made for an absolute value shift instruction AS, which will hereinafter be described. The notation such as AD–60 indicates that this is the signal for instruction AS which changes the computer state from 6 to 0.

To enter information into the twelve keyboard columns corresponding rack step thyratrons are fired at times specified by the computer scanner circuit of FIG. 28.

The two conditions imposed upon the thyratrons for firing require that the computer and printer both provide command signals at respective thyratron grids. As may be seen in FIG. 29, the computer continuously scans the accumulator to see if any digits correspond to the current printer rack position. A match signal is generated and applied to the input gates 381 of all the rack stop thyratrons at the terminal 385.

Figure 42:
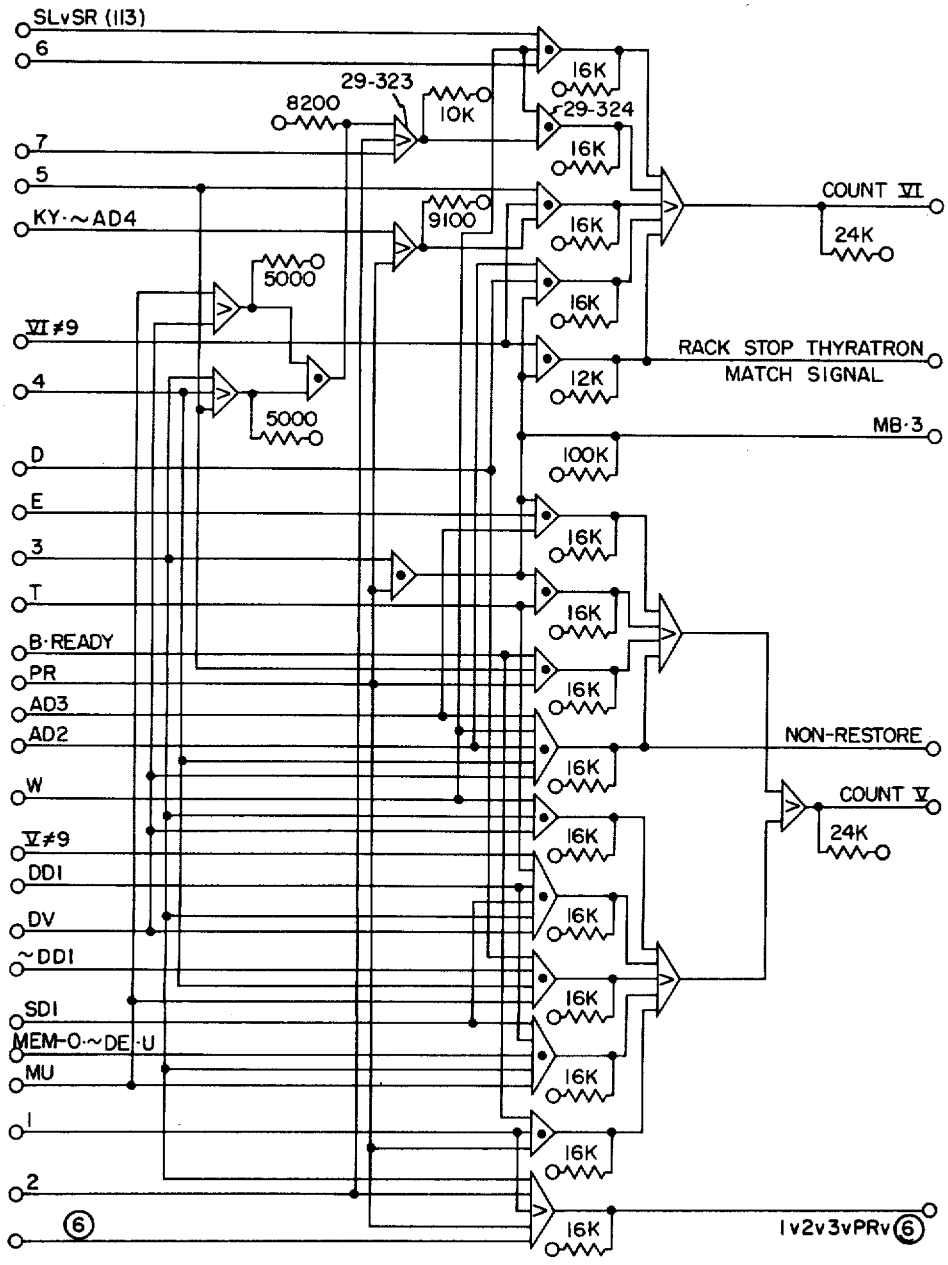

The match signal as seen from FIGS. 42 and 58 is generated by the computer counter VI so that each input gate which has a signal from the scanner indicating a match for the digit being inspected, serves to fire the corresponding thyratron. The signal through the input gates 381 admits a burst of eighteen one microsecond tvu pulses spaced about six microseconds or every word time apart and recurring every 1.7 milliseconds.

The scanner circuit (3–74) is shown in FIG. 28, and is made up of four flip flops SC–1 through SC–4, which by means of the output decoder matrix produces separate output signals signifying the digit times. The output signals SD–1 through SD–12 represent the digits of a word.

During the motor bar instruction MB, the accumulator is scanned continuously while matching for 0's, 1's, for setting up the accumulator word digits into corresponding printer racks, as seen in FIG. 29. In response to the multiplication instruction MU, the scanner is used to choose the least significant digit of the multiplier and thereafter precess through the more significant digits. Conversely, in division the scanner is used to choose the digit position of the word in the memory into which the quotient is to be written by signifying the most significant digit first and then by precessing to the least significant digit. Accordingly, it is seen that by means of the present computer circuits, transition is made between the keyboard-printer input-output unit and the computer circuits without providing synchronously actuated buffer memory devices.

The scanner circuit of FIG. 28 is used, in order to obtain directly the scanner signals SD–0 and SD–1, and to perform counting in a direct manner. This scanner is made up of the four flip flops SC–1, SC–2, SC–3 and SC–4 and an output matrix to give thirteen separate outputs (SD–0, SD–1, . . . SD–12). There are two inputs to the scanner, a count input and a clear input. When the count input is pulsed, the scanner counts to the next SD output, e.g., if the scanner is at SD–3, it will count to SD–4 or if it is at SD–12 it will count to SD–13 and automatically clear to SD–0. When the clear input is pulsed, the scanner will go directly to SD–0. This scanner is cleared to SD–0 in state 0 for all instructions, and may be actuated from different computer circuits in the manner shown in FIG. 29 to produce matched signals for firing the rack stop thyratrons to select printer characters in the manner hereinbefore described.

*Instruction Scanning Circuits*

The computer instructions may be derived from the automatically scanned pinboards as seen in the various views of FIGS. 30*a* through 30*d*, which are assembled in the manner shown in FIG. 31 into an overall circuit diagram. Each of the five pinboards (3–46) is designated in FIG. 30*b* by the Roman numeral notation I–V. The pinboard sections 5–81, 5–87, 5–89 and 5–83 are noted by the respective Arabic numbers 1 through 4. Associated stepping switches SS are similarly identified. The wiring diagram is simplified in that a single control path is used to indicate the several input and output leads of the pinboard and stepping switches SS. Thus, the designation 5, 16 etc., indicates the number of leads of a particular cable.

Figure 30A:
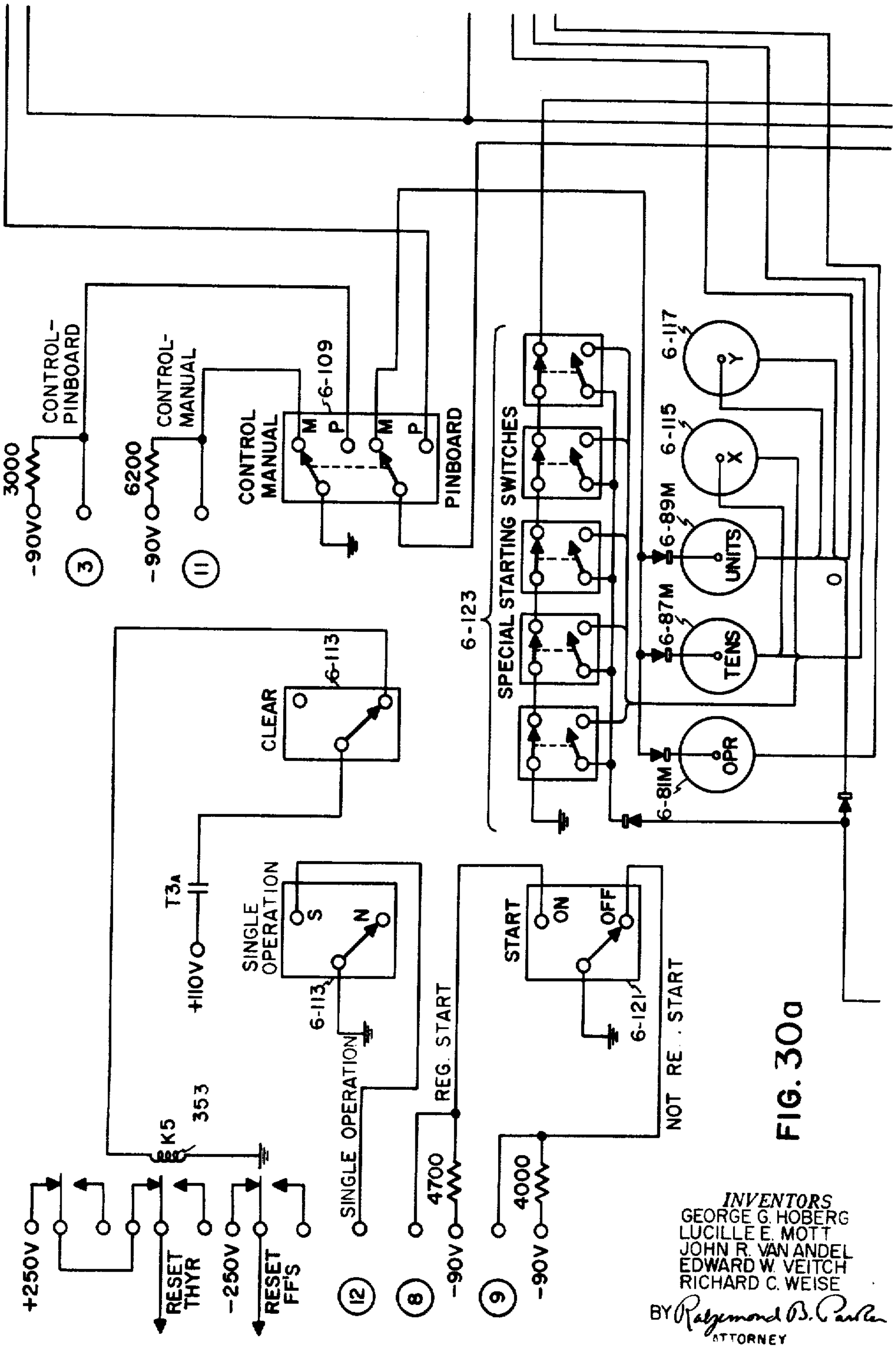
Figure 30B:
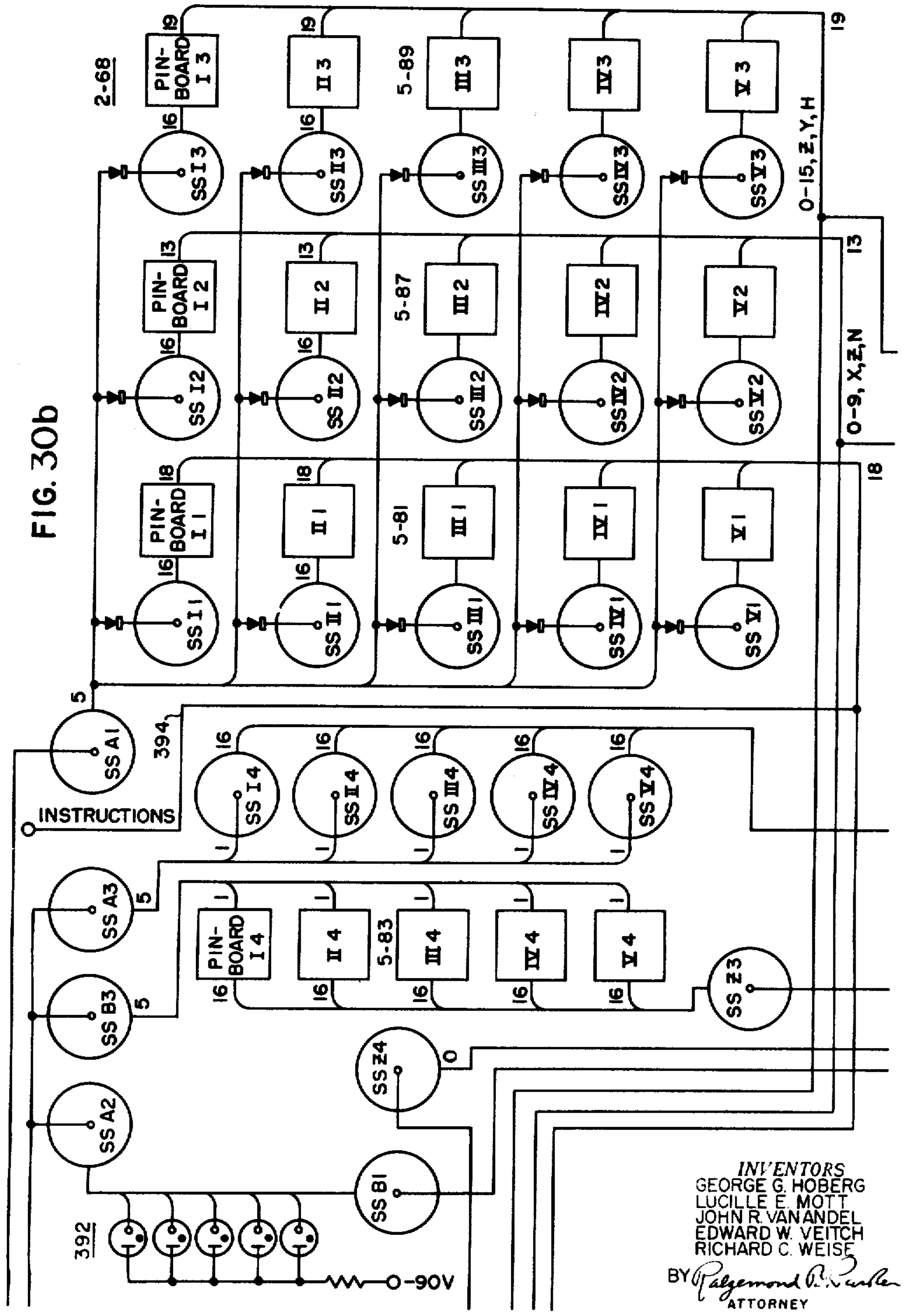
Figure 30C:
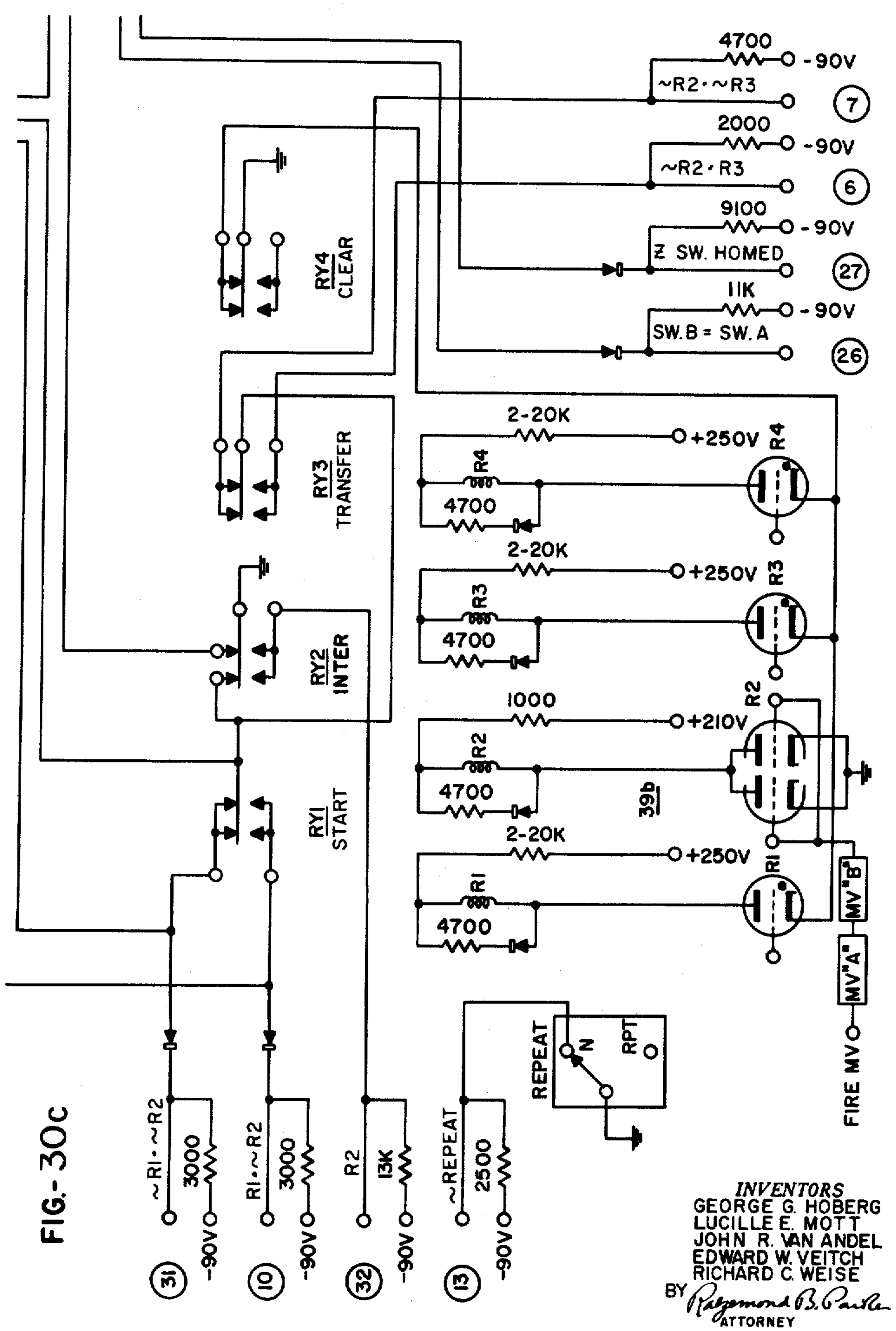
Figure 30D:
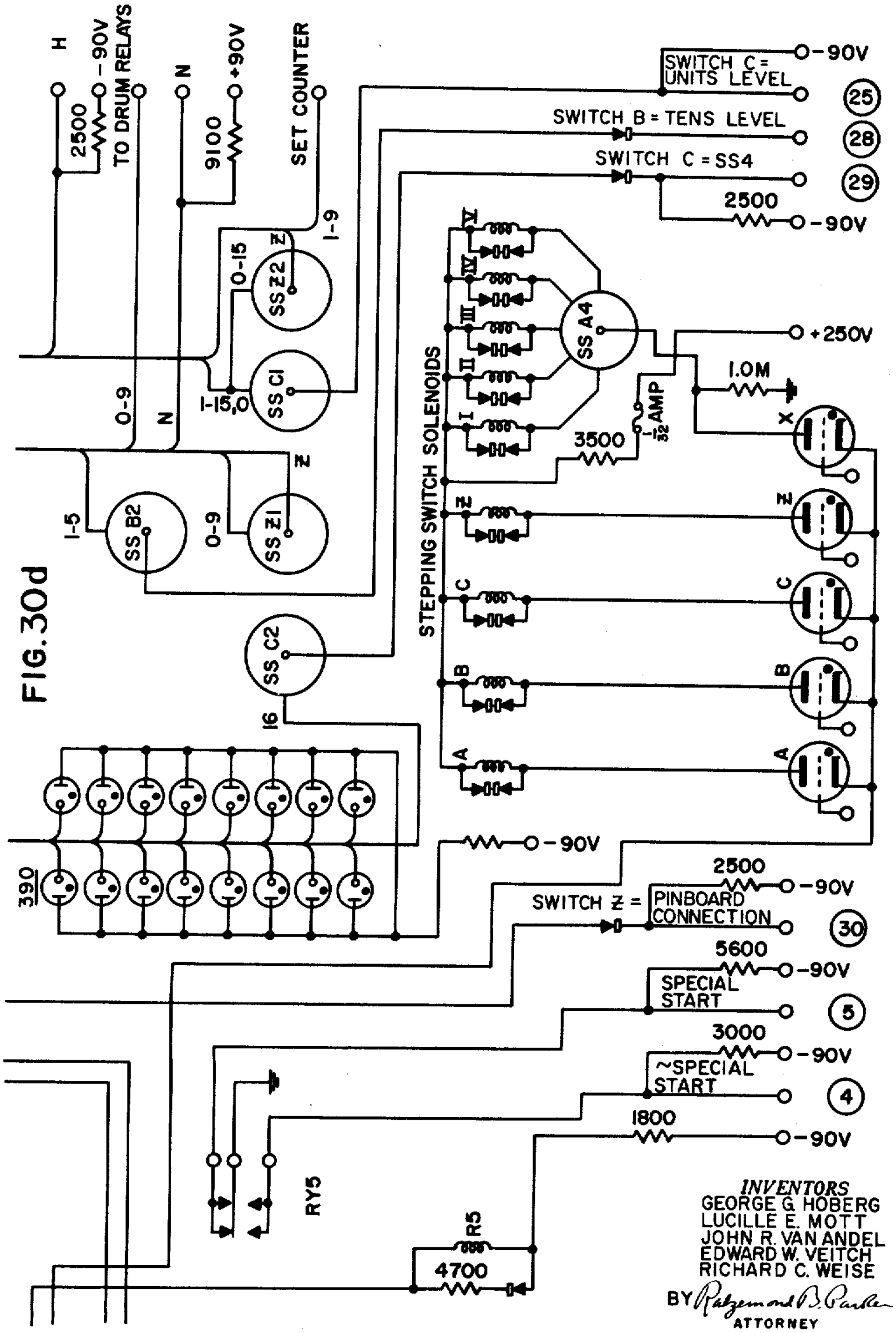

It is seen that each of the stepping switches I through V have three banks of contacts for respectively scanning the pinboard sections 1, 2, and 3. Each bank has sixteen contacts which serve to selectively connect in sequence to ground the leads represented by one of the sixteen rows of the pinboard 5–46. A fourth section of the stepping switches I through V is used to actuate the neon lamps **30*d*–390 for indicating the particular step of the program being connected in the computer circuit at any time. The stepping switch A is connected to designate the pinboard selected. The first bank of the stepping switch A is coupled in series with three switch banks 1, 2 and 3 of stepping switches I–V. The further section 2 of stepping switch A functions to match stepping switch A to the position of the memory switch SSB–1 to indicate proper pinboard selection and also serves to light one of the lamps 30*b*–392 designating the selected pinboard. Bank 3 of stepping switch A serves to select the fourth bank of one of the stepping switches I–V which in turn light the pinboard step light and match the selected switch to the position of the memory switch SSC–2 to indicate proper row selection. Bank 4** of stepping switch A, as shown in FIG. 30*d*, connects in only one stepping solenoid for the selected pinboard I to V, so that only one pinboard switch is stepped at a time and return may be made to the portion of the sequence which was last used by any pinboard.

The rows of the fourth section 5–83 of the pinboard are scanned by the third bank of a special Z stepping switch, which, as hereinbefore noted, is used for counting purposes during the instruction scanning procedure. The first three banks of this switch are used respectively for scanning the pinboard sections 5–87, 5–89 and 5–83 to permit use of only the program tens and units digit specified by the Z switch. The fourth Bank SSZ–4 is used for permitting reset of the scanning switch to zero in response to the instruction 0 when set up in pinboard section 5–81.

Further stepping switches B and C are provided for respectively remembering tens and units digits to designate pinboard number and step during the transfer instructions, since ordinarily the data set up in the stepping switches is switched after use and is therefore destructively read-out. Only in the transfer operations is memory of the preceding instruction step required, and this operation alone uses the B and C switches. Each of the stepping switches has an actuating solenoid which is fired by means of a thyratron circuit. Back to back coupled diode dampers are used across the solenoid coils to damp unwanted inductive ringing and to assure a single operation step in response to an input pulse. The thyratron input circuits are operated by diode control circuitry found in FIGS. 47 and 51 of the diode logic section.

Figure 44:
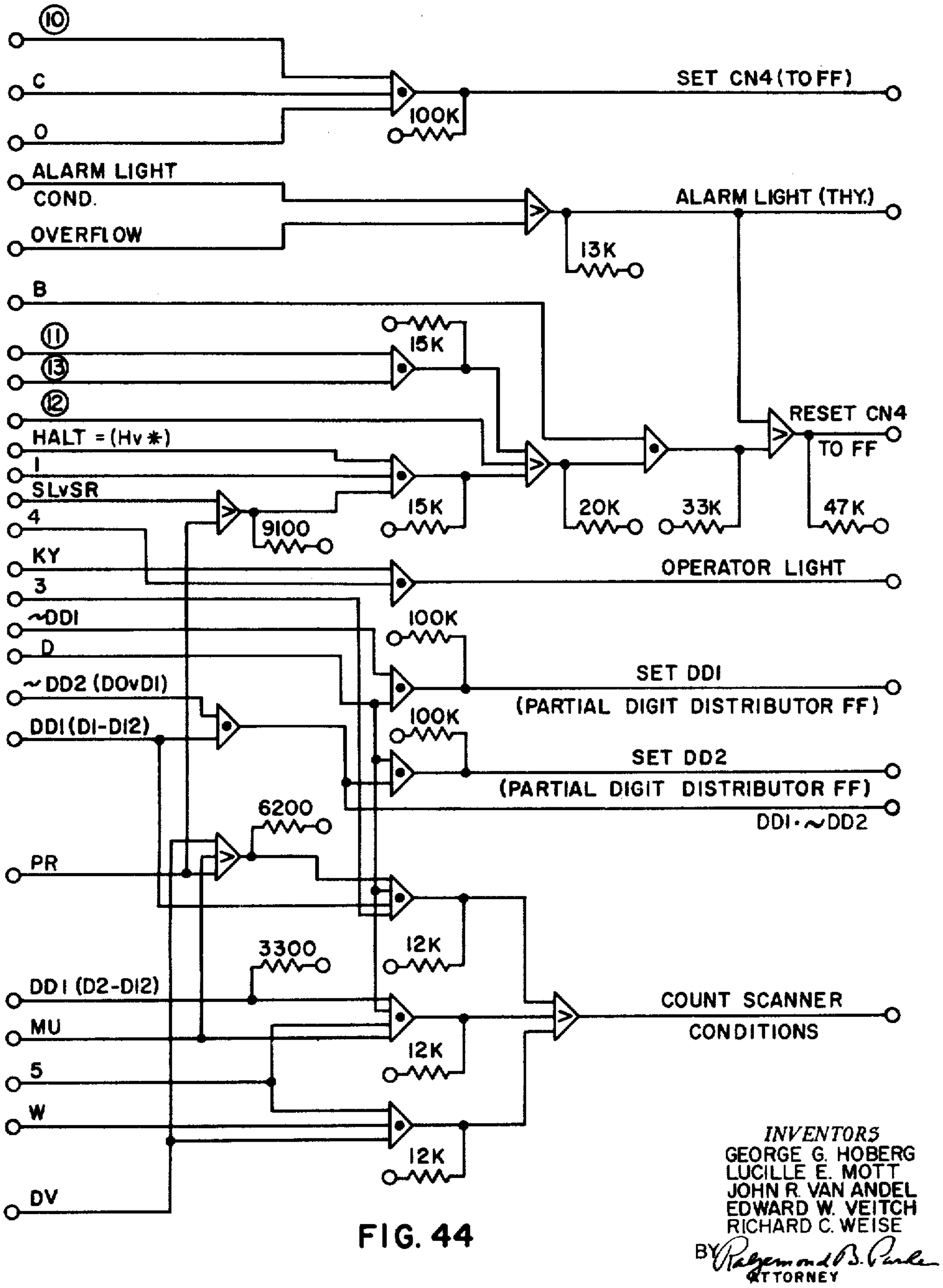
Figure 45:
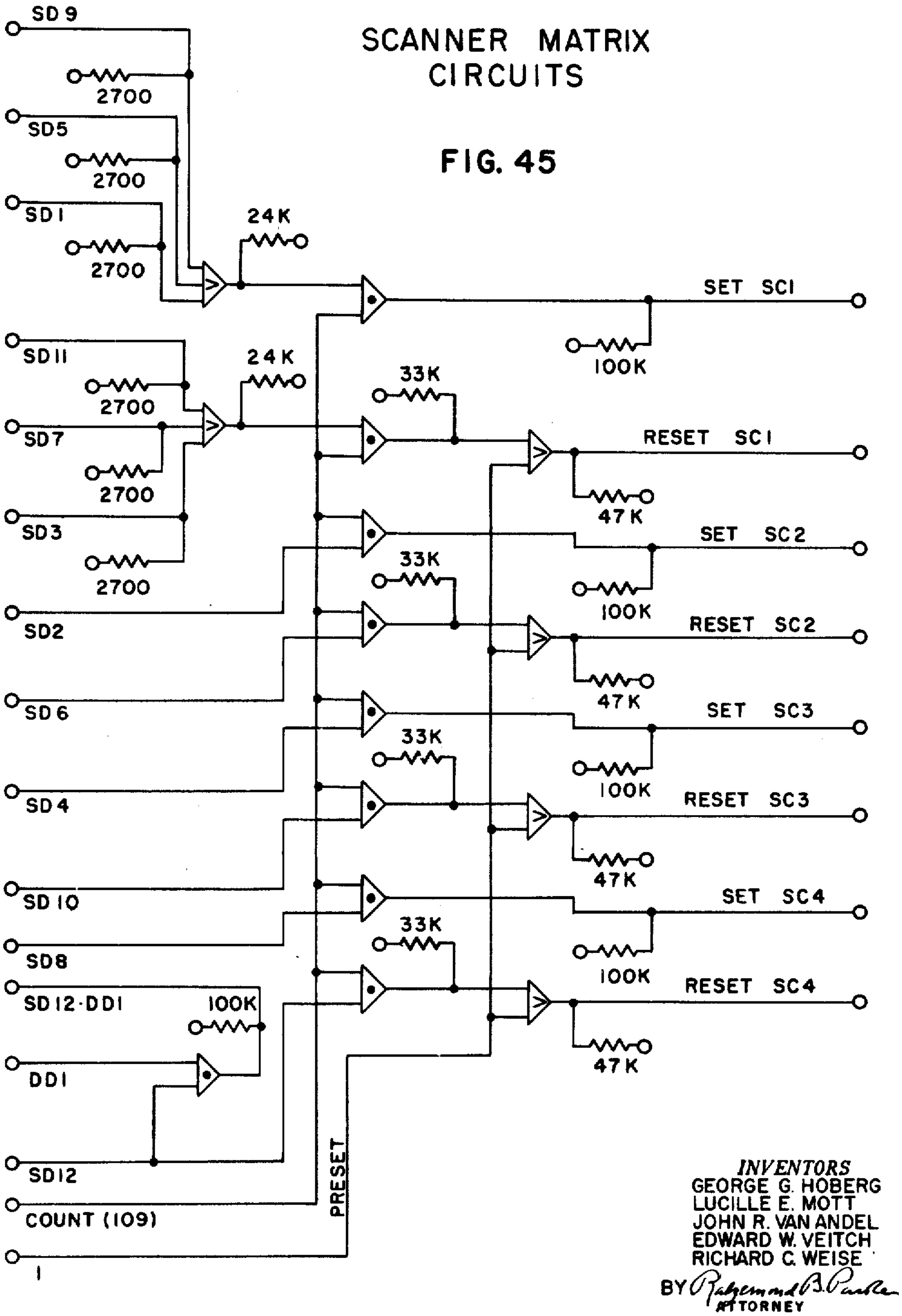
Figure 46:
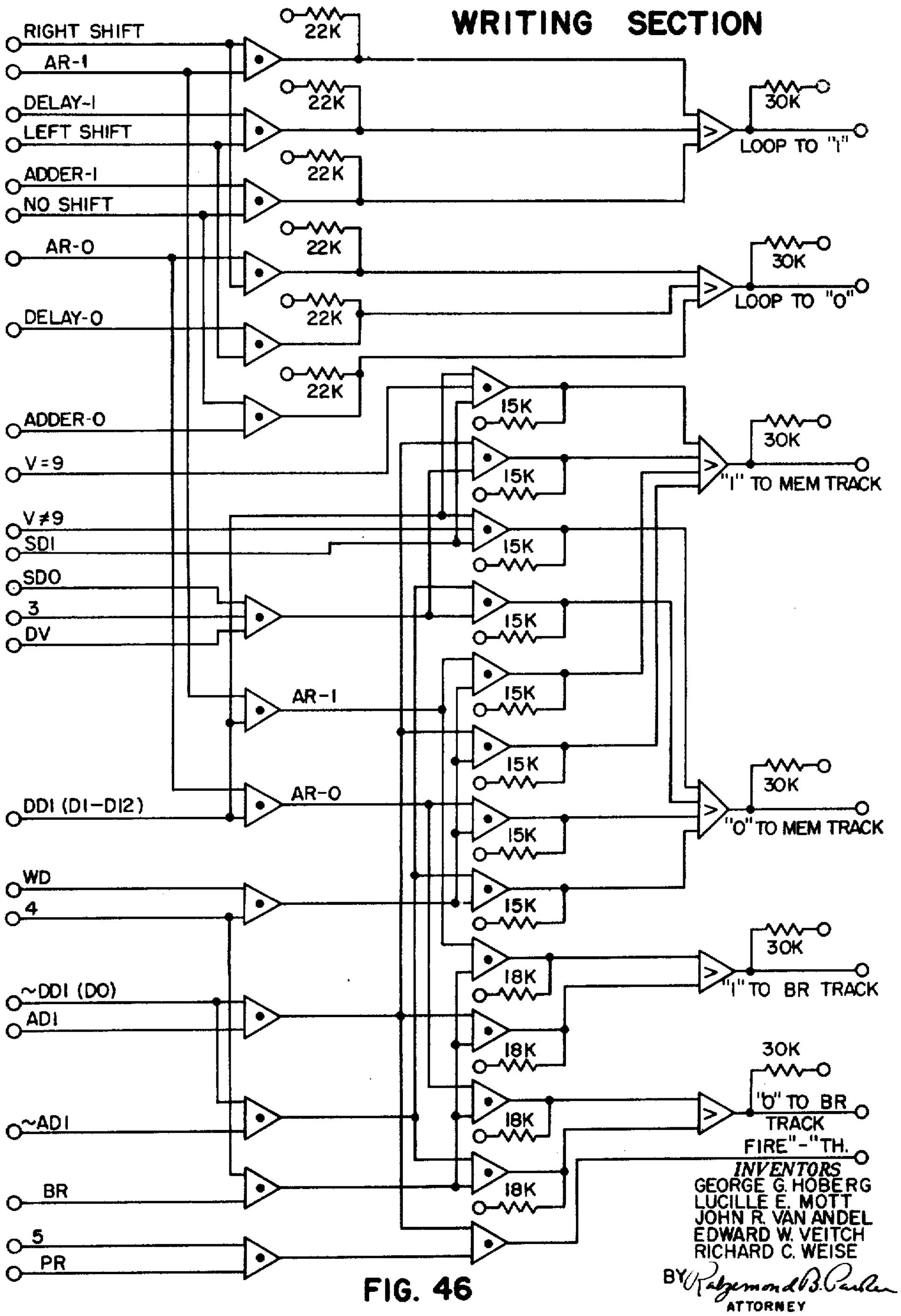

Each of the instructions set up on the pinboard section 5–81 is brought out at an instruction cable **30*b*–394**, which represents a plurality of leads designated throughout the diode control circuits by such notation as KY for keyboard, MU for multiplication, etc. As seen in FIG. 30*a*, the manual control section 6–81M of the computer is coupled in the same manner to provide the alternative instructions at the instruction cable 394 when the manual control switch 6–109 so directs. The various other manual control instructions are coupled to terminals appropriately numbered within circles, which may be traced through the diode logic for appropriate circuit connections to determine the manner of operation. For example, as seen in FIG. 44, the terminal 12 of FIG. 30*a* is grounded when the manual control section 6–113 indicates a single instruction step at a time to cause reset of the flip flop CN–4, which prevents operation of the stepping relay.

In connection with the computer operation, several relays R–1 through R–5 are employed. In FIG. 30*c* the operational circuits for the relays R–1 through R–4 together with their corresponding contact connections is designated. Relay R–1 is used to permit the starting cycle to begin in all starting operations including the special starts at separate pinboards by medium of the special starting switches 6–123.

Relay R–2 is designated an interrupter relay and is used to protect the stepping switch contacts. Thus, this relay is used upon firing of a pair of single shot multivibrator circuits 396 as shown in FIG. 37 to drive the interrupter relay R–2 at such time that the thyratrons do not step the switch contacts while current is flowing through the stepping switch contacts. This increases the life and reliability of the stepping switches and therefore permits reliable computer operation with mechanically scanned switch assemblies. The similar schematic multivibrator circuit of FIG. 39 is used as the hereinbefore mentioned Multivibrator I (3–76) in driving the rack stop thyratron section 3–77 in response to emitter signals.

Figure 47:
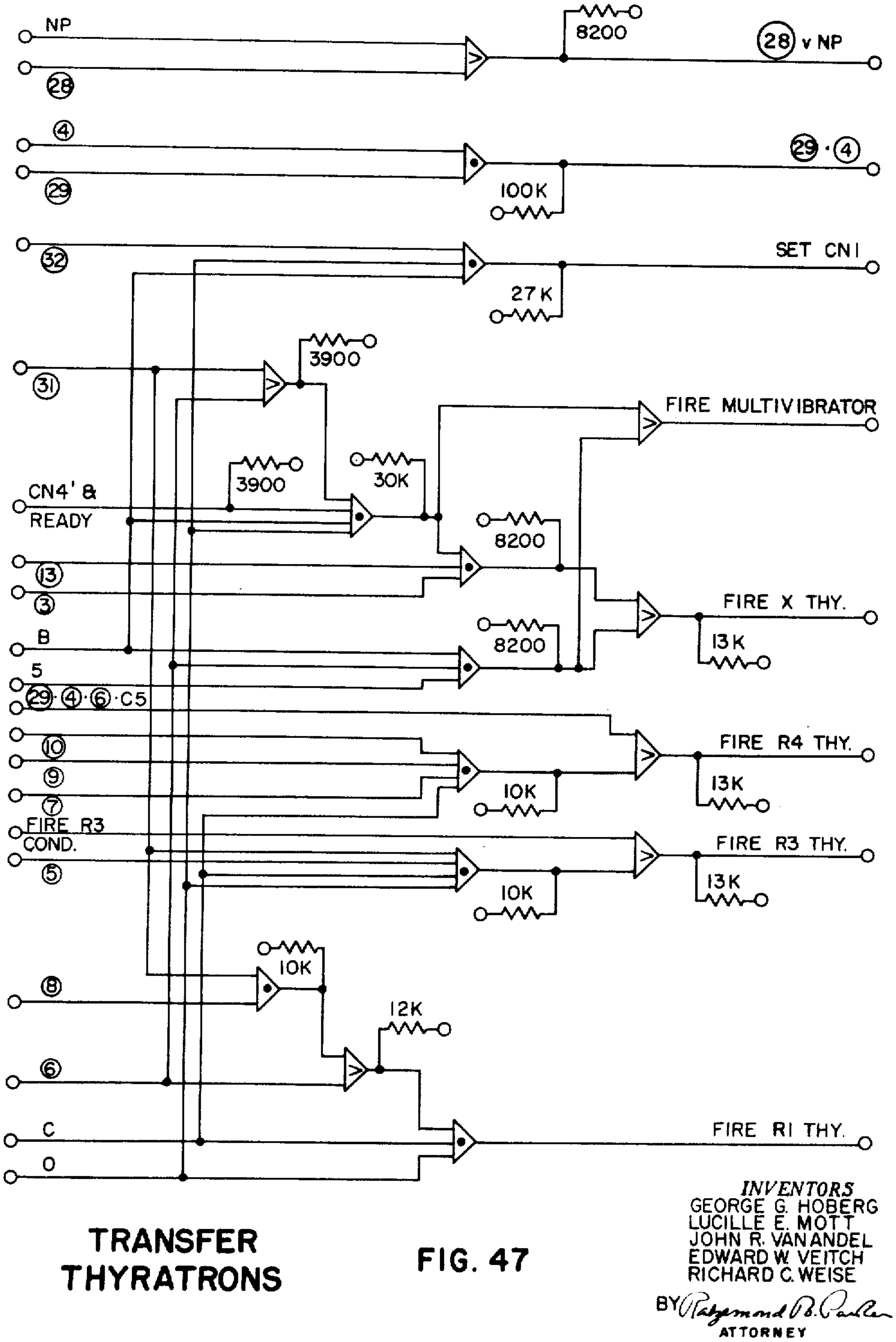
Figure 51:
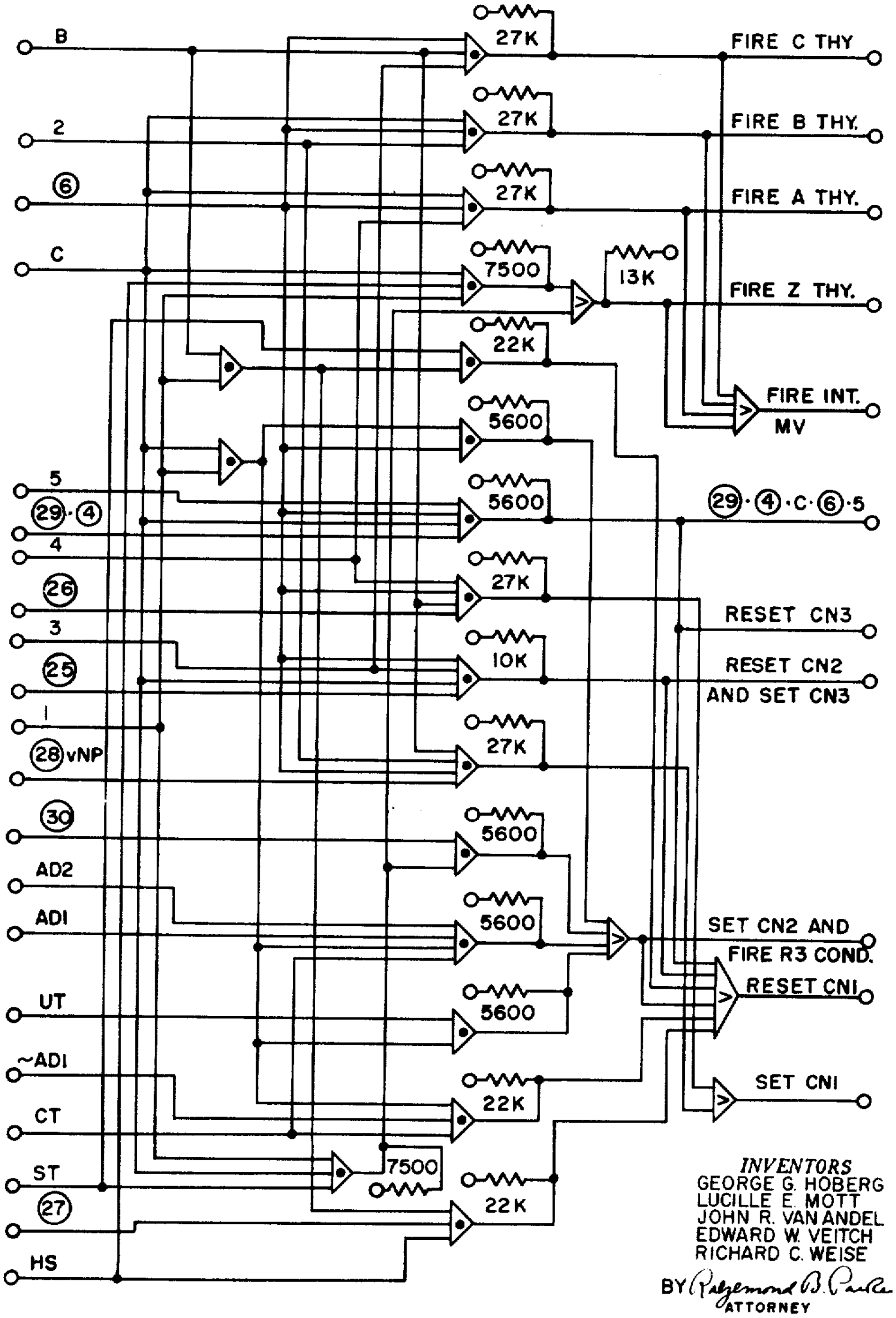
Figure 52:
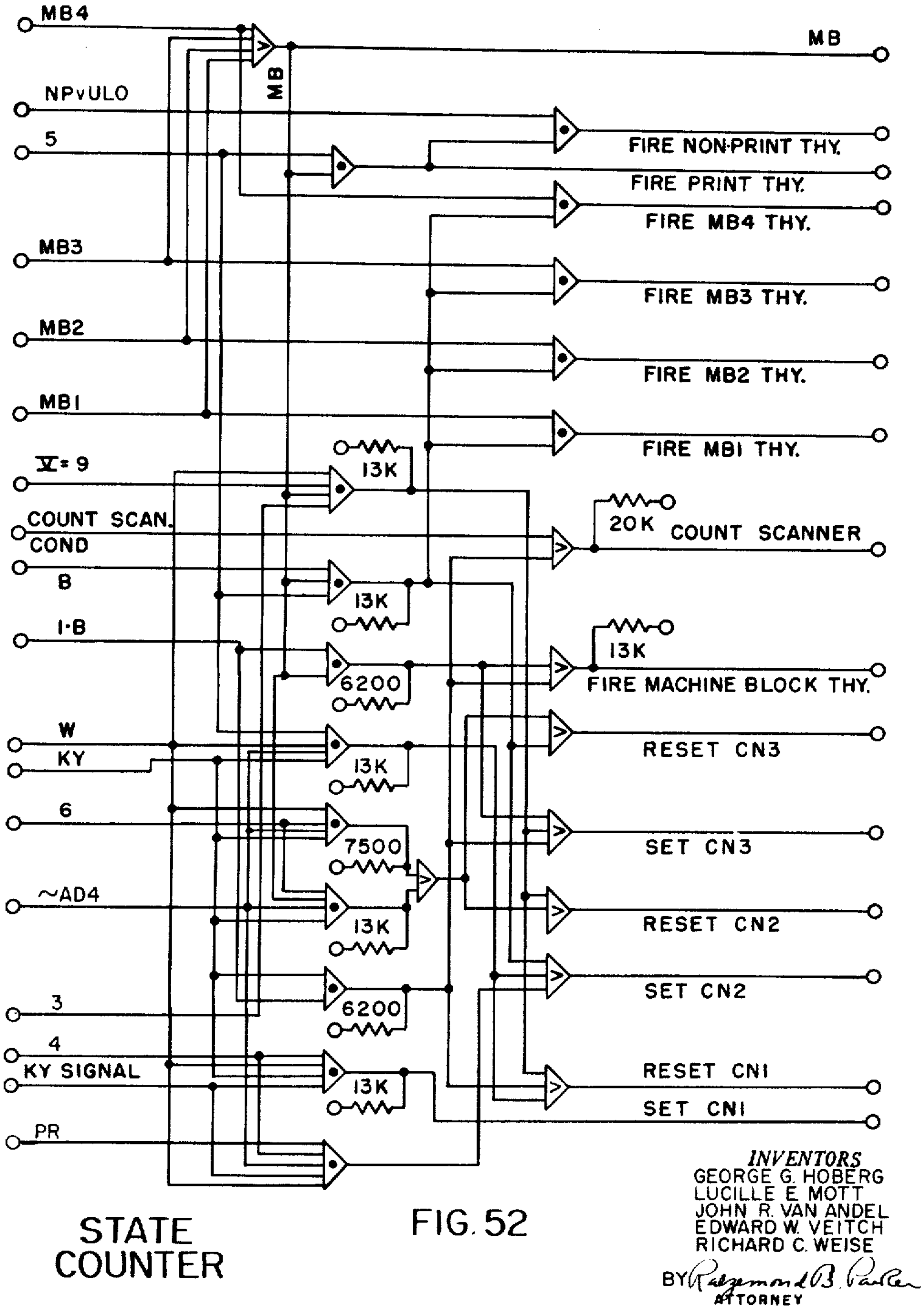
Figure 53:
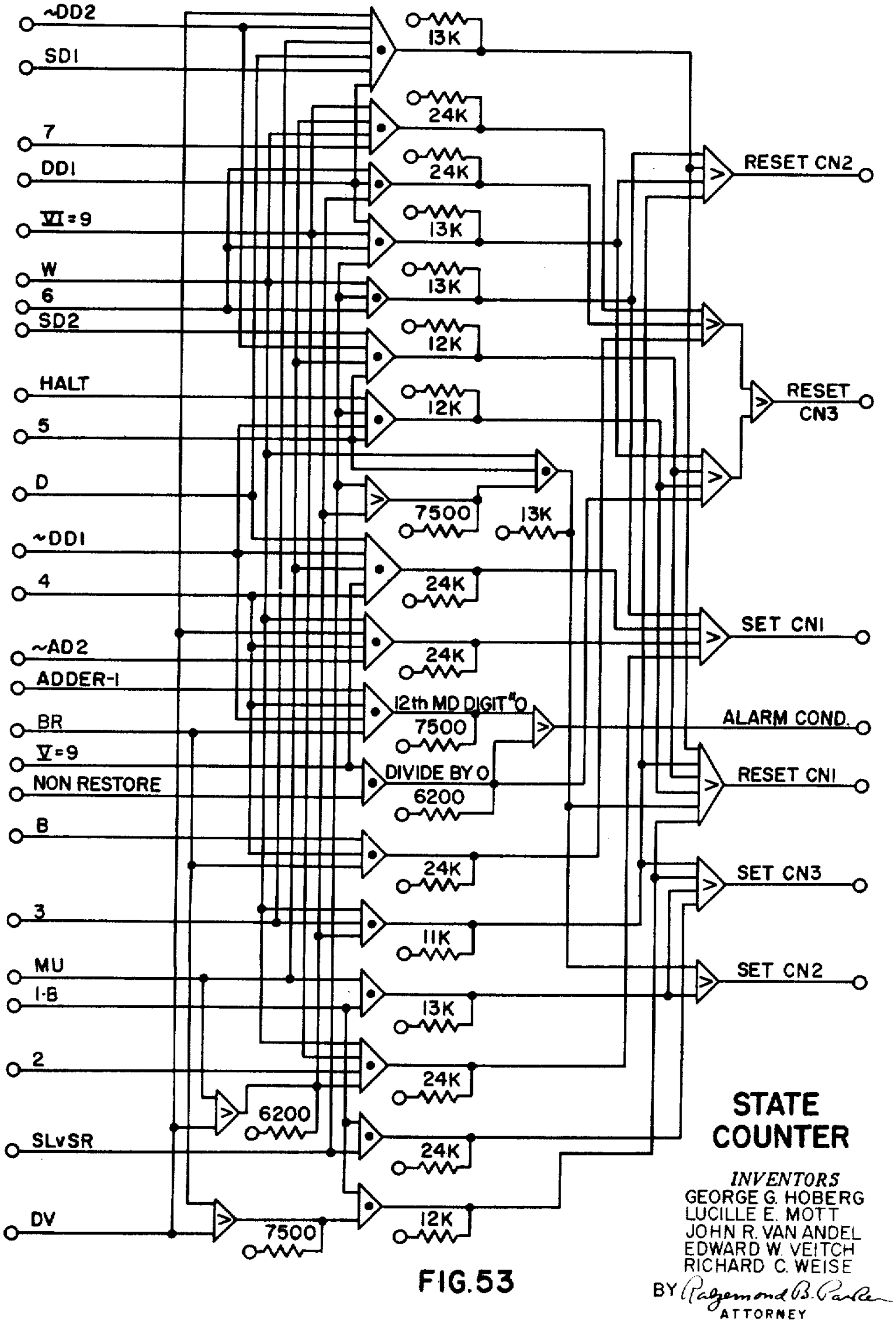
Figure 54:
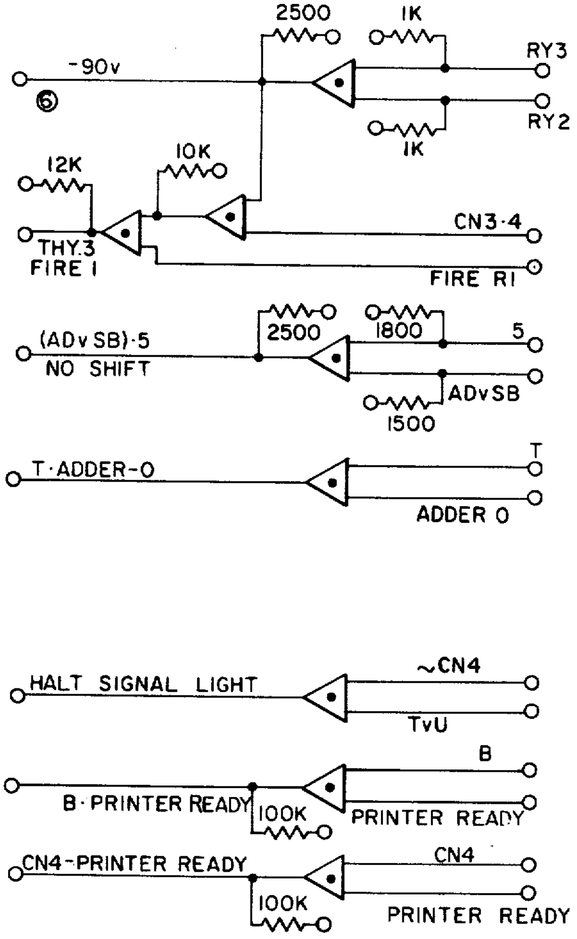
Figure 55:
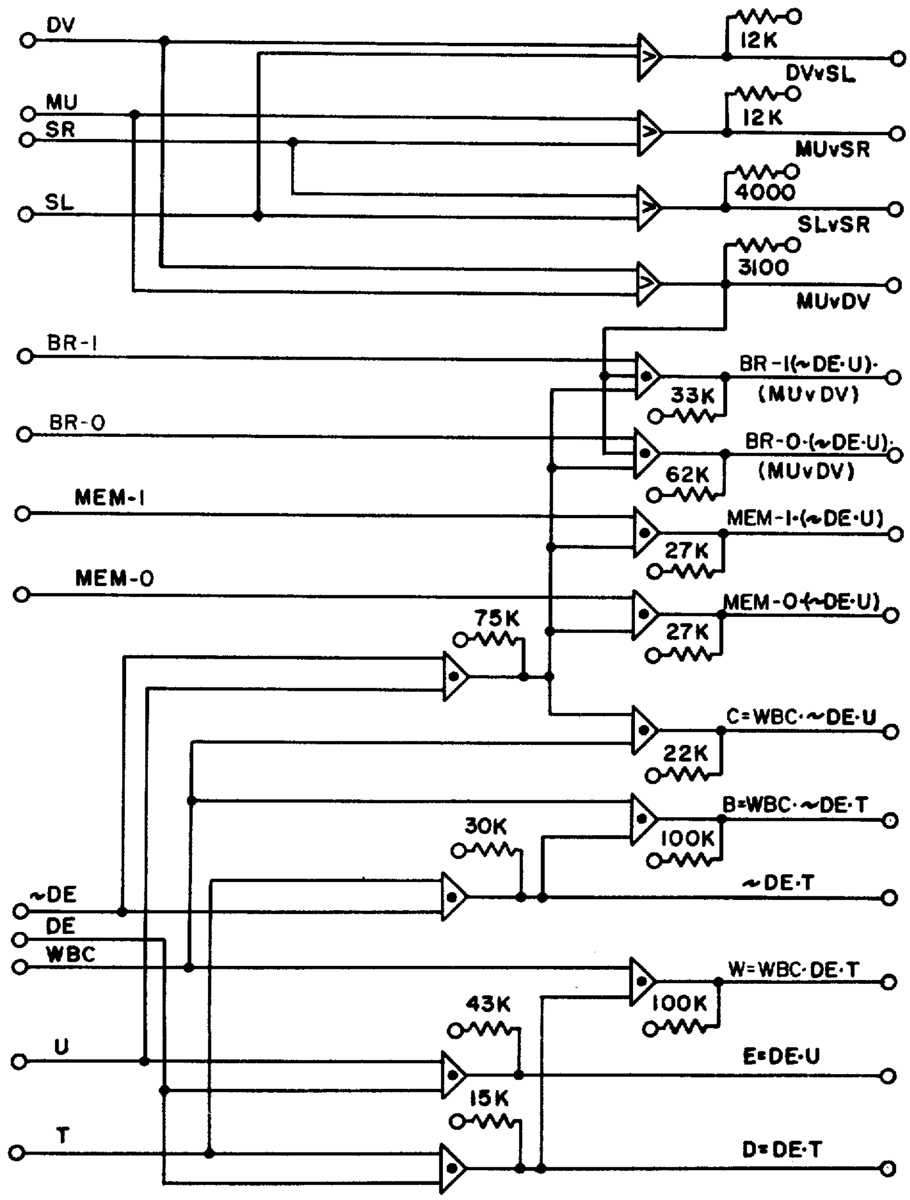

Relay R–3 is used during transfer operations to effect control in remembering the transfer instruction as performed in the diode logic circuits of FIGS. 42, 47 and 51. The relays R–1, R–3 and R–4 are actuated from thyratron circuits. The relay R–4 is coupled to clear the relays 1, 3 and 4 in the manner shown, by opening the cathode circuit connections of the actuating thyratrons. Typical operational circuits for relays R–3 and R–4 may be traced in the diode logic of FIG. 47. The relay R–5 is used in the special starting operation to produce both a make and break contact and is initiated by switch 6–123, and is actuated from the —90 volt power supply potentials.

Those portions of FIG. 30 and other logical circuits which serve to operate the Z switch are shown in FIG. 32. It is seen that the Z switch is stepped only during state 1 when a stepping (ST pinned S*abc*) or homing (HS pinned 0) instruction occurs. Thus a change of control to state 0 ends the stepping and permits the computer to go on to further program steps. The Z switch section 4, for example causes stepping with C pulses until the home position is reached.

The Z switch sections 1 and 2 set up the address in the manner diagrammed in FIGS. 18 and 57. Thus each stepping switch position defines a different drum track or sector respectively whenever the corresponding pinboard sections 89 and 87 designate the tens level and units level address characters to be those held in the Z stepper. Somewhere in the program the stepping instruction S*abc* is used to step the switch once to change the address location accordingly.

Counting of iterations is accomplished in Z switch section 3 as signified by the Z column 83 of the pinboard. Likewise, in each iterative program the stepping instruction S*abc* is used to step the switch once and thereby count the number of passes. The instruction further specifies a transfer to pinboard a step *b* when the *c* condition is reached. This transfer is held in stepping switches B and C until relay R3 is actuated. Thus the stepping instruction contains an unconditional transfer instruction to designate a further program step. By firing the R3 thyratron when the *c* switch is in the position pinned in the Z column 83 of the pinboard, the next program step specified by the transfer address is selected in state 2 to which the control state is sent. Likewise the iterative counting is ended by changing to state 2 when the *c* condition is reached.

Figure 34:
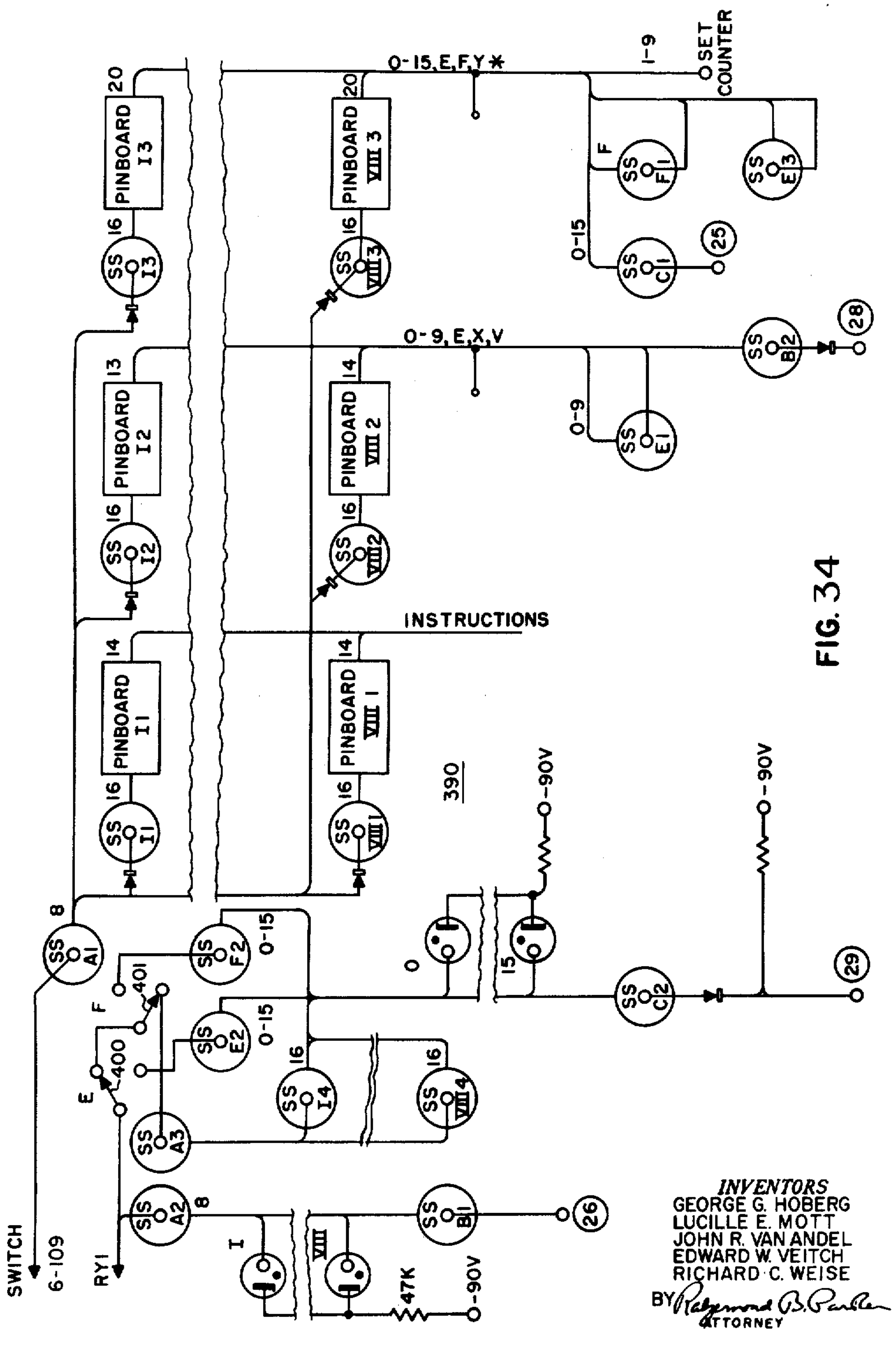

The computer may be adapted readily in different models for larger memory, larger instruction storage capacity or modified instruction catalogue. As seen from FIG. 33, the pinboard assembly and manual control panel may be modified to take into account such modifications. Thus, provision is made for eight rather than five pinboards to permit scanning of one hundred and twenty-eight sequential instruction steps. The manner of coupling the modified pinboard scanning circuits is indicated in FIG. 34 along with a more versatile connection of two iterative or counting switches E and F in lieu of a single Z switch. The manual control panel thus simply indicates E and F pushbutton switches 400 and 401, and serve to cause an indicator lamp to designate the switch position when desired.

Certain variations may be made from the hereinbefore described instruction sequence. For example, the shift instruction operations may be included with an absolute value instruction providing for operations to designate the accumulator sign. This instruction may be termed AS to designate the combined absolute value and shift operations and may be pinned as shown in the pinboard of FIG. 33 with the following results:

A1*b*—Shift accumulator contents *b* places to the left.
A2*b*—Shift accumulator contents *b* places to the right.
A3—Make accumulator contents positive.
A4—Make accumulator contents negative.
A*—Halt.

In FIG. 33 also it may be seen that the print or former motor bar instruction may be carried out by pinning P in the first section and 1, 2, 3 or 4 in the second section to designate the respective motor bar. By pinning a 0 in the third section the operation may be carried through without printing. By pinning the * in the third section, the computer will halt after printing.

To execute control of the E and F counting switches of FIG. 34, which have replaced the Z switch hereinbefore described in connection with FIGS. 30 and 32, the stepping instructions may be pinned as follows:

S0*b*—Step the E switch once; then if $E \neq b+1$, execute the next instruction; if $E=b+1$, execute the instruction after the next instruction.
S1*b*—Same as above, but using the F switch.
S2*b*—Step E and F switches once; if $E \neq b+1$, execute the next instruction; if $E=b+1$, execute the instruction after the next instruction.
H0*b*—Advance the E switch, stopping at position *b*.
H1*b*—Advance the F switch, stopping at position *b*.
H2*b*—Advance the E and F switches together, stopping both switches when E is at position *b*.

Thus, even more efficient use may be made of the available number of instructions in the pinboard by operating the E and F switches to modify the instruction sequence and memory.

Figure 35:
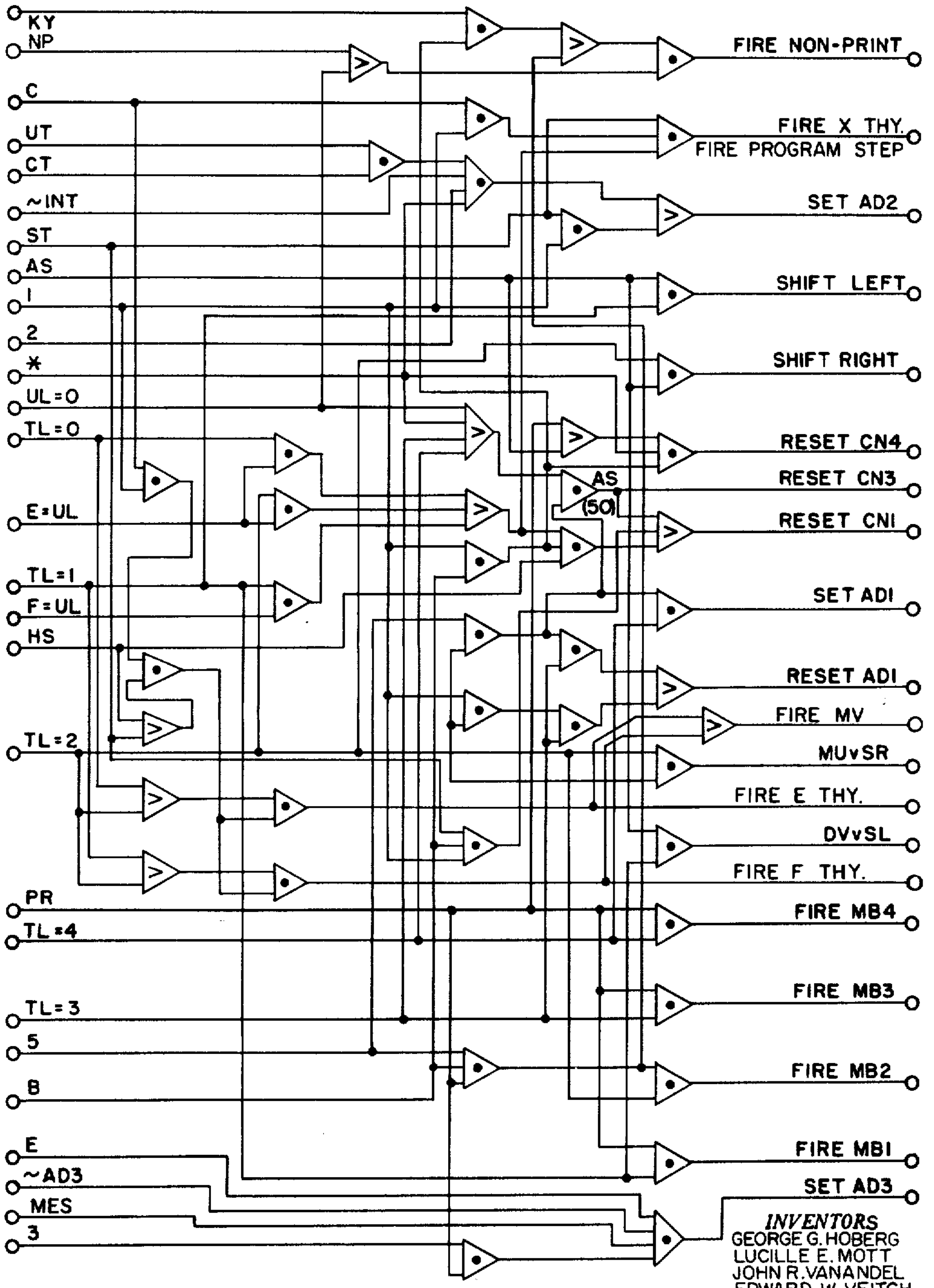
Figure 36:
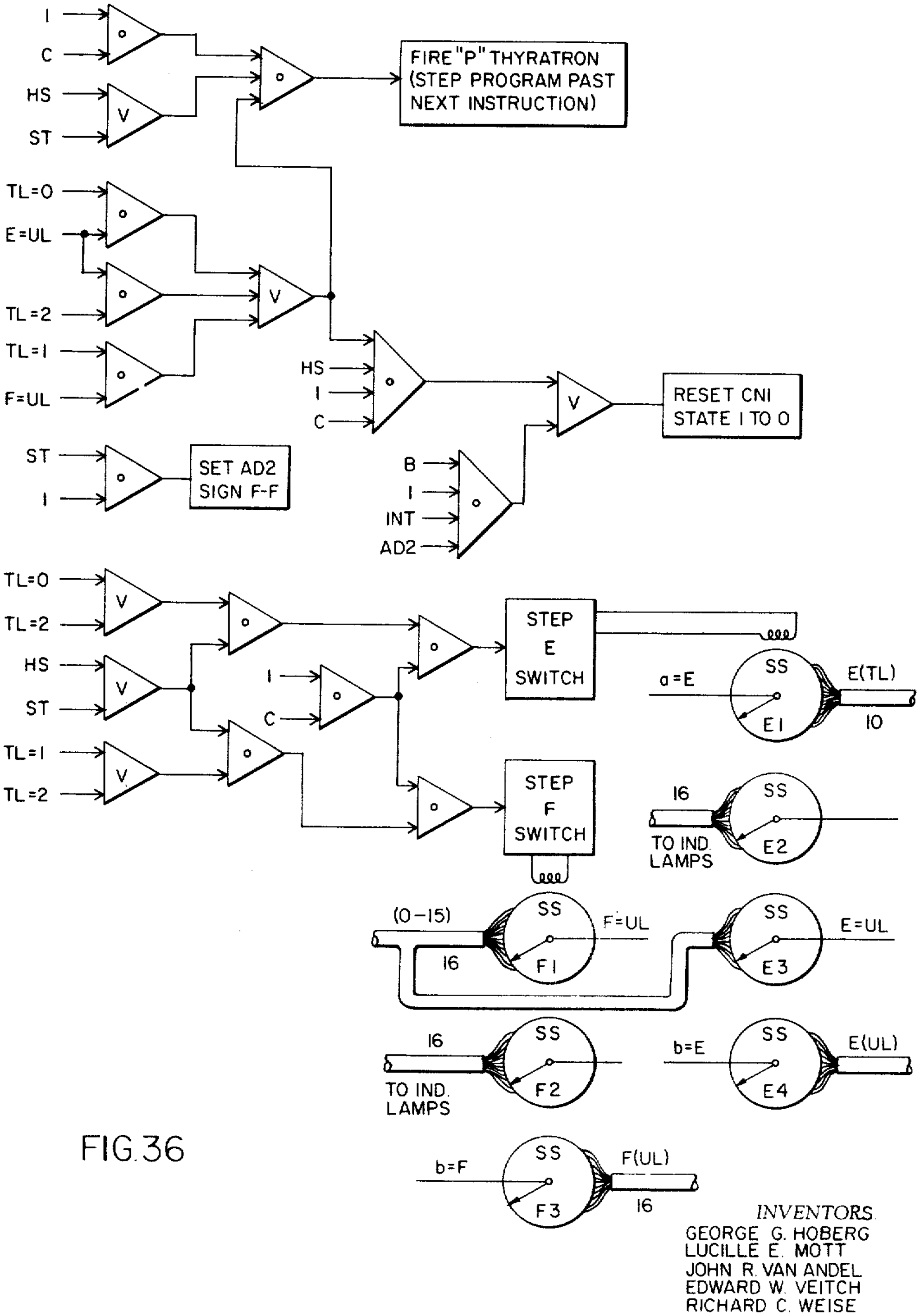

Circuits which may be used in operation with the modified control circuits of FIGS. 33 and 34 to control the E and F switches are shown in FIG. 35, and are simplified in FIG. 36. The E and F switches operate in the same general manner as the hereinbefore described Z switch to select programs and perform iterative counts. Thus, the differences in the control circuits for operation of the E and F switches are emphasized in FIG. 36. The signals $E=UL$ and $F=UL$ correspond to $Z=CL$ in FIG. 32, wherein a pin in the corresponding E or F column of the pinboard section 87 will produce a signal connection through the respective switch at that switch position only.

The address output leads E(TL), E(UL) and F(UL) are connected for a single circuit through the switch to the wiper arm. Thus, if the pinboard specifies $a=E$, $b=E$ or $b=F$, the E or F switch settings be substituted for the corresponding address digit.

The control circuits are selected to step the E and F switches for the corresponding step (ST) and home (HS) conditions specified in the pinboard. These instructions also serve to fire the program thyratron and thereby to skip the next instruction during state 1 whenever the specified count is reached ($F=UL$, $E=UL$). In utilizing the stepping instruction (ST), the succeeding instruction generally provides for a transfer. Thus the transfer operation is not directly performed by the stepping instruction as with the Z switch.

In general the stepping instruction (ST) advances the switch only one step per pass, while the homing instruction (HS) continues to step the switch until homed. Thus the AD2 (sign) flip flop is actuated by the step instruction ST to thereby change the control to state 0. However, control is not set to state 0 by the home instruction (HS) until a match ($F=UL$, $E=UL$) is reached, and the control continues in state 1 to step the specified switches with each C pulse until homed. In this manner the switches may be homed to any specified position as distinguished from the single home position of the Z switch.

*Diode Control Circuits*

The notation used throughout the logical and diode diagrams is listed in the following chart to facilitate an understanding of the circuit operation.

AR-1 or AR-0—A register data.
BR (or MD)—B register instruction.
BR-1 or BR-0—B register data.
MU—Multiply instruction.
DV—Divide instruction.
0, 1, 2, 3, 4, 5, 6, 7—Operational states.
SL—Shift left instruction.

SR—Shift right instruction.
I=9 or I≠9—Output count from counter I.
MEM (1)—Memory data ones.
MEM (0)—Memory data zeros.
AD—Addition instruction.
SB—Subtraction instruction.
KY—Keyboard instruction.
RD—Read drum instruction.
WD—Write drum instruction.
MB or PR—Print accumulator contents instruction.
TL—Tens level address digit.
UL—Units level address digit.
AS—Absolute value and shift instruction.
*—Halt the computer.
HS—Home the special switch instruction.
ST—Step the special switch instruction.
MOD EM'TR or MES—Modified emitter signal.
INT—Interrupter relay signal.
CT—Conditional transfer instruction.
UT—Unconditional transfer instruction.
KY "—"—Minus keyboard signal.
TR (or ⑥)—Transfer relay R-3 signal.
NP—Non print instruction.
TR-12—Read tape instruction.

The diode logic circuits used in the basic computer both for control signals and data are shown throughout FIGS. 40 through 55. Certain variations are disclosed in some of the logical circuit diagrams of other figures to indicate the manner in which different features may occur from model to model. In each of the diode logic circuits the input and output leads are supplied with reference symbols indicating the signal conditions. General operation has been discussed heretofore, and certain circuits have been traced through and cross referenced. These circuits are therefore presented in such detailed form that an operable computer system may be readily produced by those skilled in the art.

In general, the voltages defining the instructions to be carried out are ground signals going into the diode system at the pinboards as controlled by the scanning switches. The flip flops and counter circuits each use pulse amplifiers of the type hereinbefore mentioned to drive the diode system. In using output signals from the diode system, they are sampled with timing signals of two microsecond width, termed chopper pulses TvU as seen from FIG. 8. These pulses are gated against a flip flop signal to produce high current pulses. The inhibit pulses, when required, are available at one output winding of the pulse transformer. In general, the diode circuits are designed to use as few intermediate flip flop or pulse amplifiers as possible, even though more diodes may be required in some circuits than otherwise.

The diode circuits are presented in such form that they may be mounted readily upon plug in panels for circuit interconnection.

*Addition-Subtract Operation*

In the addition or subtraction process the pinboard is pinned in the three sections with the notations $+ab$ or $-ab$. This instructs the machine to automatically sequence through the steps causing the contents of memory location *ab* to be added to the contents of the accumulator. The addition is algebraically done with automatic handling of the signs and therefore the only change in the subtraction operation is that the word in the memory is complemented when the negative sign is set in flip flop AD-2. The addition process of one circuit embodiment may be traced in the logic of FIG. 26, and also through the diode control circuit section of FIGS. 40–55. Control is changed from the idling state 0 to state 1 where the track selection is made in the manner illustrated by FIG. 18. Control then changes to state 2. The sector coincidence is established during state 2, where control changes to state 4, in which the actual addition takes place.

In state 4, at digit time DT–0, the sign of the word in the memory is read into flip flop AD–2 as seen in FIGS. 26 and 41. Since addition is made into the accumulator, the sign flip flop AD–1 already holds the accumulator sign. The word in the accumulator is continuously cycled as shown in FIG. 22. During the D pulse at the end of digit time DT–0 of state 4, or the tenth bit time, the flip flop AD–2 is set if the signs are opposite and reset if the signs are the same. When the signs are opposite, the numerical portion of the word from the memory is complemented. The accumulator is never complemented during state 4. The numerical portion of the word from the memory is complemented by sending memory 0's to the adder instead of memory 1's. Accordingly, a 9's complement is produced and is accompanied by a pre-carry pulse arriving between digit time DT–0 and DT–1 thus producing a 10's complement.

During digit times DT–1 to DT–12, the bits from the accumulator and memory tracks are alternately entered into the adder which may cause a carry to be stored in the carry flip-flop circuit AD–3. Because of the serial adder operation, the carry is entered to the adder between digits so that it will appear with the next highest order digit. The condition of flip flop circuit AD–2 and the carry condition are compared after addition to determine whether the capacity is exceeded and is also compared to determine whether the sum is in complement form. If the latter so, the control is changed to state 5 when the accumulator is complemented and flip flop AD–1 is complemented. The addition is finished and control goes to state 0. A flip flop circuit CN–4 is provided to control whether the computer stops or proceeds automatically to the next instruction. Thus, whenever CN–4 is reset, the computer, when it goes to the idling state 0, will remain there until one of the start buttons is pushed. Other arithmetic operations are performed in the computer by use of the addition process such as multiplication and division by over and over addition.

*Read Drum Operation*

The read drum instruction, when pinned R *ab*, transfers a word from the memory location specified in the instruction *ab* to the accumulator, first clearing the accumulator. During state 1 the 10's digit of the address selects a track on the drum. The following B pulse sets the ten's complement of the units digit of the address into counter VI and changes control to state 7. During state 7 the accumulator is cleared and W pulses are counted into counter VI until address coincidence is found, at which time control changes to state 4. During the sign digit time DT–0 of state 4, the sign of the memory word is stored in flip flop AD–1 and the numerical portion of the memory word is read into the accumulator during the digit times DT–1–DT–12. A W pulse then changes the control back to state 0.

*Write Drum Operation*

The write drum instruction, when pinned W *ab*, transfers a word from the accumulator to the specified memory location and leaves a copy of the word in the accumulator. During state 1 the 10's digit of the address selects a track on the drum. The following B pulse sets the ten's complement of the units digit of the address into counter VI and changes control to state 2. During state 2, W pulses are counted into counter VI until address coincidence is found. Then control changes to state 4. During the sign digit time DT–0 of state 4, the accumulator sign stored in flip flop AD–1 is written on the drum and the remaining digits are synchronously sent to the drum, after which the next W pulse changes the control back to the idling state 0.

*B Register Write Operation*

This instruction, initiated by pinning a B in the first pinboard section, writes the accumulator contents around the B register track ten times leaving a copy of the word in the accumulator. The B pulse at the end of state 1 changes control to state 4 as may be seen in FIG. 19. During each sign time DT–0 the sign of the word in the accumulator, as stored in flip-flop AD–1, is written on the B register track, and during digit times DT–1–DT–12 digits of the word are written on the B register. The next B flag pulse changes control to the idling state 0. Thus, state 4 starts and ends with a B pulse permitting the accumulator contents to be written on the B register ten times. If the most significant digit D–12 is not zero during state 4, the alarm light is fired and flip flop CN–4 is reset, this safeguards against overflow products.

*Shift Right or Left Operation*

By pinning in the first and third pinboard sections 5–81 the instruction $\leftarrow b$, where *b* is between 0 and 9, the accumulator word is shifted left the number of decimal places indicated by the *b* digit. When the 0 position is pinned, a ten place shift results. At the end of state 1, the B pulse sets the 10's complement of the units position into counter VI and changes control to state 5. If H is also pinned, flip flop CN–4 is reset and control changes back to state 0 without shifting. In state 5 for digits D–2–D–12, and including digit D–0 of state 6, the accumulator is shifted left one decimal place. During the shift the most significant digit is dropped and a 0 is brought in on the right. The W pulse changes control from state 5 to state 6, and at the end of digit time DT–0 counter VI, which keeps track of the number of shifts desired, is inspected to determine whether control should be changed back to the idling state 0. If not, the next W pulse counts counter VI once and changes control back to state 5 where operation is repeated until the total number of shifts are performed.

For shifting right, the operation is identical except that the word is shifted to the right, and the instruction is performed by pinning $\rightarrow b$ in the first and third pinboard sections 5–81 and 5–89.

*Unconditional Transfer Operation*

To perform the unconditional transfer operation, the instruction U *ab* is set up in the pinboard sections 5–81, 5–87 and 5–89 to instruct the computer to transfer the control to pinboard a step *b*. In accomplishing the transfer, the B and C stepping switches are advanced to remember the positions *a* and *b* pinned in the pinboard, so that the complete instruction U *ab* is retained after the stepping switches are advanced. After the instruction is remembered, the pinboard scanning switches are advanced to positions corresponding to switches B and C. Thus, the first C pulse, which arrives once per drum revolution intermediate two B pulses, when it arrives in state 1 of the unconditional transfer instruction, fires the thyratron which operates relay R–3. This relay is used to retain the instruction during the transfer because the stepping switch will lose the U instruction voltage as soon as it advances. In addition the C pulse transfers control to state 2.

While in control state 2 the B switch is inspected by B pulses to see whether it is in the position desired. If not, the following C flag pulse steps the switch once. After the stepping switch is advanced, which required 1 to 1½ drum revolutions, the succeeding B pulse inspects the B switch until the switch is in the desired position where control changes to state 3. In state 3 the same procedure occurs with respect to the C switch, with the C pulse inspecting the switch because it is the first pulse available in state 3 after it is initiated by a B pulse. Thus, the transfer is performed in less time by inverting the sampling procedure to cause the inspection and stepping to be performed by the consecutive C and B flag pulses.

At the end of the C switch stepping operation, control is transferred to state 4 by the C pulse. In state 4 the A switch, which scans the pinboards, is advanced until it agrees with the B switch position by firing the A thyratron with C pulses. Transfer is then made to state 5 with the B pulse as soon as the A switch and the B switch agree. In state 5 the B pulses fire the X thyratron and the C pulses fire the R–4 thyratron and return the computer to state 0, where the newly selected instruction is performed. The X thyratron advances the pinboard switch until it agrees in position to the C switch before the thyratron clearing relay R–4 is actuated.

*Conditional Transfer Operation*

The conditional transfer operation is performed by pinning the instruction C *ab* in the pinboard and depends upon the sign in the accumulator to cause a transfer only if the sign is minus. It is not desirable to transfer for a negative 0, however, and therefore the accumulator is examined in state 1 to flip-flop AD–1 if a negative 0 exists. If the C pulse finds AD–1 reset with a positive sign, the state returns to 0 and the succeeding instruction is performed. However, if the accumulator is negative and therefore flip flop AD–1 is set, it fires the R–3 thyratron which performs the transfer in the same manner as the unconditional transfer.

*Stepping Transfer Operation*

To set up the operation which steps the Z switch once, S *abc* is pinned in the respective pinboard sections 5–81, 5–87, 5–89 and 5–83. This instructs the computer to step the Z switch once, and when the Z switch steps past C, where C is between 0 and 15, to transfer control to pinboard a step *b*. During state 1, a C pulse fires the Z thyratron to step the switch once. If the same C pulse finds the Z switch is at the position C it fires the R–3 thyratron which changes control to state 2 and effects the unconditional transfer operation. If the R–3 thyratron is not fired, which occurs when the Z switch is not yet to position C, the next B pulse changes control to state 0 where the next instruction may be performed.

*Home Z Switch Operation*

In this operation which is performed by pinning the 0 in the first pinboard section 5–81, the Z switch is automatically stepped back to 0 so that it is ready for any further stepping under the control of the step transfer operation. During state 1, a C pulse fires the Z thyratron to step the Z switch once. When the next B pulse arrives, if the Z switch is in the home position, control goes to state 0 to await the next instruction. However, if state 1 persists, the next C pulse steps the Z switch again until home is reached.

*E–F Switch Operation*

The S instruction causes the special switches E or F to switch, and is used to perform the branch operation. Either the E switch, or the F switch, or both, may be stepped one step with this instruction. If, at the beginning of the instruction, the position of the E (or F) switch is equal to the number pinned in the units level, the next instruction will be skipped over. If there is no equality, the next instruction will be executed. If 0 is pinned in the tens level, the E switch will be stepped and the branch will be made when E equals the units level digit. If 1 is pinned in the tens level, the F switch is stepped and the branch will be made when F equals the units level digit. If 2 is pinned, both the E and F switches will be stepped, and the branch will be made when E equals the units level digit.

In state 1, the C pulse fires the E (or F) thyratrons according to the tens level pinning. This same C pulse fires the "P" thyratron, thus stepping the active stepping switch, if the units level digit equals the position of the E (or F) switch. This accomplishes skipping the next instruction. Then a B pulse changes control back to state 0.

The HS instruction of FIGS. 35 and 36 directs that the special switches be homed to any selected position. This instruction homes either the E switch or the F switch or both to the step pinned in the units level. If 0 is pinned to the tens level, the E switch will be homed. If 1 is pinned in the tens level, the F switch will be homed. If 2 is pinned in the tens level the E switch will be homed and the F switch will step each time the E switch steps. The switch chosen by the tens level digit will be stepped until it reaches the step that is pinned in the units level.

In state 1, the C pulse fires the E or F thyratron (or both) according to the digit pinned in the tens level. The B pulse will change control back to state 0 if the switch selected has reached the position designated by the units level digit. Otherwise, the next C pulse will again fire the thyratron.

*Other Instructions*

The foregoing operation takes place in the basic computer circuits performed by the diode logic networks of FIGS. 40 through 55. However, it is to be recognized that other instruction sequences may be followed and other pinboard configurations may be used. Thus, as may be seen by the pinboard of FIG. 33, several different operational cycles may be performed. In this pinboard layout at Z column has been replaced by a T column which is an additional instruction used to permit automatic transfer to a sequence of instructions set up in a tape input unit. Thus, the pinboard may be considered to have only three instruction levels providing the instruction designation and the two address digits.

In this embodiment, provision is made for pinning the A column to designate the Shift and Absolute Value instruction. The shift left instruction is accomplished by pinning 1 in the second or tens address section. The number of decimal places to be shifted are pinned directly in the units address section. The instruction shifts the contents of the accumulator to the left from 0–10 places according to the units level selection, dropping the most significant digits and bringing in zeros on the right. If * is pinned in the units level, the machine will halt with no shift.

Shift right is accomplished by pinning 2 in the tens level and the number of decimal places to be shifted in the units level. The instruction shifts the contents of the accumulator to the right according to the pinning in the units level, dropping the least significant digits and bringing in zeros on the left. If * is pinned in the units level, the machine will halt with no shift. The mechanization is the same as for left shift.

Positive absolute value is accomplished by pinning 3 in the tens level. At the end of state 1, the B pulse changes control to state 5. The first pulse in state 5 resets flip flop AD–1, making the accumulator positive and changes control back to state 0. If * is pinned in the units level the machine will halt after completing the instruction.

Negative absolute value is accomplished by pinning 4 in the tens level. At the end of state 1 the B pulse changes control to state 5. The first pulse in state 5 sets AD–1, making the accumulator negative, and changes control to state 0. If * is pinned in the units level the machine will halt after completing the instruction.

The keyboard operation of both the modified keyboard and the non-modified keyboard operates as follows in response to the pinning of the K in the first pinboard section:

If 0 is pinned in the units level, the B pulse at the end of state 1 fires the non-print solenoid so that the printer will not print when the motor bar is depressed by the operator. The B pulse at the end of state 1 also changes control to state 4, where the keyboard light goes on. The computer then waits until a motor bar has been actuated to set up the keyboard information in the readout switch. Control then changes to state 5 with the first W pulse that finds the alternator flip flop AD–4 reset. Normally AD–4 is switched with every D pulse. During D–0, AD–4 is set and the digit in column 1 of the read-out switch is set into counter VI under control of the scanner. During D–1, AD–4 is reset and counter VI is counted into the adder counter I. During D–2, AD–4 is set and the digit in column 3 is set into counter VI. During D–3 with AD–4 reset, this digit is counted into the adder. This process continues with the digits in columns 1, 3, 5, 7, 9, and 11 of the read-out switch being set into counter VI and then counted into the adder during the first word cycle of state 5, and the digits in columns 2, 4, 6, 8, 10 and 12 being transferred during the second word cycle of state 6. After the digit in column 12 of the read-out switch (always zero for a keyboard instruction) has been stored in the accumulator a W pulse finds AD–4 reset and changes control back to state 0. During state 5, the sign flip flop AD–1 is set if the number in the keyboard is negative. This operation permits the keyboard to be read into the computer during two word times.

Modifications likewise may be made to the print instruction sequence. This may be pinned with only the P column of the first pinboard section shown in FIG. 33.

The print instruction transfers the contents of the accumulator to the print bars of the printer by stopping the racks of the printer at the proper time. It also may serve to check the printing by reading back the number which has been set mechanically into the read-out switches by the movement of the racks set up for printing in the keyboard-printer during its operation cycle. This number is then compared with the number still in the accumulator to cause an alarm signal halting the computer if an error exists. Negative numbers are printed in absolute value form with a minus sign. If 1 is pinned in the tens level, motor bar 1 will be activated. No pinning in the tens level activates motor bar 2, pinning 3 activates motor bar 3, and pinning 4 activates motor bar 4. If 0 is pinned in the units level, no printing will take place. If * is pinned in the units level the machine will halt after completing the print instruction. To prevent the printing of negative zeros the accumulator is examined during state 1 and, if all digits are zero, its sign is made positive by resetting AD–1. The B pulses at the end of state 1 changes control to state 5. If * is pinned, the same B pulse resets the flip flop CN–4, so that when the instruction is finished and control returned to state 0, the active stepping switch will not step to the next instruction.

At the beginning of state 5, the print thyratron is fired. If AD–1 is set to indicate that the accumulator is negative, the minus sign thyratron is fired. If the units level 0 is pinned, the non-print thyratron is fired. At the next B pulse, the motor bar 2 thyratron is fired and control changes to state 3. The machine then waits for an auxiliary motor bar signal which fires the motor bar 1 thyratron if the tens level 1 is pinned, motor bar 3 thyratron if tens level 3 is pinned or motor bar 4 thyratron if tens level 4 is pinned. Either of these three motor bars will override motor bar 2 which is actuated in state 5, and if no other motor bars are actuated motor bar 2 will be actuated. State 3 is used to scan the accumulator for zeros and distribute the information to the correct thyratrons in the rack stop thyratron circuit. A signal is received from the printer when it is time to fire the thyratrons in order to stop the racks in the position that will print zeros. The same signal that fires the thyratrons also tells the machine to begin to scan the accumulator for ones. This process continues until the signal to fire the thyratrons for eights is received, since it is not necessary to stop the racks for the final nines position.

During state 3, scanning is accomplished by matching counter V with the adder output, first looking for zeros. When a match is found, AD–2 is set to remember the match until the end of the digit time. Then counter VI starts counting until it reaches 9. The VI≠9 signal generates a match signal that lasts for nine-tenths of a digit time as required by the rack stop thyratron circuit. The match signal is distributed to the appropriate rack stop thyratrons representing the columns of the printer under control of the scanner. The machine continues to scan for zeros until a signal is received from the printer to fire the rack stop thyratrons for zeros. The signal is synchronized with the internal timing by means of flip flop AD–3. It fires the rack stop thyratrons which have ben energized by the match signal and the scanner and also advances counter V so that the machine immediately begins to scan for ones. The machine then scans for ones until the signal from the printer says to fire ones, etc. This process continues until the signal for firing eights control then changes to state 4 with a W pulse.

In state 4, the machine waits until the read-out switch has been set up by the racks and a W pulse finding AD–4 reset changes control to state 6. During state 4, AD–2 is set if the printer has just printed a minus sign. During state 6, the digits in the read-out switch are set into counter VI, one at a time under control of the scanner, whenever AD–4 is set. When AD–4 is reset, the digit in counter VI is counted out and compared with the corresponding digit being counted out of the adder. During the first word cycle of state 6, columns 2, 4, 6, 8, 10 and 12 are checked against digits 2, 4, 6, 8, 10 and 12 of the accumulator. During the second word cycle of state 6, columns 1, 3, 5, 7, 9 and 11 are checked against digits 1, 3, 5, 7, 9 and 11 of the accumulator. AD–1 is also compared with AD–2 to check the sign. If there is any discrepancy in any of these checks, the alarm light is lit and CN–4 is reset to cause the machine to stay in state 0 when it arrives there. The second W pulse in state 6 finds AD–4 reset and changes control back to state zero.

The counter V in the computer is used in the motor bar or print instruction to remember whether the computer is matching for 0's, 1's, etc., by counting the modified emitter pulses to remember the rack position. The match is remembered for the motor bar output instruction by the general-purpose flip flop AD–2 which also serves in the sign comparison circuits as seen from FIG. 41. The operation of counter V may be seen by the embodiments shown in FIGS. 42 or 56.

In FIG. 56, the various operations through which the multiplier quotient counter V associated with the arithmetic control circuits 2–60 may be put are shown in logical form. Basically, this counter counts the addition steps made during multiplication, and builds up the quotients during division. Thus, in multiplication the counter stores the complement of the multiplier digit and is counted for each addition of the multiplier until the counter reads 9. In division, the counter is advanced after each subtraction and in this way builds up the quotient digit.

Similarly several conditions encountered by counter VI are illustrated in FIGS. 57 and 58. As may be seen from these figures counter VI may be connected for address selection of a drum sector for some instructions and may be coupled in as a counter for decimal storage for other instructions.

It is evident from the foregoing specification that an improved electronic computer system is afforded having many advantages over prior art computer systems. Accordingly, those novel features descriptive of the improvements afforded to the art by the invention are defined with particularity in the following claims.

What is claimed is:

1. In an electronic computer system having a memory with more than one location each identified by a different address digit, means for automatically scanning a fixed number of said memory locations comprising a stepping counter, each step of which represents a different one of the memory locations, means for presetting the number of steps to be scanned by said counter so as to call for a specified number of locations on said memory, said specified number of locations being adjustable under external program control, instruction means for controlling the computer operation so as to selectively bring said stepping switch into control to call for said locations on said memory, and means responsive to certain instructions for selecting a memory address digit corresponding to the count of said stepping counter.

2. In an electronic digital computer, means for automatically sequencing the computer to a number of sequential preselected program positions each having an instruction capable of specifying an address and an operation, programming means for designating at one program position a special instruction, stepping means responsive to arrival of the program position having said special instruction to step from one count to another count, and means for thereafter sequencing the computer to a further program position beyond said one program position, said further program position including special control means in its address portion calling for an address in accordance with the current count of said stepping means and further including control means in its operation portion calling for a command utilizing the informational position of the address specified by said stepping means.

3. Apparatus as defined in claim 2 wherein one of said program positions has an instruction to enable means for homing the stepping means to a single preselected step so as to permit the addresses called for by said stepping means to be available for further instructions.

4. Apparatus as defined in claim 2 wherein one of said program positions has an instruction to enable means for homing the stepping means to any prescribed step under control of the address portion of the program position corresponding to said instruction.

5. In an electronic computer system having a memory with different locations identified by address digits *ab*, and means for scanning a preselected program of specified instructions step by step, the combination comprising, stepping means for defining a plurality of positions at a plurality of separate indicating levels, certain of said instructions having a particular symbol in their address portions calling for address locating means under control of selected of said levels of said stepping means, circuit means connected to a first indicating level when so programmed for selecting an address identified by the position of the stepping means which then becomes a digit *a*, circuit means connected to a second level when so programmed for selecting an address identified by the position of the stepping means which then becomes the digit *b*, circuit means connected to a third level for determining when the stepping means reaches a specified count, programming circuits responsive to a special instruction for continuously advancing the stepping means step by step so as to enable the instructions having said particular symbol in their address portions to have access to a plurality of addresses during repeated sequential program steps.

6. Apparatus as defined in claim 5 wherein the computer system has different control states selected to perform different operations, and including means for homing the stepping means from the count reached thereby while the computer system resides in a single state.

7. Programming means for an electronic computer operable automatically in response to program steps designated by respective instruction characters and address characters, comprising in combination, a program step storage device including an instruction character portion and an address character portion, computer control circuits for automatically designating computer functions in response to a specified one of a plurality of instruction characters placed in said instruction character portion, a number of computer functions capable of being performed by said computer which exceeds the number of selections provided by said instruction character portion, at least a portion of each of the instruction characters for said further computing functions occupying said address character portion of said program step storage device, further computer control circuits for specifying further computer functions in response to the further instruction characters, address locating control circuits for automatically locating a memory position in response to one of a group of address characters to thereby specify together with certain ones of said instruction characters a complete program step for those instructions necessitating an address, the remaining ones of said instruction charatcers operable without an address to specify a complete program step, means responsive to at least one of said remaining instruction characters to specify that supplementary instruction information is designated by the normally non-used address locations of that instruction, and further means operable in response to the last mentioned means for actuating the further computer control circuits associated with the address character portion of said program step storage device, whereby the number of instruction selections of the computer is increased without provision of an increased instruction character portion of said program step storage device.

8. In an electronic digital computer provided for serial operation upon the several digits of a computer word, a source of digit clock pulses corresponding to the word digit times, a binary coupled counter having a greater count capacity than there are digits in a computer word operable to step one position in response to each digit clock pulse, means causing the computer to overcount to a binary count exceeding the number of digits in a word, sensing means responsive to the overcount causing said binary counter to dwell in said overcount condition for a period of time which is not significant when compared to the time of said other counts and to reset the counter for a further binary count, additional reset means for said binary counter operative during a single computer state, decoding means connected to parallel output stages of said binary counter providing a translated code sequence distinguishing each count, said sensing means including one of the output levels of said decoding means, and computer circuits responsive to selected digits coupled to the decoding means.

9. In an electronic computer system having a memory with more than one location each identified by a different address digit, means for automatically scanning a fixed number of said memory locations comprising a stepping counter, each step of which represents a different one of the memory locations, means for presetting the number of steps to be scanned by said counter so as to call for a specified number of locations on said memory, said specified number of locations being adjustable under external program control, instruction means for controlling the computer operation so as to selectively bring said stepping switch into control to call for said locations on said memory, means responsive to certain instructions for selecting a memory address digit corresponding to the count of said stepping counter, and means to repeat a program sequence over and over again, whereby the computer system is enabled to automatically call for successive addresses defined by the stepping switch to be utilized with unmodified instructions in the computer system.

10. In an automatically sequenced electronic computer the combination for modifying instructions in the programmed computer sequence so that the same program step may be used to deal with data stored in different computer memory locations, comprising, manually selectable control means for selecting a number, a counting device set to count through intermediate steps to the number set in the control means, automatic program selector means directing the computer to call for information at addresses specified in the intermediate steps of the counting device, automatic computer circuitry for causing the counting device to count in response to special instructions after the address specified in the counting device is called for, and means to repeat a program sequence over and over again, whereby the computer is caused to automatically call for successive addresses defined by the counting device without modifying the instructions in the programmed computer.

11. In an automatically sequenced electronic computer system the combination for modifying the address portion of instructions in the programmed computer sequence so that the same program step may be used to process data stored in different computer memory address locations, comprising, control means for selecting a data address, a counting device coupled to said control means and operable to sequentially count different data addresses of said memory location, automatic instruction means directing the computer to call for information at addresses specified in the control means by said counting device, and automatic computer circuitry for causing said counting device to count through intermediate steps after the address specified in the control means by said counting device is called for, whereby the computer is caused to automatically call for addresses defined by the counting device without modifying the instruction in the computer.

References Cited in the file of this patent

UNITED STATES PATENTS

| | | |
|---|---|---|
| 2,416,089 | Jones | Feb. 18, 1947 |
| 2,462,100 | Hollabaugh | Feb. 22, 1949 |
| 2,540,654 | Cohen | Feb. 6, 1951 |
| 2,609,143 | Stibitz | Sept. 2, 1952 |
| 2,679,638 | Bensky | May 25, 1954 |
| 2,685,644 | Toulon | Aug. 3, 1954 |
| 2,687,473 | Eckert et al. | Aug. 24, 1954 |
| 2,771,595 | Hendrickson | Nov. 20, 1956 |
| 2,777,066 | Brockman | Jan. 8, 1957 |
| 2,789,224 | Leonard | Apr. 16, 1957 |
| 2,800,278 | Thomas | July 23, 1957 |
| 2,807,003 | Alrich | Sept. 17, 1957 |
| 2,810,516 | Tootill et al. | Oct. 22, 1957 |
| 2,820,141 | Weill et al. | Jan. 14, 1958 |
| 2,829,253 | Shepard | Apr. 1, 1958 |
| 2,854,652 | Smith | Sept. 30, 1958 |
| 2,859,342 | Misek | Nov. 4, 1958 |
| 2,872,110 | Snyder et al. | Feb. 3, 1959 |
| 2,898,041 | Crawley et al. | Aug. 4, 1959 |
| 2,916,210 | Selmer | Dec. 8, 1959 |
| 2,928,076 | Greene | Mar. 8, 1960 |
| 2,958,856 | Bird et al. | Nov. 1, 1960 |
| 2,969,525 | Hill | Jan. 24, 1961 |
| 2,978,175 | Newman et al. | Apr. 4, 1961 |

FOREIGN PATENTS

| | | |
|---|---|---|
| 526,231 | Belgium | Aug. 4, 1954 |
| 753,333 | Great Britain | July 25, 1956 |

OTHER REFERENCES

ERA, "24-Digit Parallel Computer with Magnetic Drum Memory," 1949, pages 27, 28, 43, and 44; and Figures 3.2–2, 3.3–1, 3.3–5, 3.5–3, 3.5–4 and 3.5–5 relevant.

UNITED STATES PATENT OFFICE
CERTIFICATE OF CORRECTION

Patent No. 3,144,549 August 11, 1964

George G. Hoberg et al.

It is hereby certified that error appears in the above numbered patent requiring correction and that the said Letters Patent should read as corrected below.

In the heading to the printed specification, line 9, for "3,043,449, dated July 10, 1962" read -- 3,053,449, dated Sept. 11, 1962 --; column 1, line 13, for "3,043,449" read -- 3,053,449 --; column 10, line 52, for "twu", in italics, read -- tvu --, in italics; same line 52, for "TwU" read -- TvU --; column 17, line 51, after "signals" insert -- available at --; column 19, line 19, for "to", first occurrence, read -- in --; line 54, for "AD-2" read -- AD-1 --; column 29, line 20, after "to" insert -- reset --; column 34, line 75, after "to", first occurrence, insert -- thereafter --.

Signed and sealed this 15th day of December 1964.

(SEAL)
ıttest:

ƎRNEST W. SWIDER
ıttesting Officer

EDWARD J. BRENNER
Commissioner of Patents